United States Patent
Hanf et al.

(10) Patent No.: US 6,405,330 B1
(45) Date of Patent: Jun. 11, 2002

(54) PROCESS FOR DETERMINING POTENTIAL SHIFTS BETWEEN ELETRONIC MODULES IN A WIRE BUS NETWORK

(75) Inventors: Peter Hanf, Goeppingen; Juergen Minuth, Eislingen; Juergen Setzer, Illingen; Max Reeb, Uhingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/155,395

(22) PCT Filed: Nov. 19, 1996

(86) PCT No.: PCT/EP96/05088

§ 371 (c)(1),
(2), (4) Date: Feb. 26, 1999

(87) PCT Pub. No.: WO97/36399

PCT Pub. Date: Oct. 2, 1997

(30) Foreign Application Priority Data

Mar. 26, 1996 (DE) .......................................... 196 11 944

(51) Int. Cl.⁷ .............................................. G11C 19/00
(52) U.S. Cl. ...................................................... 714/712
(58) Field of Search ................................. 714/712, 749

(56) References Cited

U.S. PATENT DOCUMENTS 5,617,282 A    4/1997  Rall et al. ...................... 361/56
6,108,809 A  * 8/2000  Schwarz ........................ 714/749

FOREIGN PATENT DOCUMENTS

| DE | 43 06 361 | 9/1994 |
|---|---|---|
| DE | 43 27 035 A1 | 2/1995 |
| DE | 43 42 036 C1 | 4/1995 |
| DE | 196 11 944 | 10/1997 |
| EP | WO 90/08437 | 7/1990 |
| EP | WO 90/09713 | 8/1990 |
| JP | 7-15453 | 1/1996 |

* cited by examiner

Primary Examiner—Phung M. Chung
(74) Attorney, Agent, or Firm—Crowell & Moring LLP

(57) ABSTRACT

A method and apparatus for determining potential shifts between electronic modules in a wire bus network or for determining the correspondence quality of their communications operating levels in the network interconnection. The bus medium comprises at least one wire bus which is directly electrically connected to the electronic modules. An offset voltage is added in at least one bus subscriber (test subscriber) on the transmission side to at least one of two dominant, normal source levels and a test message is transmitted into the bus network by the test subscriber which is in this dominant state onto the bus network. This results in a modification of the source level in a predetermined manner. Depending on whether at least one of the two dominant source levels is decreased or increased by the adjustable offset voltage, an evaluation of whether the (reference-earth) potential-defective bus subscriber loses or gains its reception capability is performed.

For implementation of the method, an apparatus comprising co-operative potential control devices which are connected or can be connected to the transceiver function of a bus subscriber is used. Together with these, at least with regard to part of the transmitting and/or receiving device of the transceiver function, the apparatus forms at least one controllable voltage source which allows the modification of at least one source level that is dominant during transmission and/or at least one signal level that is discriminant during reception.

19 Claims, 28 Drawing Sheets

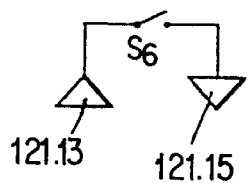
Fig. 33(1)
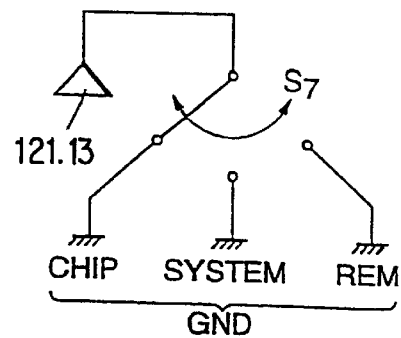
Fig. 33(2)
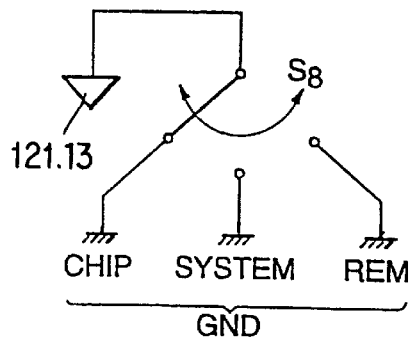
Fig. 33(3)
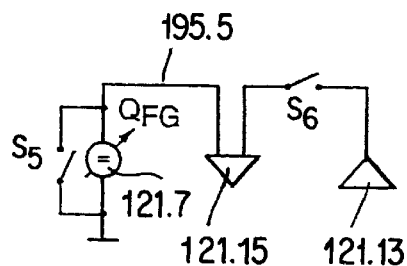
Fig. 33(4)
| | $VT_L$ | $VT_H$ |
|---|---|---|
| (a) | fix | fix |
| (b) | fix | var |
| (c) | var | fix |
| (d) | var | var |
Fig. 33(5)
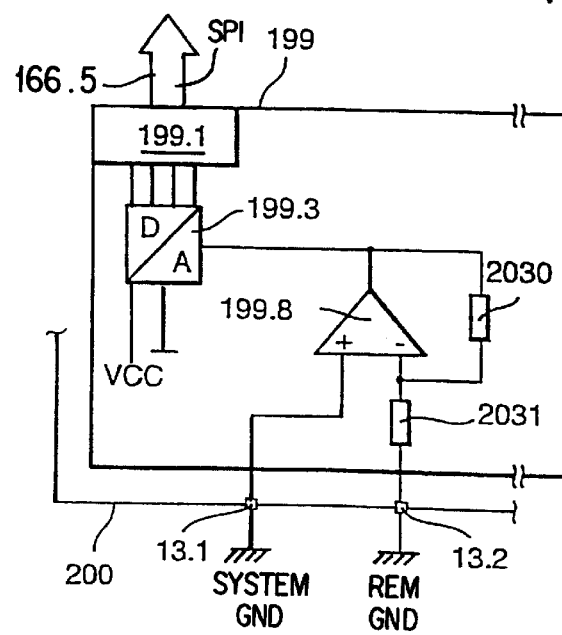
Fig. 38

PROCESS FOR DETERMINING POTENTIAL SHIFTS BETWEEN ELETRONIC MODULES IN A WIRE BUS NETWORK

BACKGROUND AND SUMMARY OF THE INVENTION

The invention relates to a method and apparatus for determining potential shifts between electronic modules in a wire bus network or the correspondence quality of their communications operating levels in the network interconnection.

Control technologies which rely on a simple wire bus as a communications medium are becoming increasingly important. Examples thereof that have been disclosed are bus networks according to the J1850 or CAN standard which a rely on a two-wire bus medium. In this case, a multiplicity of electronic control units communicate with one another via two conductor cores which are normally dominantly keyed in antiphase.

In this context, WO 90/08437 describes the coupling of a subscriber of a local network, in particular of a motor vehicle, which has at least one transmitting and/or one receiving section to a data bus of this type having two bus lines. This coupling is designed in such a way that the potentials which occur at the input terminals of a subscriber are used to enable reliable identification of the data present on the data bus. The identification is possible even in the event of a short circuit of one of the bus lines with respect to earth ground, the battery voltage or with respect to the other bus line, or in the event of one of the bus lines being interrupted.

WO 90/09713 describes a network interface of a computer network, in particular for a motor vehicle, which has at least two bus lines. Here, the network is distinguished by an error detection circuit which is assigned to the bus lines and to a reference voltage and, in the event of an interruption, or a short circuit of one of the two bus lines to earth or a supply voltage of the computer network, the error detection circuit evaluates a signal arriving on the other, intact bus line and outputs a wake-up signal for the purpose of activating the network interface.

German Patent Document DE 42 27 035 A1 describes an arrangement for bidirectional data transmission on a two-wire bus system which functions in the single-wire operating mode if a large number of line faults occur. At the same time, the arrangement prevents power losses even in the event of a short circuit of a data line to a high battery voltage.

German Patent Document DE 43 42 036 C1 describes a data bus system which has a serial data bus that is operated by complementary logic signals. The system also has a plurality of subscribers which communicate with one another via the bus lines. Each bus line has bus-coupling output stages. Part of the output stage of each bus subscriber is a bus termination network. Here, the bus termination network is designed such that it has a low impedance and is active. Furthermore, the termination network is designed such that it is switchable and at least one output stage can be changed over internally. On the other hand, the bus termination network is designed such that it is passive and at least one further output stage has a low impedance. Further, the bus termination network is designed such that all the remaining output stages have a high impedance.

Bus networks have also been disclosed which utilize, as the bus medium, a single line core over a busbar or collective surface that also serves (as a rule) as a power supply conductor. Communication is effected in each case by transmitting/receiving means - so-called bus transceivers. As an essential part of each device, these bus transceivers are each physically coupled to the bus medium. These transceivers for transmitting and receiving the data messages convert the latter from the logic level within the relevant bus subscriber into signal levels on the bus core or cores, and vice versa.

With regard to various features of a suitable bus transceiver which are relevant in the context of the present invention, reference is expressly made to DE 196 11 944 A1, the text of which is incorporated herein in its entirety.

Without exception, the bus subscribers perform their task (for example, control) via a micro-controller having a varying degree of performance. A protocol function is provided for communication via the bus. The protocol function may be previously monolithically cointegrated in microcontrollers which are specialized for such applications.

In the interest of a high signal-to-noise ratio, two-wire bus media are preferably used in systems in interference-critical surroundings, since single-wire bus media over a reference conductor surface are more sensitive to electromagnetic interference irradiation and radiation. This means that they can only be used at a low data rate. On the other hand, with a suitable configuration of their transceivers, two-wire bus networks can also be operated (in an emergency) in the aforementioned single-wire operating mode if appropriate at a lower data rate (i.e. one bus core with respect to a reference level that is available throughout the network).

In such networks, normal communication is predominantly effected by in-antiphase keying of the two line core potentials from a recessive to a dominant signal level. As a result of this measure and as a result of relatively low signal levels overall (seen in absolute terms), the interference radiation of corresponding bus networks can be kept relatively low. This is true even in the case when they are provided without screening and are operated with very short bus bit times.

The capability of using an unscreened two-core line as the bus medium is a precondition in many applications, both in terms of cost-effectiveness and adequate system availability under harsh operating conditions. The latter is easily understood when considering that transmission interference can actually occur in a screened bus system if the screening network has a fault, i.e., when a fault indication is not actually present on the bus cores serving for signal transmission and the network interconnection thereof. This fault possibility is necessarily absent from a two-wire bus system that is not based on screening. Additionally, in single-wire networks, communication is effected (as a rule) by keying the bus cores from a recessive to a dominant signal level with respect to the reference conductor surface. The invention can be used equally with single-wire and two-wire bus networks.

In both single-wire and two-wire bus systems, it is necessary to provide particular circuit conditions to keep the above-mentioned signal levels within certain tolerance windows so that interference-free signal transmission is possible between the bus transceivers.

In this respect, both the microcontroller and the bus protocol function require an operating voltage which is to be kept within narrow limits. As a rule, this operating voltage is derived from a superordinate potential via a voltage regulator contained in the control unit. In the case of transmission, the (one of the two) source level, which is dominant during transmission, is then determined from this relatively accurate operating voltage, by which source level data is "gated" from the (respective) bus core at a recessive level.

For example, in a two-wire bus network according to the CAN standard, the dominant high level of 5 volts, which is specified at the present time, is derived from the supply voltage of 5 volts. Use of a 5 volt supply has long been customary for integrated circuit functions in control units. Here, the voltage can (in any case) be kept relatively and accurately constant in each unit using electronic regulating means.

The transceivers are designed in such a way that they implement the corresponding level conversions of the data messages without any errors even when the reference levels of the transceivers have, with respect to one another, certain mutual permissible potential differences. Here, these differences do not exceed a maximum value in each case.

Transmission problems inevitably arise in the above-mentioned single-wire or two-wire bus network. This occurs when the correspondence (within specified tolerance bands) of the bus level(s) dominantly established in terms of transmission on the bus core/cores and/or of the effective discrimination level(s) (coordinated therewith in terms of reception) for assessing the truth of signal edges and states in the bus medium suffers, or is impaired to an extent such that the above-mentioned maximum values are exceeded. In this respect, a sufficient correspondence of the levels at the same time appears to be an essential measure of a definable bus quality. This also incorporates other aspects such as, for example, the edge-rise correspondence between transmitter and receiver (slew rate compliance), the measure of overshoot attenuation, etc.

A specific case of the above-mentioned bus level disturbances are potential disturbances which are subscriber-induced locally. Such disturbances occur when a supply potential of all the bus subscribers is drawn from a common (i.e., spatially extended) busbar or power service. Within the latter, an erroneous voltage drop occurs, with the result that the affected supply potential (as seen from the bus medium) is no longer the same for all the bus subscribers.

In the exemplary case of a control unit in a means of transport, in which the entire body serves (in a known manner) as a distribution conductor surface ("earth"), this occurrence may be due to an erroneous longitudinal voltage drop in this surface or an erroneous earth connection of a control unit as bus subscriber. Here, with application of the normal earth current of the relevant unit, an excessively large voltage drop and, in this respect, an increase in the earth reference potential of the affected unit with respect to the earth potentials of the remaining units in the bus network occurs. Consequently, such a control unit cannot then even be addressed any longer via the bus. This is because as a result of the earth-reference-point error voltage, the discrimination level window of its bus receiver, which is error-free per se, may be raised too far relative to others. For practical servicing and corrective maintenance of corresponding bus networks, it is very important to be able to identify the presence of corresponding potential shifts and to be able to determine the latter.

An object of the invention, therefore, is to provide a method and apparatus for determining potential shifts between electronic modules in a wire bus network or the correspondence quality of their communications operating levels in the network interconnection.

This object is achieved by the method according to the invention where at least one bus subscriber (test subscriber), which may be a subscriber that is normally connected to the bus or a subscriber that is only temporarily connected to the bus (such as, for example, a test unit in the workshop) and at the transmitting end a voltage offset—designated as offset voltage in the following text—is added to (at least) one (of the two) dominant, normal source level and a test message is transmitted into the bus network by the test subscriber in this state. In this case, the source level is altered in a predetermined manner.

Depending on whether the (at least) one (of the two) dominant source level is decreased or increased by the offset voltage that can be set in each case, the (reference-earth-) potential-defective bus subscriber loses or gains its reception capability.

In the event of step-by-step monotonic alteration of the offset voltage, the (reference-earth-) potential-defective bus subscriber, in the first case, can no longer (correctly) receive the test message. Consequently, the potential bus subscriber also can no longer acknowledge the offset voltage as error-free and as the first of all the bus subscribers. In the second case, the potential bus subscriber can (correctly) receive and acknowledge it as the first of all the bus subscribers. The remaining bus subscribers are in this case put into or held in a status of no transmission capability (RECEIVE ONLY).

In order to localize that bus subscriber in which the largest reference-earth-potential-distorting error voltage throughout the bus network is effective, according to the method of the present invention a dominant H potential, for example, is thus reduced in a (stimulating) bus subscriber. This proceeds from a higher value, until one of the bus subscribers can no longer receive the (stimulating) test subscriber. The bus subscriber which loses its reception capability is then that bus subscriber which currently has the largest reference voltage error in the network. Or, for example, at least one dominant L potential is reduced, proceeding from an increased value compared with its normal value, until a bus subscriber can receive the (stimulating) bus subscriber. This subscriber which acquires reception capability is then actually that subscriber which has the largest reference voltage error in the network.

As a result of this measure according to the method of the present invention, it is thus possible to find not only the error-voltage-impaired bus subscriber but also, from the offset voltage reached in the case of the disappearing or incipient reception capability of the said bus subscriber, a measure of the size of the reference voltage error present in this bus subscriber.

According to another object of the invention, an apparatus is provided which is suitable for determining potential shifts between electronic modules in a wire bus network or the correspondence quality of their communications operating levels in the network interconnection. In this case, the bus medium comprises at least one wire and the electronic modules are directly electrically connected to the bus medium and furthermore are interconnected via a potential busbar. Here, the busbar serves as a reference-earth potential busbar for the bus communication in the case of the single-wire operating mode of the bus medium. Further, each electronic module comprises a micro-processor or microcontroller and also means for realizing transmission and reception coupling of the microprocessor or microcontroller to the bus medium.

According to the invention, the apparatus comprises, as part of the transceiver means, means for inhibiting the transmitting means during reception and also cooperative potential control means. These are connected to the microprocessor or microcontroller and are connected or can be connected to the transceiver means. Using these, with regard to parts of the transmitting and/or receiving means of the transceiver means, the apparatus numerically realizes at least one controllable voltage source. This numerically allows the influence of at least one source level which is dominant during transmission and/or at least one signal level which is discriminant during reception.

In an embodiment according to the invention, the potential control means can be driven digitally by a microprocessor or microcontroller.

In still another embodiment according to the invention, the potential control means are configured in such a way that in the event of transmission, at least one source level, which determines the dominant state on the relevant bus wire, can be shifted monotonically at least incrementally and/or decrementally.

In yet another embodiment of the present invention, the context of the capability of influencing two source levels which are dominant during transmission, can be both set or altered independently of one another.

In a further embodiment according to the invention, two source levels which are dominant during transmission can be set or shifted in such a way that the interval separating both levels is essentially maintained in the process.

In even a further embodiment according to the invention, the apparatus has a signal-dedicated terminal as reference-earth potential busbar at least the receiving means of the transceiver function.

In still another embodiment of the present invention, the apparatus comprises a particular terminal as reference-earth potential busbar at least of the means for setting or alteration in the event of transmission of at least of one of the two dominant source levels.

In another embodiment of the present invention, the apparatus has a particular terminal, via which the potential control means can be operatively connected to a reference-earth potential in the environment of the electronic module carrying the transceiver function.

In still another embodiment of the present invention, the apparatus comprises, in the path of the operative connection, means for protection against over voltage and/or an incorrect polarity and/or inputting a radio-frequency signal.

In yet another embodiment in the present invention, the apparatus acquires an adjustable offset voltage source, which is fed to the supply terminal of the transmitting means that is near to the reference-earth potential, and supplies the transmitting means with a constant voltage.

In a further embodiment of the present invention, at least parts of analog action of the receiving means are connected in parallel with the constant-voltage-supplied transmitting means in terms of power supplying, and the offset voltage source is thus also effective at the receiving end.

In another embodiment according to the invention, the apparatus acquires a first adjustable offset voltage source, which is fed to the supply terminal (near to the reference-earth potential) of the switching output stage of the transmitting means which drives the bus wire BUS_L. Along with this, a second adjustable offset voltage source is fed into a supply terminal, which has an opposite potential to the switching output stage of the transmitting means which drives the bus wire BUS_H.

In still another embodiment of the present invention, the apparatus acquires a first adjustable offset voltage source, which is fed to the supply terminal (near to the reference-earth potential) of the switching output stage of the transmitting means which drives the bus wire BUS_L. Also, a second and third adjustable offset voltage source, are fed into a supply terminal, which has an opposite potential to the switching output stage of the transmitting means which drives the bus wire BUS_H. Here, the latter voltage sources are referenced to supply potentials of different magnitudes or are connected to supply potentials of different magnitudes.

In yet a further embodiment of the present invention, the second and third offset voltage sources can be activated alternatively.

In still a further embodiment according to the invention, the offset voltage source ($Q_{SL}$) is referenced to the reference-earth potential, and the effective offset voltage source (remote from the reference-earth potential) can be only activated alternately in chronological succession.

In accordance with a further embodiment of the present invention, the apparatus comprises means which permit activation of the second and third offset voltage sources in a manner which is dependent upon the transmission signal.

In accordance with still a further embodiment of the present invention, the potential control means comprise means for autonomous alteration of the setting of at least one offset voltage source over time.

In accordance with a further embodiment of the invention an autonomous, alteration is possible in a manner which is dependent upon the data signal at the transmitting end.

In yet another embodiment of the present invention, a clock signal, which can be obtained from the microprocessor or microcontroller, can be fed to the means for autonomous alteration of the setting of at least one offset voltage source.

In still another embodiment of the invention, the potential control means comprise regulating means which permit the potential control to be performed in accordance with a value specification. This value specification can be received from the microprocessor or microcontroller, in a manner which is dependent upon a potential that can be obtained by tapping a bus wire.

In a further embodiment of the invention, the apparatus comprises (independently of the transmitting means) backup means which are connected or can be connected to at least one bus wire. The backup means also permit connection (keyed by the transmission signal) to the at least one bus wire of a regulated potential.

In another embodiment according to the invention, the apparatus comprises measuring means, which afford the acquisition of an error quantity (caused by the backup means) for the purpose of its compensation by regulating a connection or computational allowance in the desired value specification for the regulation performed by the microprocessor or microcontroller.

In accordance with another embodiment of the invention, the apparatus comprises (independently of the transmitting means) backup means which are connected or can be connected to at least one bus wire. With the backup means, a connection which is keyed by the transmission signal is possible to the bus wire of an unregulated potential in accordance with a digital value which can be predetermined by the microprocessor or microcontroller.

In still a further embodiment, for the purpose of activating one of the backup means, the backup means can receive the transmission signal from the relevant core output stage via a changeover switch. If appropriate, the changeover switch disconnects the output stage from the bus wire.

In accordance with another embodiment of the invention, the regulating means comprise a sampler, which is operatively connected to a bus wire, and a holding element or a holding regulator.

In an even further embodiment of the invention, the sampler has two diode paths. Here the second diode path is provided for or effects compensation of temperature influences and/or an error voltage caused by the sampling current flow along the first diode path.

In still another embodiment of the invention, the potential control means are configured such that they permit the influence of at least one recessively discriminant signal level by influencing at least one threshold voltage in the receiver.

In another embodiment of the invention, the apparatus has (for the cooperative receiving means) means for specifying two threshold values. These means are referenced to a reference-earth potential busbar. In this case, the reference-earth potential busbar is operatively connected to a reference-earth potential terminal or can optionally be operatively connected to at least two alternative reference-earth potential terminals of the electronic module.

In accordance with a further embodiment of the present invention, an influence at the receiving-end is possible by means of an adjustable offset voltage source which lies in the supply current path, near to the reference-earth potential, of at least parts of the analog action of the receiving means.

In yet a further embodiment of the present invention, the reference-earth potential busbar of the threshold value specification means can be connected to the supply reference point, near to the reference-earth potential, at least of the parts of the analog action of the receiving means.

In still a further embodiment of the invention, the receiving means have level discrimination means referenced to a supply reference point. Here, this supply reference point is operatively connected to a reference-earth potential terminal or can (optionally) be operatively connected to at least two alternative reference-earth potential terminals of the electronic module.

In accordance with another embodiment of the invention, the apparatus comprises digital/analog conversion means and/or analog/digital conversion means.

In still another embodiment of the invention, the apparatus comprises digital/analog conversion means which can generate at least all the reference values, control and switching signals for potential influencing performed, where applicable, during the transmitting and/or receiving operation of the transceiver function.

In even another embodiment of the invention, in the apparatus, an offset voltage source that is referenced to a higher supply potential can also be replaced by a supply voltage source which is referenced to a lower supply potential and can correspondingly be varied in an offset manner.

In another embodiment of the invention, the apparatus is part of an electronic module which is designed and can be wired or driven for only single-wire reception and/or single-wire transmission (utilizing one line driver).

In another embodiment according to the present invention, the electronic module is an integrated semiconductor circuit.

In still another embodiment of the present invention, the apparatus is part of an integrated semiconductor circuit which carries, in addition to the apparatus, at least the means for providing the transceiver function for the microprocessor or microcontroller to the bus medium.

In accordance with another embodiment of the invention, the transceiver function, which cooperates with the apparatus, is designed for communication according to the CAN standard and for connection to a CAN bus line network (CAN_H/CAN_L).

In accordance with another embodiment of the invention, the transceiver function comprises receiving means having at least one input for the connection of at least one bus wire and an output for connection to the receive input of the microprocessor or microcontroller, and transmitting means having an input for connection to the transmit output of the microprocessor or microcontroller and at least one output for connection to at least one bus wire. Here, the transceiver function can be operated at least in the two different operating modes "transmit and receive/NORMAL" and "no transmission—only reception/RECEIVE ONLY" and has an input port for the reception of a selection signal of the microprocessor or microcontroller for selection of one of these at least two operating modes.

In still another embodiment of the invention, the transceiver function comprises receiving means having two inputs for connection to the two bus wires and an output for connection to the receive input of the microprocessor or microcontroller, and transmitting means having an input for connection to the transmit output of the microprocessor or microcontroller and two outputs for connection to the two bus wires. The transceiver further comprises means which can set and/or reconfigure and/or adapt both the receiving means and the transmitting means to obtain the best possibility for emergency communication via the bus that still exists given the occurrence of a bus error which adversely affects normal communications via both bus wires. The transceiver further comprises bus error detection means and bus error evaluation means for conditioning at least one error or interrupt signal which can be output to the microcontroller, and also bus termination changeover means, which cooperate with the bus error detection means and can connect each of two termination elements. The two termination elements can be connected to two inputs of the transceiver function, to a bus wire assigned to it.

In another embodiment of the invention, the essential parts of the apparatus are arranged in a mobile test unit, which can be connected, on the one hand, to at least one bus wire and, on the other hand, to at least one terminating impedance in the electronic module and to the output of at least one transmission output stage of the transceiver function of the electronic module.

In even a further embodiment according to the invention, the apparatus comprises at least one changeover switch, by means of which the at least one output stage of the transmitting means of the electronic module can optionally be connected to the at least one bus wire or to at least one corresponding driving input of a backup means.

In accordance with another embodiment of the invention, the integrated semiconductor circuit carrying the apparatus is fabricated using high-voltage technology.

In yet another embodiment of the invention, the apparatus can be used for and (in this regard), is designed in or for one of the following: a transport means, a construction machine, a hoist, a control unit appertaining to automation technology, a control unit appertaining to electrical installation technology, a control unit appertaining to buildings technology, a control unit appertaining to heating technology, a control unit appertaining to air-conditioning technology, a control unit appertaining to alarm technology, a control unit appertaining to safety technology, a control unit appertaining to access control technology.

A number of exemplary embodiments are illustrated in the drawing and explained below. The method according to the invention and the apparatuses proposed according to the invention, and the elements of the said apparatuses, can be employed both in bus networks of single-wire operation and in bus networks of two-wire operation. When a two-wire bus network (following the CAN standard, for example) is used below in the drawing and description referring thereto, for the purpose of elucidation and functionality, this in no way represents a restriction of the invention to two-wire bus systems, but rather serves solely for avoiding text and repetition and thus for clarity.

In order to elucidate the method, firstly a few is simpler apparatuses will be explained which are expedient for "one-at-a-time" single-wire tests. Reference is made to the method in subsequent figures. Concluding figures illustrate further reaching apparatuses which are also suitable for "one-at-a-time" two-wire tests, permit a higher testing power and can readily be produced using semiconductor integration means, for example.

BRIEF DESCRIPTION OF THE DRAWINGS

FIG. 33 shows a schematic diagram of part of the apparatus functionality in a reception block according to FIG. 32;

FIG. 38 shows a schematic circuit diagram of a development detail of the apparatus according to FIG. 5 for acquiring and transmitting a reference-earth potential difference to a microcontroller;

DETAILED DESCRIPTION OF THE DRAWINGS

Figure 1:
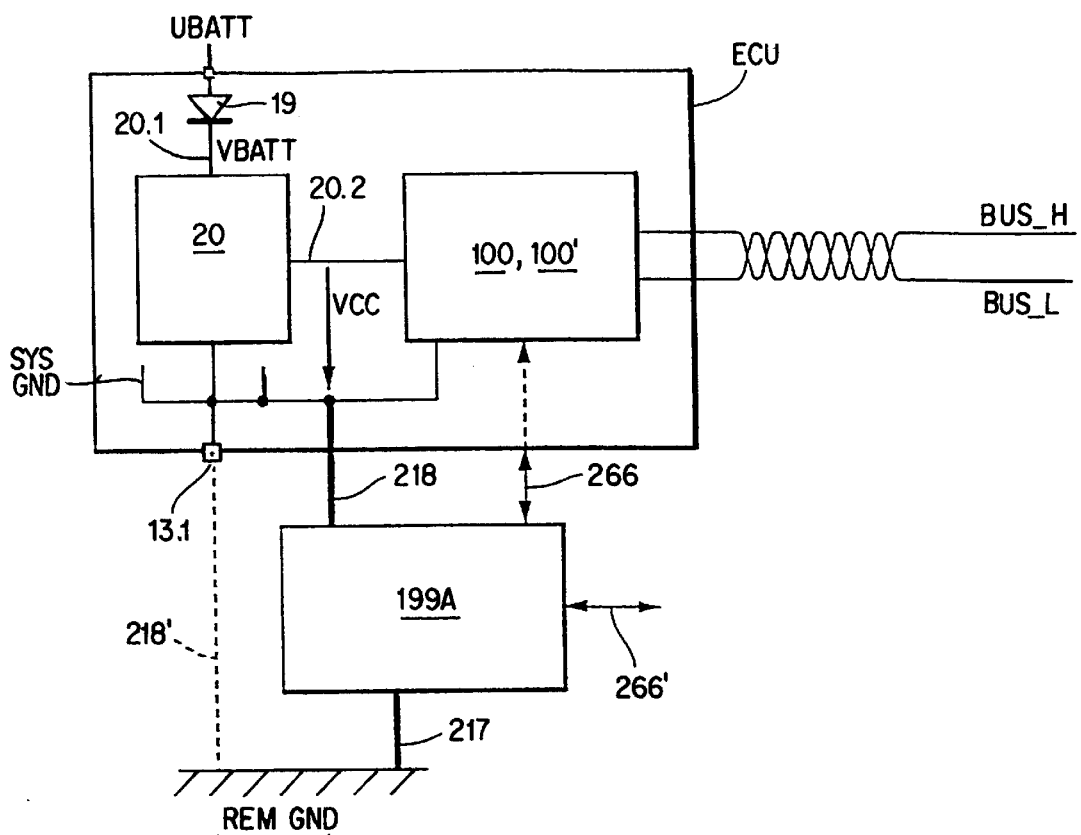
FIG. 1 shows a schematic block illustration of an apparatus according to the invention in the form of a simulation module in connection with an electronic unit with two-wire bus capability.

In FIG. 1, a simulation model 199A is connected to the normal (dashed) earth (ground) operating current path 218' of a bus subscriber ECU. This normal path runs between a subscriber-internal earth busbar SYStem GrouND (SYS GND)—routed to a connection terminal 13.1 of the subscriber ECU—and a feeding earth point REMote or REFerence GrouND (REF or REM GND) in the application environment. The supply circuit of the subscriber ECU is grounded by the subscriber-internal earth busbar SYS GND via the connections 217 and 218, which are emphasized in bold, and the simulation module 199A.

The operating voltage UBATT is fed to the bus subscriber ECU by a supply busbar (not illustrated). The voltage, if appropriately reduced to VBATT by a small voltage drop across a polarity reversal protection element 19, feeds the input 20.1 of a voltage regulator 20. The reference point of the voltage regulator is connected to the abovementioned earth busbar SYS GND. Also connected to the latter is the earth-side supply terminal of the bus transceiver 100, 100', to which a stabilized supply voltage VCC of 5 volts, for example, can be fed for the purpose of supplying power from an output 20.2 of the regulator 20. All the remaining electrical components in the subscriber ECU are also connected to the subscriber-internal earth busbar SYS GND.

The bus transceiver 100, 100' is connected to a two-wire bus BUS_H/BUS_L, via which the bus subscriber ECU can communicate with corresponding other bus subscribers.

It can be equipped for two-wire and single-wire reception. Here, a different response level may be effective in differential two-wire operation (in a wires-specific manner) from that in the case of reception only by the wire respectively under consideration. A connection 266 is provided between the bus subscriber ECU and the simulation module 199A. The connection may also equally exist between the bus transceiver 100, 100' and the simulation module 199A. In the event that the simulation module 199A is part of a mobile test unit, for example, it is also possible to provide a control connection 266', for example, to a computer or the like (not shown here).

Figure 2:
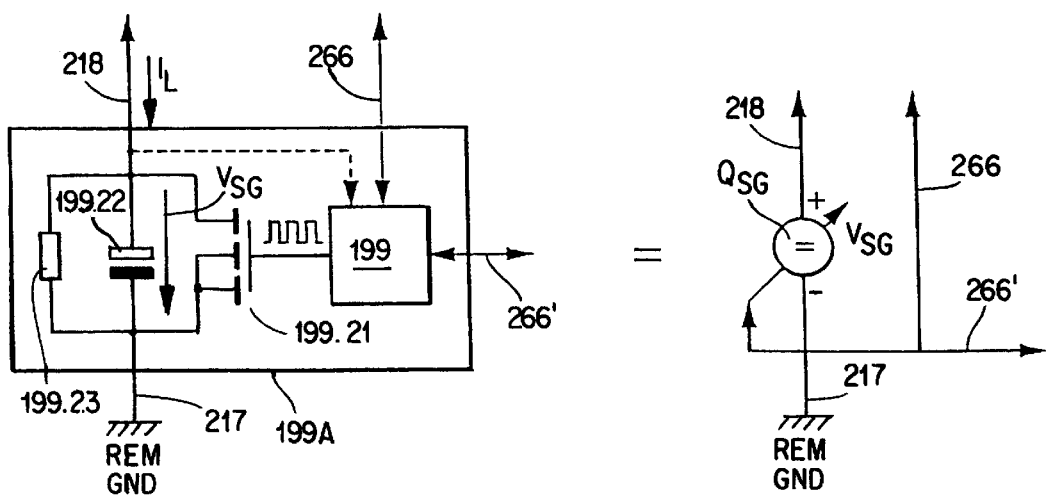
FIG. 2 shows a functional block diagram of a simulation module, forming an offset voltage source $Q_{SG}$.

The simulation module 199A may be constructed in accordance with FIG. 2, for example. Accordingly, the switching path of a switching transistor 199.21 of any desired type and a capacitor 199.22 may be connected between the terminals 217 and 218 of the said simulation module. Furthermore, a voltage-limiting element 199.23 may also be provided in parallel therewith. The switching transistor is driven by a potential control apparatus 199 with a PWM signal, for example. The result here is that an offset voltage VSG across earth GND is produced in accordance with the current flow $I_L$ in dependence on the duty ratio by virtue of smoothing via the capacitor 199.22. A possibility for feedback of the potential at the terminal 218 into the potential control apparatus 199 is also indicated by a dashed line. Evaluation of this potential enables the latter to be held via a corresponding tracking of the PWM duty ratio independently of the load current $I_L$.

Alternatively, the potential control apparatus 199 can be driven via the path 266 by a connected ECU or via the path 266', e.g., by a computer in a test unit or the like. In this respect, the simulation module 199A realizes a controllable voltage source $Q_{SG}$ which is referenced to earth GND and whose terminal voltage can be made to equal zero in the ideal case. This can be effected, for example, via a corresponding continuous driving of the switching transistor 199.21.

Figure 3:
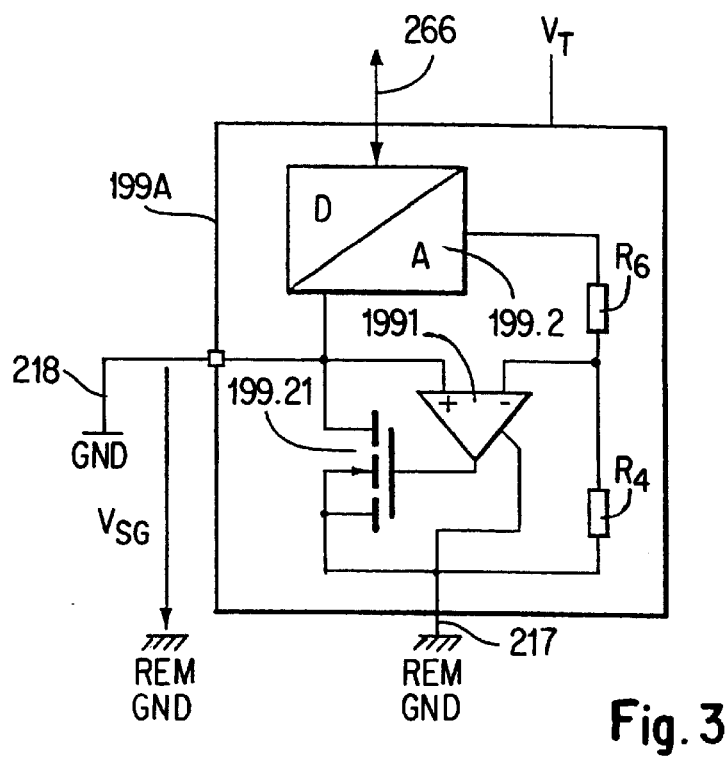
FIG. 3 shows a schematic circuit diagram of a corresponding module which permits digital setting of an offset voltage $V_{SG}$.

Instead of the offset voltage $V_{SG}$ being influenced by switching, such influencing can also be effected linearly in accordance with FIG. 3. For this purpose, the transistor 199.21 is driven by an amplifier 199I, which is connected by circuitry with resistors $R_4$ and $R_6$ as regulator with the transistor 199.21 as output stage. For this purpose, in a manner known per se, the non-inverting input of the amplifier 199I is connected to the terminal 218 and the inverting terminal is connected via the resistor $R_6$ to the analog output of a D/A converter 199.2. The latter can be fed, via a digital path 266, a specification which then determines the offset voltage $V_{SG}$ that effects a voltage drop across the transistor 199.21 and, in this respect, is established between the terminals 218 and 217.

Figure 4:
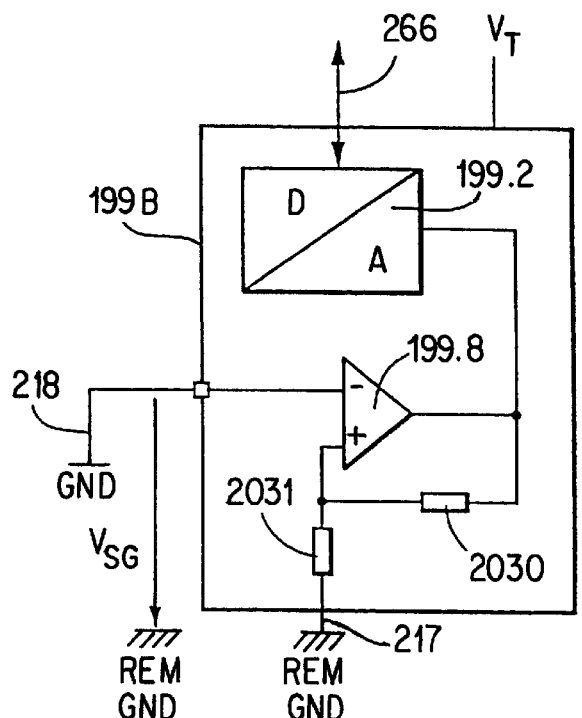
FIG. 4 shows a schematic circuit diagram of an apparatus section which permits digital acquisition of a voltage offset.

The additional apparatus 199B according to FIG. 4 permits acquisition and digital further processing of a voltage between its terminals 218 and 217, where an offset voltage $V_{SG}$ may preferably be involved. This is irrespective of how it comes about (present as a real error, or simulated by means of 199A for the purpose of testing).

Figure 5:
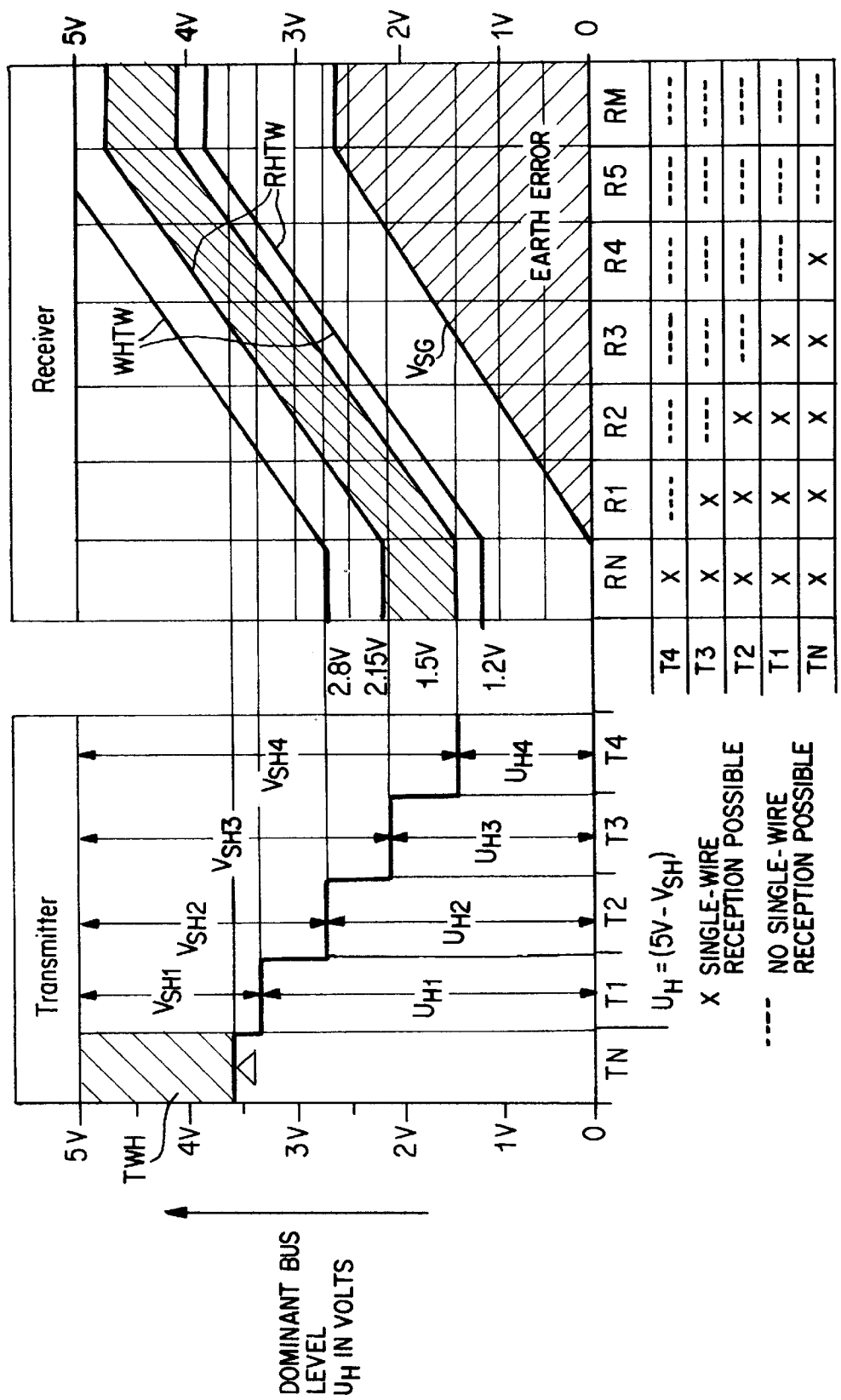
FIG. 5 shows a first diagram for illustrating level shifts in terms of transmission and reception, with regard to the single-wire reception capability.

The diagram according to FIG. 5 illustrates the single-wire reception capability when an erroneous earth offset-voltage $V_{SG}$ occurs in a receiver, when the bus level $U_H$ dominantly impressed on the bus core BUS_H by a transmitter is reduced in a step-by-step manner by an offset voltage $V_{SH}$. The following details enable the diagram to be explained as follows: TN denotes the Normal state in a transmitter in the network. Here, a 1.4-volt tolerance window TWH for the dominant H level from, for example, 3.6 to 5.0 volts is specified for this state. In this case, 5.0 volts represents the upper level fixed in a system-specific manner.

T1 to T4 designate four test states of a transmitter, during which the bus level $U_{H1}$ to $U_{H4}$ dominantly impressed on the bus core BUS_H is successively reduced by an offset voltage $V_{SH1}$ to $V_{SH4}$ which rises in a step-by-step manner and is referred to the dominant upper voltage of 5.0 volts. With regard to the receiver having an earth error, its Normal state is designated by RN; following this five further states with a monotonically increasing earth offset voltage VSG are designated by R1 to R5; and finally a steady state with a maximum earth offset voltage of, for example, approximately 2.6 volts is designated by RM. Furthermore, the reception window RHTW (in RN 1.5 . . . 2.15 volts) which is effective in a single-wire manner with regard to the bus core BUS_H is plotted in a hatched manner and a wake-up window WHTW (in RN 1.2 . . . 2.8 volts) which is effective in a single-wire manner is plotted—rendered distinguishable by its response thresholds. Against the earth offset voltage $V_{SG}$ rising in ramped fashion at the receiver, these windows are shifted in correspondingly ramped fashion from the state RN with no earth offset voltage as far as the state RM with $V_{SG}$=2.6 volts earth offset voltage. The diagram makes it possible to directly derive the table which is illustrated underneath it and which appertains to the reception possibility when, on the one hand, at the receiver, an earth offset voltage $V_{SG}$ is present and/or rises and the level $U_H$ dominantly impressed on the bus core BUS_H is reduced and/or the offset $V_{SH}$ is increased up to the upper voltage of 5 volts. It is evident that with an initially existing reception capability of a receiver subjected to an earth offset, this receiver is the first to lose its reception capability, before all the other receivers, against a successive increase in a transmitter of the offset voltage $V_{SH}$ or reduction in the dominant core voltage $U_H$ by this offset voltage.

Figure 6:
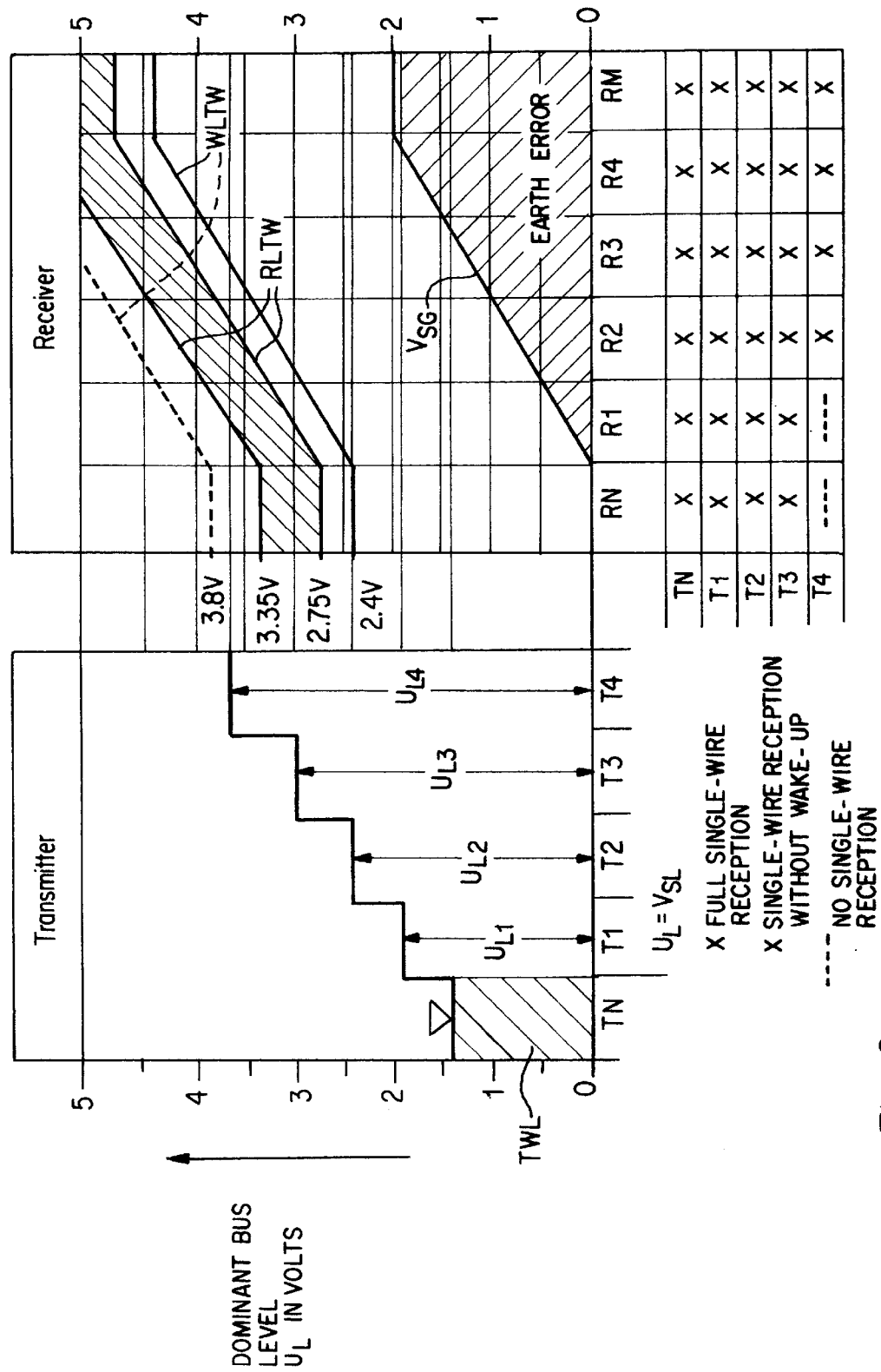
FIG. 6 shows a second diagram for illustrating level shifts in terms of transmission and reception, with regard to the single-wire reception capability.

The diagram according to FIG. 6 illustrates the single-wire reception capability when an erroneous earth offset-voltage $V_{SG}$ occurs in a receiver, when the bus level $U_L$ dominantly impressed on the bus core BUS_L by a transmitter is increased in a step-by-step manner by an offset voltage $V_{SL}$. The following details enable the diagram to be explained as follows: In this case, TN also, denotes the Normal state in a transmitter in the network. Here, a tolerance window TWL for the dominant L level from 0.0 to 1.4 volts is specified for example, for this state, where 0.0 volts represents the reference level fixed in a system-specific manner.

T1 to T4 designate test states of a transmitter during which the bus level $U_{L1\ to\ UL4}$ dominantly impressed on the bus core BUS_L is successively increased to an offset voltage $V_{SL1}$ to $V_{SL4}$ which increases in a step-by-step manner. With regard to the receiver having an earth error, its Normal state is again designated by RN. Following this five further states with a monotonically increasing earth offset voltage VSG are designated by R1 to R5. Finally, a steady state with a maximum earth offset voltage of, for example, approximately 2.0 volts is designated by RM. Furthermore, the reception window RLTW (in RN 2.75 . . . 3.35 volts) which is effective in a single-wire manner with regard to the bus core BUS_L is plotted in a hatched manner and a wake-up window WLTW (in RN 2.4 . . . 3.8 volts) which is effective in a single-wire manner is plotted—rendered distinguishable by its response thresholds.

Against the earth offset voltage $V_{SG}$ rising in ramped fashion at the receiver, these windows are shifted in a correspondingly ramped fashion from the state RN with no earth offset voltage as far as the state RM with $V_{SG}$=2.0 volts earth offset voltage. The diagram makes it possible to directly derive the table which is illustrated underneath it and which appertains to the reception possibilities when, on the one hand, at the receiver, an earth offset voltage VSG occurs and/or rises and the level $U_L$ dominantly impressed on the bus core BUS_L is increased. In this case, a differentiation has been made according to a single-wire full reception (communications reception within the reception window RLTW and wake-up reception within the wake-up window WLTW) and restricted reception (wake-up reception no longer possible).

Figure 7:
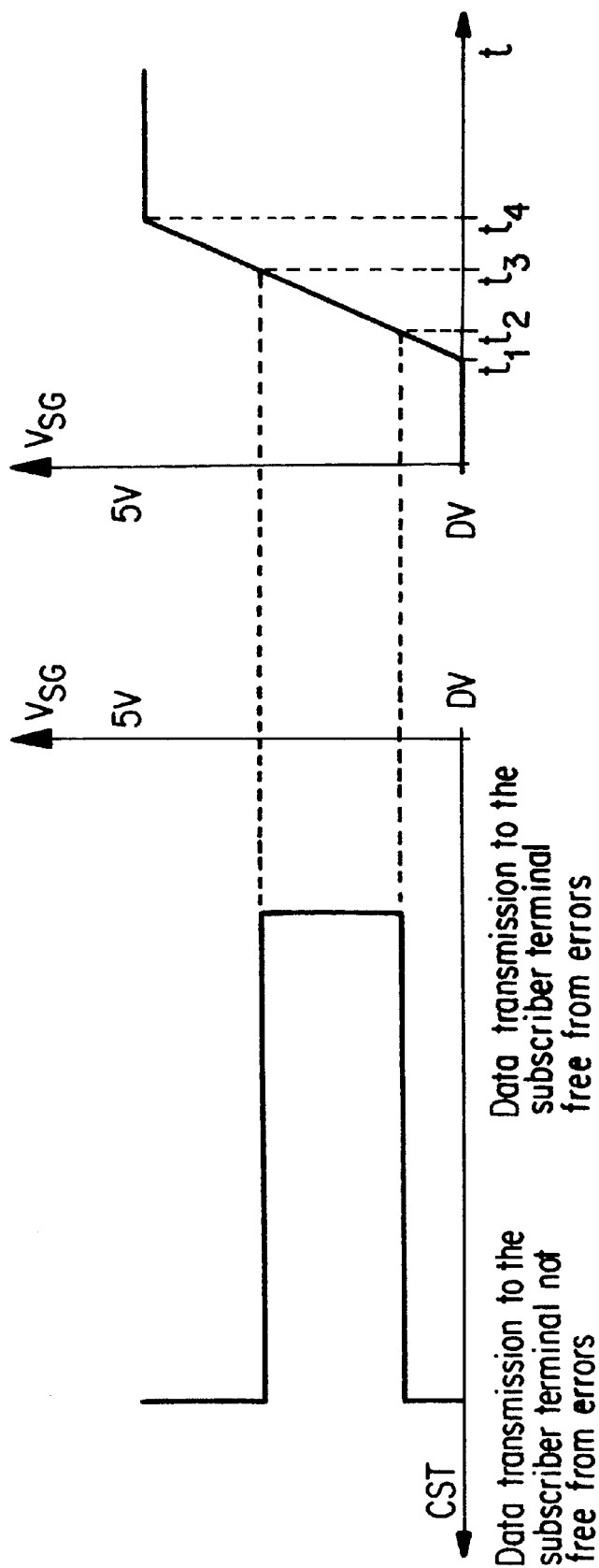
FIG. 7 shows a graphical illustration of the reception capability of a bus subscriber against ramped potential shifting in the course of performing the method.

FIG. 7 illustrates the communications status CST of the data transmission to a bus subscriber having an earth error here, by way of example. In this case, a simulation voltage $V_{SG}$ which rises in ramped fashion between time markers $t_1$ and $t_4$ is illustrated in the right-hand part of the diagram, and the left-hand part of the diagram shows the window that results between time markers $t_2$ and $t_4$ and within which it is possible to transmit data to the bus subscriber, or receiver in the latter, having an earth error. It is evident from this illustration that evaluation can be simplified if a simulation voltage having a stepped profile over time is used instead of a simulation voltage having a ramped profile, that is to say if a dominantly applied offset voltage value corresponds to each step from a fixed number of steps, applicable throughout the network.

It can also be understood from this illustration that with initial specification, in a transmitter connected to the bus, of a very high simulation voltage $V_{SG}$ and subsequent reduction of the same, that bus subscriber which is the first to acquire reception capability is the one that is sought, if appropriate, with the largest reference-earth potential error with respect to earth in the network—assuming otherwise entirely satisfactory functioning of the receiver.

Conversely, with initial specification, in a transmitter connected to the bus, of no or of a very low simulation voltage $V_{SG}$ and subsequent increasing of the same, that bus subscriber which is the last (after all the others) to acquire reception capability is the one that is sought, if appropriate, with the largest reference-earth potential error with respect to earth REM GND in the network, also compare FIG. 1.

Assuming that all the receivers in the network have, in whatever way, correct threshold values for message reception (within system-specific tolerance limits), at least with regard to their subscriber-internal reference-earth potential busbar SYS GND shown in FIG. 1, it follows from this that in the event of a monotonic alteration of the simulation voltage $V_{SG}$ at a transmitter and given constant load conditions on the bus or the bus core being tested, the sequence in which bus subscribers acquire or lose the reception capability enables a conclusion to be drawn regarding the relative levels of the offset with respect to the reference-earth potential REM GND in the case of these bus subscribers.

The method according to the invention makes use of this insight in that it applies universally both under single-wire and under two-wire test conditions. In the latter case, particular apparatus elements (compare FIGS. 31–33) within the receivers used in a bus network can enable further reaching evaluations than in the first case.

As is directly evident from FIG. 1 in light of the above, the way in which the receiver and/or transmitter of the transceiver 100, 100' or the latter's discriminant reception threshold values and/or dominant source level/s are increased in terms of potential or its/their operating levels which are effective with regard to the bus are corrupted is unimportant in each case (seen from the bus BUS_H, BUS_L). For the method according to the invention, it may already suffice, in principle to influence in terms of offset, with regard to a potential referred to throughout the network (REFerence GRounD), only those parts in the receiver and/or transmitter of the transceiver 100, 100' which determine the dominant source levels and/or reception threshold values which are effectively active with regard to REF GND, seen from the bus.

This is possible in by far and away the simplest manner according to FIG. 1 by virtue of the fact that all the electronic components in a bus subscriber ECU, in other words the entire bus subscriber, are or is increased by a simulation voltage $V_{SG}$, generated by the simulation module 199A, with regard to its internal reference-earth potential busbar SYS GND.

In this case, however, the simulation module 199A must be able to carry the entire operating current $I_L$ of the bus subscriber ECU. Such a solution is practical when, for example, a perfectly normal bus subscriber with no dedicated apparatus means for carrying out the method is intended to be made suitable and ready for carrying out the method as test subscriber using simple means and without any appreciable interventions. If the bus subscriber ECU in FIG. 1 is regarded as such a unit, in this respect only the reference point 217 of the correspondingly dimensioned simulation module 199A according to FIGS. 1–3 is to be connected to the potential REF GND, which serves as a reference throughout the network, and its output 218 is to be connected to the subscriber-internal reference-earth potential busbar SYS GND.

More effective are solutions which, in the sense of the above, influence the potential only of specific elements in the transmitter and/or receiver of the transceiver by means of suitable apparatuses. Reference is made to their exemplary implementability as fixed components of bus subscribers, in connection with FIGS. 10–38.

Nomenclature

For the purpose of clarity, the following description of the method is based on the phrasing below:

Test subscriber:

The test subscriber is a perfectly normal bus subscriber which is permanently connected to the bus and, for the purpose of carrying out the method steps, need only be equipped in the sense of FIGS. 10–39, or a correspondingly equipped test unit which is temporarily connected to the bus only for the duration of a test;

Defective subscriber:

The defective subscriber is in each case that subscriber connected to the bus whose communications capability is actually, or initially only presumably, restricted or lost on account of a reference-earth potential error or communications level error;

Observational subscriber:

An observational subscriber is each subscriber connected to the bus which can receive a message at least from the test subscriber, but also from the defective subscriber under certain preconditions, but is put into a RECEIVE ONLY status, in a manner governed by the diagnostic program, and is thus prevented from bus access in transmission terms.

Method preconditions

Figure 10:
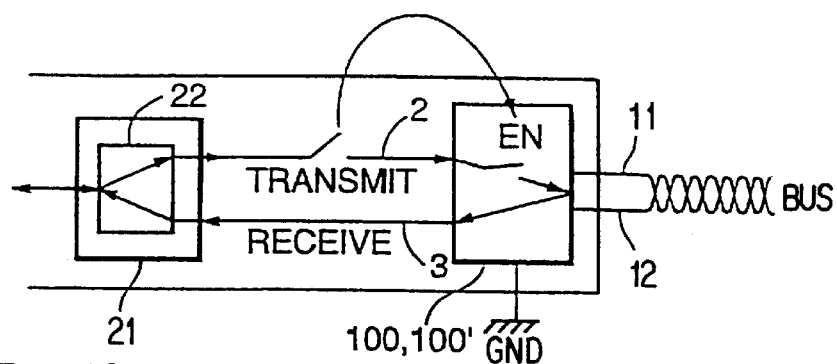
FIG. 10 shows a schematic illustration of the interruption of the transmission path for the purpose of keeping the bus free from response accesses.

The preconditions which must be fulfilled by all the subscribers in order to be able to participate in the method described below are as follows:

In accordance with FIG. 10, each subscriber has (a) a module for handling the bus protocol, of a CAN in the case of the example. In other words, for example, a CAN protocol module or a microprocessor or microcontroller 21 having a fixedly integrated bus or CAN protocol module 22;

(b) a physical layer in the form of a transceiver 100, 100' for transmission/reception coupling of the microprocessor or microcontroller 21 to the (two-) wire bus 11, 12; and (c) means and capability of assuming two different operating states in dependence on a control signal EN which can be communicated via the bus, namely the operating states of

NORMAL characterized by transmission capability of data messages via the protocol module and the transceiver onto the two bus wires and reception capability of data messages on the bus wires via the transceiver and the protocol module; and

RECEIVE ONLY characterized by suppressed or inhibited transmission capability and full reception capability of data messages on the bus medium via the transceiver and the protocol module. It is symbolized in FIG. 10 that the indicated interruptability of the transmission path 2, in the context of the invention, can equally well be realized in the transceiver 100, 100'.

The subscriber functioning as test subscriber is configured in such a way that it:

(1) is either connected to the known (for example, negative) reference-earth potential in a manner dictated by the construction, or it can detect and take into account a possible inherent potential shift with respect to the above-mentioned potential;

(2) can cause the remaining bus subscribers, through messages via the bus, to allow load currents to flow via their respectively dedicated reference-earth potential path;

(3) it can emit the abovementioned control signal EN; and (4) can cause the remaining bus subscribers, through messages via the bus, to broadcast no protocol acknowledgements (for example, positive/negative acknowledgements) themselves.

What is essential is that with regard to the determination of reference-earth potential errors, only the test subscriber needs to have apparatus elements as in FIGS. 13–30 and 34–38. Nevertheless, over and above the test subscriber, all the remaining subscribers (that is to say defective subscribers and observational subscribers) can also be configured in accordance with FIGS. 13–38 in respect of their apparatus equipment, since their activation or efficacy is controlled exclusively by software via the bus. In this respect, a mobile "test unit" (in the workshop sense) may also be any test subscriber of identical or similar configuration in the sense mentioned above which is temporarily connected up to the bus. It merely has to be furnished itself with the software for carrying out the method if it is intended to be the test subscriber.

Method

In an embodiment according to the invention, the method is structured into an "acquisition phase" and a "evaluation phase". All the subscribers connected to the bus are controlled by the bus subscriber functioning as test subscriber—which, as stated, may also be a temporally connected test unit in the workshop—by means of broadcast data messages. This test subscriber installs and alters, with regard to at least one bus core, a dedicated reference-earth potential offset—seen from the bus. Therefore, the test subscriber ultimately installs and alters its respectively corresponding source level to which the bus core is dominantly keyed by the test subscriber (in a predetermined manner), broadcasts data ("stimulus phase") and then ascertains whether data messages are received by bus subscribers without any errors or with errors ("response phase"). The two abovementioned phases can successively alternate one after the other. The two abovementioned phases taken together form the acquisition phase.

In a subsequent "evaluation phase", the results obtained in the acquisition phase can be evaluated. Given the presence of, for example, program-supporting knowledge about the flow of current in the connections of the individual bus subscribers to the reference-earth potential used throughout the network (individual connection, group or serial connection), impermissible potential shifts can be assigned to individual subscribers or to groups thereof. All the results obtained are included in this evaluation. This evaluation can be carried out in the test subscriber, but does not have to be. On the other hand, it can equally well be carried out in one or more connected evaluation units.

In this embodiment according to the invention, the method can be structured into steps as follows:

1/ a bus subscriber is determined as test subscriber which is capable, physically and with regard to potential errors which are possible in a system-specific manner, of communicating with each of the remaining bus subscribers as potential defective subscriber (that is to say with any system-typical potential error as cause of the potential disturbance of communication under normal conditions);

2/ the test subscriber broadcasts at least one bus message with the purpose of putting all the bus subscribers to be tested into an operating mode "Transmit no application messages";

3/ the test subscriber broadcasts at least one bus message with the purpose of putting all the bus subscribers to be tested into an operating mode "receive only, transmission not possible" (RECEIVE ONLY), as a result of which these subscribers become observational subscribers;

4/ the test subscriber broadcasts at least one bus message with the purpose of putting, from amongst the number of observational subscribers, a specific subscriber as (potential) defective subscriber into the operating mode "transmit and receive" (NORMAL);

5/ the test subscriber cyclically broadcasts at least one test message;

6/ the potential defective subscriber in the operating mode NORMAL acknowledges the test message as follows:

6.a/ if a test message is received without any errors by the defective subscriber, the defective subscriber sends a positive acknowledgement back to the test subscriber via the bus, 6.b/ if a test message is received with errors by the defective subscriber, the defective subscriber sends a negative acknowledgement back to the test subscriber via the bus, 6.c/ if a test message is not received by the defective subscriber, the defective subscriber sends no acknowledgement onto the bus;

7/ the test subscriber assesses a positive acknowledgment as truth status for the data transmission being free from errors, and a negative acknowledgement or the absence of any acknowledgement as truth status for the data transmission being errored;

8/ the test subscriber shifts at least one source level to which the (at least one) bus core used for testing is dominantly keyed;

9/ the test subscriber records the range of potential shifting of its (at least one) source level in which the test message is received without any errors in accordance with steps 6.a/ and 7/, and the range/s of potential shifting of the (at least one) source level in which the test message is not received or is received with errors in accordance with steps 6.b/ and 6.c/;

10/ with regard to at least one bus core used previously for the purpose of testing, the test subscriber sets a potential shift of the source level dominantly assigned to this bus core into the range in which the test data transmission was previously possible without any errors;

11/ once the testing of a defective subscriber has ended, the test subscriber broadcasts at least one bus message with the purpose of putting the defective subscriber into the operating mode "Receive only—transmission not possible" (RECEIVE ONLY), as a result of which this subscriber again becomes an observational subscriber;

12/ steps 4/ to 11/ are repeated for observational subscribers of specific interest or for all observational subscribers;

13/ the test results are evaluated;

14/ the bus network is returned to its nominal operation by the test subscriber.

In this case, steps 2/ and 3/ can be interchanged and steps 13/ and 14/ can be interchanged.

In an embodiment of the present invention, steps 5/ to 9/ can proceed in order or be carried out simultaneously.

In still a further embodiment according to the invention, the shifting of the at least one source level in accordance with step 8/ can be carried out in a ramped manner over time, monotonically step-by-step.

Furthermore, according to the invention, the shifting of the (first) source level in accordance with step 8/ can be carried out alternately with the shifting of a further (second) source level in accordance with a predetermined shifting step pattern.

In still another embodiment of the present invention, the method may furthermore provide a step:

15.a/ according to which, after step 1/ and before step 4/, the test subscriber broadcasts at least one bus message with the purpose of putting a bus subscriber which is to be invoked as defective subscriber into an operating mode "subscriber load currents switched on".

In an alternative to the present embodiment of the invention to this, the method may furthermore provide a step:

15.b/ according to which, after step 1/ and before step 4/, the test subscriber broadcasts at least one bus message with the purpose of putting all the bus subscribers into an operating mode "subscriber load currents switched on".

As a result of the two steps mentioned in the embodiments above, potential tests, in particular with regard to reference-earth potential shifts dictated by the current consumption, can be carried out only in the defective subscriber given a moderate overall current consumption in the bus network or in all the remaining subscribers (defective subscriber and observational subscribers) given an appropriately high overall current consumption in the bus network.

According to another embodiment of the invention, the method may furthermore provide a step:

16/ according to which, during all the steps which follow step 1/ up to step 4/, for the purpose of broadcasting at least one bus message, the test subscriber shifts at least one source level to which the (at least one) bus wire used for communication is dominantly keyed.

In still another embodiment of the invention, the method may further provide for the test subscriber to be a bus subscriber which is permanently connected to the bus and by this bus subscriber at least after each new start-up of the bus network as subordinate to the normal bus operation with regard to all the bus subscribers.

In the present embodiment, the method provides for the evaluation results which are to be obtained during the check of all the bus subscribers at least after each start-up of the bus network to be stored in the test subscriber or a bus subscriber which can be selected by the latter.

In an embodiment, the method according to the invention can be implemented in a one-wire or two-wire manner. In the latter case, the test subscriber can drive both bus cores for the purpose of testing. In this embodiment, the method furthermore provides for step 8/ to take place with step 5/ at least at times in a message-interlinked manner step by step and each test message to contain an expectation number from the defective subscriber to be tested. Here, the interlinking may advantageously be bit-block-based.

Figure 8:
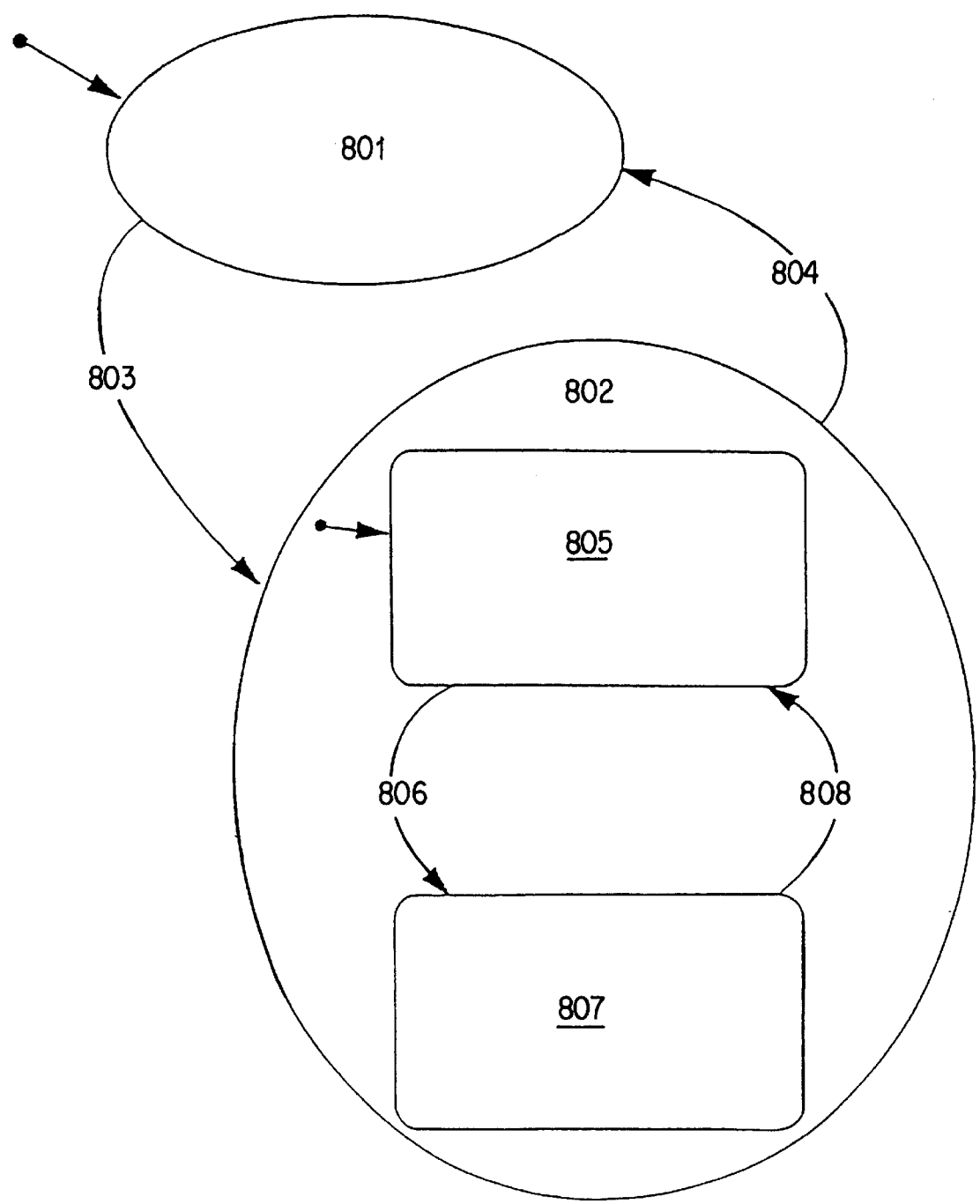
FIG. 8 shows an exemplary state diagram of a bus subscriber in the course of performing the method.

FIG. 8 illustrates, for example, a state diagram of a subscriber as (potential) defective subscriber which is to be tested under load current conditions in order to be able to identify and determine a possibly impermissibly high voltage drop in its earth line as the disturbing cause of possible communications interference.

Figure 9:
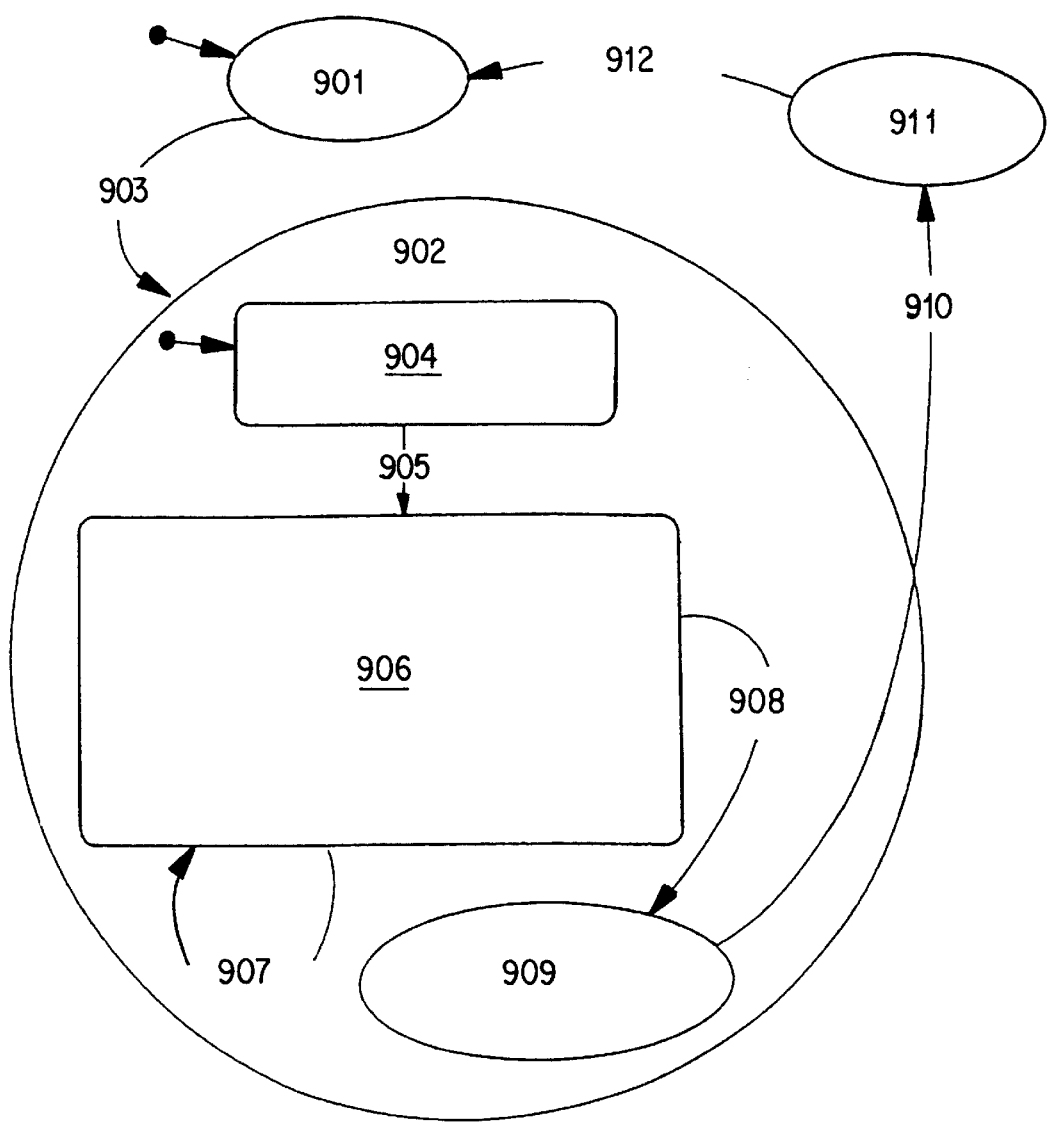
FIG. 9 shows an exemplary state diagram in the course of implementing the method of that bus subscriber which performs the steps of "recording phase" (during the test state) and "evaluation phase" (during the evaluation state)

In FIG. 8, the following numerals represent
801=Nominal operation
802=Test
803=Command from the test unit via CAN
804=Command from the test unit via CAN
805=Potential test passive
  switch on load currents
  transmit no message
  "transmission not possible"
  "reception"
806=Command from the test unit via CAN
807=Potential test active
  switch on load currents
  transmit no message
  "transmission"
  "reception"
808=Command from the test unit via CAN FIG. 9 illustrates, for example, a state diagram of a test subscriber for the simple case of the earth error potential test, from which the division in two into an acquisition phase (during the test state) and an evaluation phase (during the evaluation state) is evident. Here, the arrows starting from points designate default inputs of the method in both cases.

In FIG. 9, the following numerals represent
901=Nominal operation
902=Test
903=Command from the user
904=Initialization of potential test
  All test specimens→test state (potential test passive)
905=Initialization concluded
906=Potential test
  Test specimen→potential test active
  Adjust ramped potential shifting
  Record ranges of potential shifting with error-free communication
  Record ranges of potential shifting with nonerror-free communication
  Put potential shifting into range of error-free communication with regard to the test specimen
  Test specimen→potential test active
907=All test specimens
908=All test specimens tested
909=End potential test
  All testing specimens→nominal operation
910=Test concluded
911=Evaluation
912=Evaluation concluded The above-described handling of potential errors in accordance with the method of the present invention at least presupposes that the transmission path between a microcontroller 21 or its bus protocol module 22 and the bus wire connection (single-wire network) or the bus wire connections 11 and 12 (two-wire network) can be interrupted in some way such that the bus can be kept free of undesirable transmission accesses. This is symbolized in FIG. 10. An operating mode RECEIVE ONLY of the bus transceiver 100, 100' is used for the realization. Here, the operating mode is applied by hardware.

Figure 11:
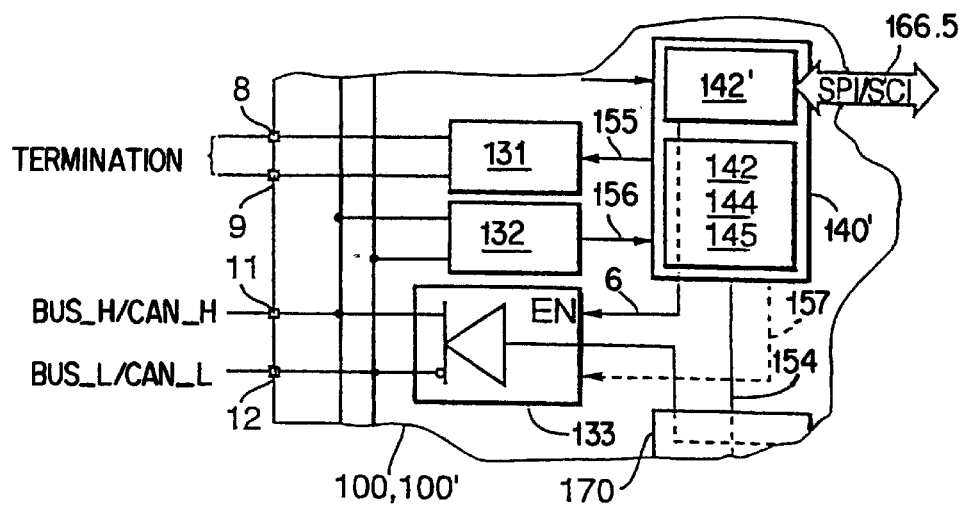
FIG. 11 shows an extract from a block diagram of a circuit or module for illustrating a softwarebased realization of such an interruption.

According to FIG. 11, the operating mode RECEIVE ONLY and hence disconnection of the bus from transmission accesses can be effected, for example, from a microcontroller via a control bit EN, which can be transmitted (firstly via the path 166.5 and then) via a path 6 to the transmitting means 133 of the bus transceiver. Only when the control bit EN has the prescribed logic level is the bus also available to transmission access by the transceiver, otherwise it is not available. This detail is illustrated for the exemplary case of an SPI implementation in FIG. 11.

Figure 37:
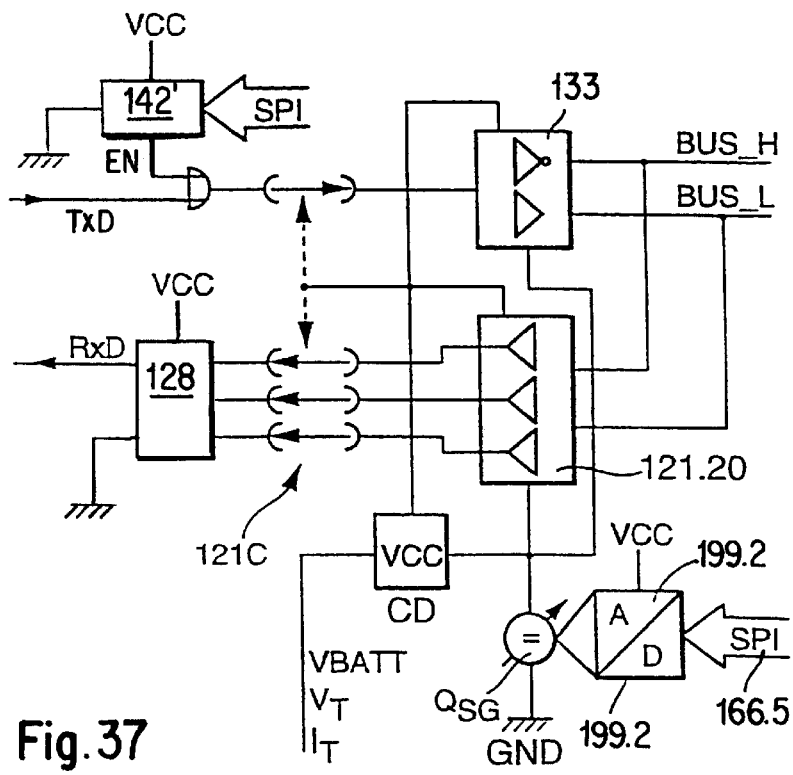
FIG. 37 shows a further block circuit diagram of apparatus elements in accordance with FIG. 12 and FIG. 32 which are restricted to specific applications, relating to the receiving end of the transceiver function.

In this case, a (not illustrated) microprocessor or microcontroller communicates with the bus transceiver 100' via the SPI/SCI bus 166.5. Consequently, the EN bit is transmitted here in a logged manner to the bus transceiver 100'. Ultimately (in this case), an EN bit which enables or inhibits the transmitting means 130 or the transmission output stage 133 is generated by decoding, stored and/or overwritten in a control block 140' of a corresponding bus transceiver 100' or 100.11. This control block has SPI communications capability. In the figure, therefore—as part of such SPI implementation, the block 142 which sets the operating modes of the transceiver 100' in accordance with an instruction from the microcontroller and which is illustrated there combined with blocks 144 and 145, is assigned at least one storage register 142'. This storage register 142' holds the respectively received operating state information until it is overwritten by the reception of more up-to-date information. This store also at least comprises a cell for the abovementioned SPI-decoded EN signal for the output stage 133. The path 6 from this store to the transmission output stage 133 within the block 140' is indicated by a dashed line. The at least one store for the EN bit is also illustrated in FIG. 37.

Figure 12:
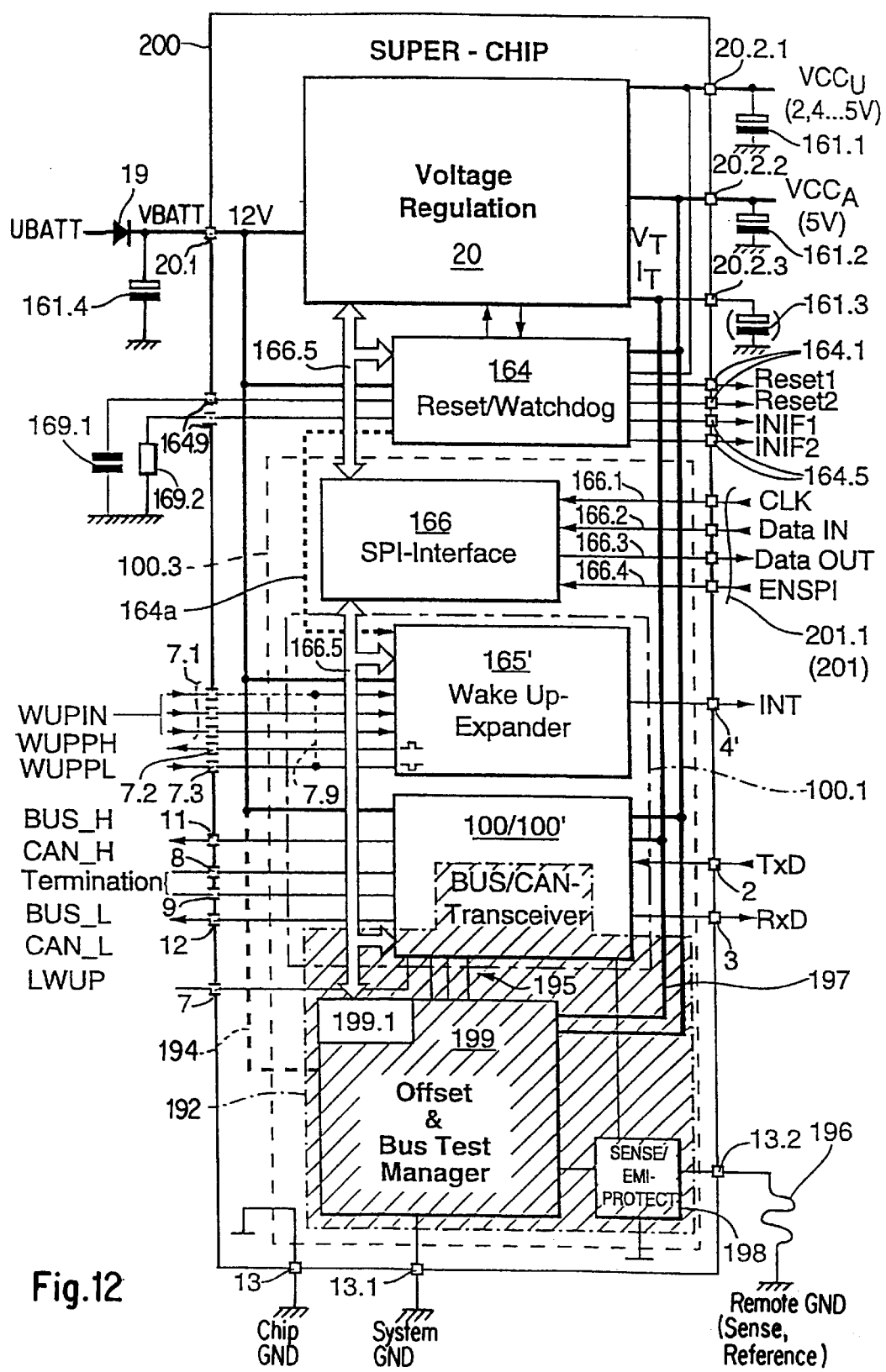
FIG. 12 shows an illustration of the integration of an apparatus according to the invention in a more complex unit together with a bus transceiver.

FIG. 12 illustrates a functional block diagram of a more complex circuit or electronic module 200. Such a circuit is described in more detail for example, in the application PCT/EP96/05087 which was filed on Mar. 26, 1996. For details, reference is made to the entire contents of PCT/EP96/05087 which is hereby incorporated in its entirety. In the context of the present invention, what is relevant (essentially) is only the potential influencing means 199, which are dealt with there for implementation of the method, connected 195 to the bus transceiver 100, 100' and their digital path via 166.5, 166, 201 or 201.1 to the (not illustrated) microprocessor or microcontroller. For details of the bus transceiver, reference is made to FIG. 40 taken from the abovementioned parallel application PCT/EP96/05087, and to FIGS. 40 and 41 from the priority application. Explanations concerning FIG. 42 may be found at the end of the description of PCT/EP96/05087. In order to facilitate any reference, if required, designations used in the parallel application are consistently used in this case as well.

The potential control apparatus 199 enables a circuit or electronic module 200 which is constructed in such a way or similarly and in any event includes at least one bus transceiver 100, 100' and identical or similarly acting or utilizable means for communication with a microcontroller 21 to afford (throughout the network) the location, detection and handling of operating level errors and reference-earth potential errors in or at bus subscribers. A clarification is provided below of what is to be understood by reference-earth potential errors with regard to both bus cores, for example, in the case of motor vehicles as carriers of two-wire bus systems.

All the control units of a motor vehicle are mechanically connected to the vehicle body as fixing surface and are directly electrically connected to the vehicle body as reference-earth potential surface (vehicle earth). In this case, the vehicle earth serves, on the one hand, as distribution conductor for closing the operating circuits of loads and control units and, on the other hand, also as reference-earth potential surface for wire bus signals, as in the present case.

The operating current flow between control unit and vehicle earth unavoidably produces a certain small voltage drop, by which the earth potential internally in the units (System GND) is raised above the vehicle earth. Depending on the design of this earth connection and the current flow therein, the consequence is that there are slightly differing earth potentials (System GND) internally in the units. As a direct consequence, although supply voltages which are regulated to a fixed value internally in the units may be exactly the same in all the control units, the potentials of the corresponding supply busbars internally in the units with respect to the vehicle earth are not. This also applies analogously, for example, to threshold values or dominant feeding potentials of reception discriminators in the receiving section 120, 120' or of line drivers 133L and 133H in a transmitting section 133 as in the present case as parts of the transceiver 100, 100'.

Figure 31:
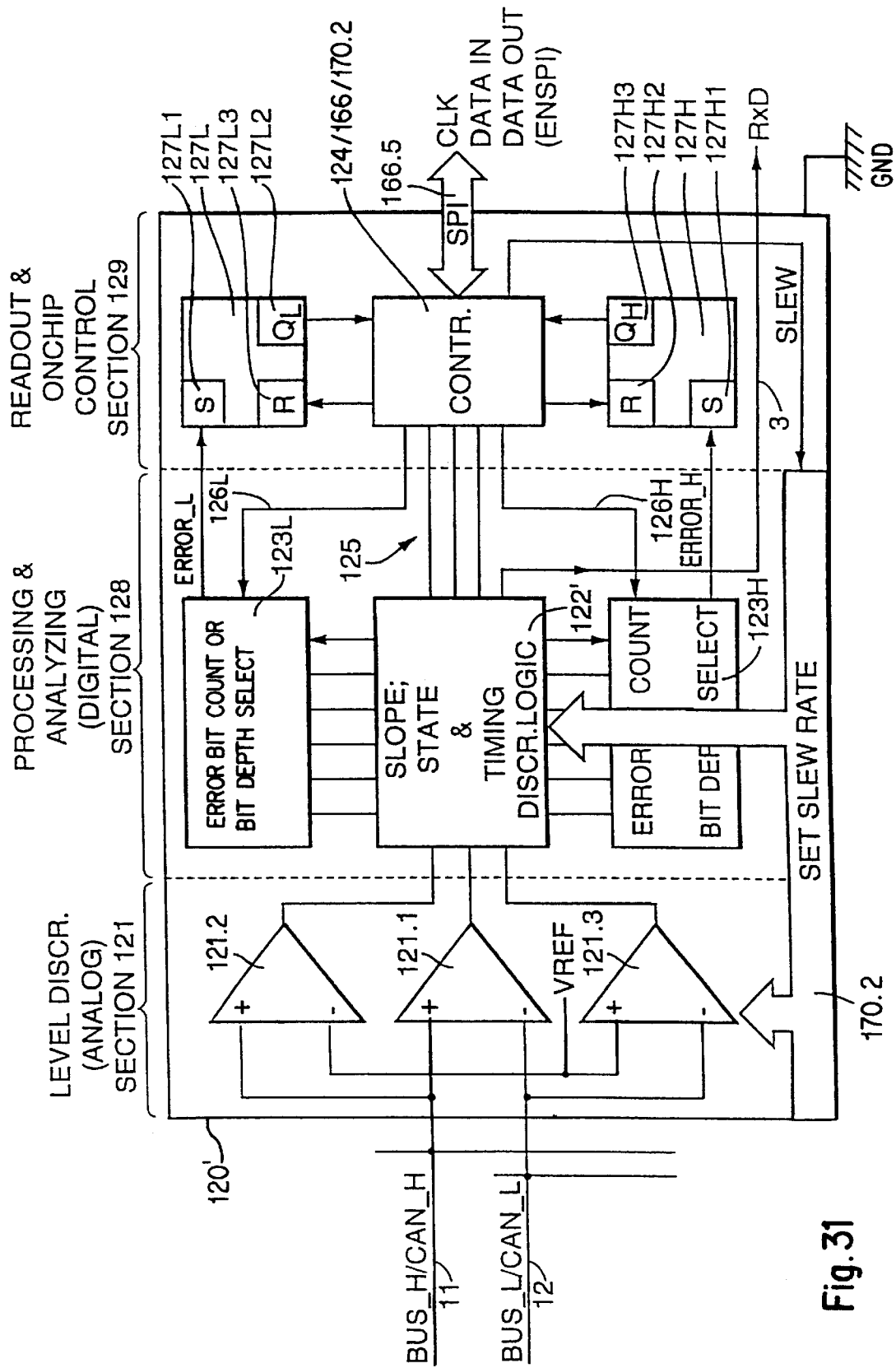
FIG. 31 shows a function block diagram of a reception block within a bus transceiver, e.g., in a semiconductor circuit which is equipped with additional apparatus elements.

If there is poor contact, or contact that is impaired by corrosion, for example, between the earthing cable of a control unit (through which cable the operating current flows) and the body, the "offset error" of the earth potential (SYStem GND) internally in the unit relative to the corresponding internal earth potentials of other control units may become impermissibly large. As a consequence, e.g., the threshold value VREF of the reception discriminators 121.2 and 121.3 in FIG. 31 are then shifted beyond a bus-specifically permissible tolerance range, and in particular relative to the corresponding threshold values of other bus subscribers. Thus, the recessive bus level window for this receiver may even be shifted to such an extent that reception is no longer possible.

In order to enable maximum availability of large wire bus networks with many subscribers under harsh operating conditions, the purpose of the apparatus according to the invention is to impart to a corresponding bus system (line network and subscribers) not only the capability of locating and verifying such defective bus subscribers but also the capability of latent testing and monitoring of the operating level windows of all the subscribers. In essence, to provide the capability of obtaining and constantly updating a measure which describes the margin that presently exists for one or more bus subscribers in each case before it or they undergo failure caused by a level error (in addition to other aspects, this measure is the most important one with regard to defining the bus quality).

In the case of a motor vehicle, a service station, during each service, can thus immediately obtain an impression of the overall state of the physical-communicative matching of the transceivers in the bus network with regard to one another and, if necessary, carry out precautionary or maintenance work in a highly targeted manner with minimum outlay. It is evident that in a motor vehicle having a very large number of such circuits in very many control units connected to the vehicle earth, intervention possibilities which are supported in this way, before the actual occurrence of the error situation, avoid unnecessary service outlay and increase the availability of the motor vehicle.

In the text below, a (semiconductor) circuit is discussed under the designation 200, for the sake of simplicity. A conventionally produced electronic module with comparable or similar functionalities may also equally well be involved in this case, without thereby leaving the scope of the invention. In particular, such a circuit or such a module may also be, within the scope of the invention, part of a specific bus test unit.

The invention is realized, in terms of the apparatus, in the potential control apparatus 199 this apparatus can be influenced via a digital path (for example, according to the SPI standard; SPI =Serial Parallel Interface) in connection with quite specific apparatus elements in the bus transceiver 100, 100' for precisely, at least in the transmitting section 133 (not presented in the figures in this case) of the said bus transceiver (FIGS. 29–45).

Further apparatus elements are also provided in the receiving section 120 (not presented in the figures in this case) for maximum testing flexibility (FIGS. 46–52). These elements and the way in which they can be realized, for example, without restricting the generality in order to interact with the potential control apparatus 199, will be described below.

The purpose of the following apparatus elements, is the influencing (which has already been explained above as more effective, in connection with FIG. 1) in the matter of potential shifting wherever this is possible in an optimally reproducible manner with a minimal amount of power loss, namely in the or at the bus transceiver 100, 100'.

In this case, the potential control apparatus 199 (OFFSET & BUS TEST MANAGER) can be connected, for example, via a particular terminal 13.1 to a reference-earth point SYSTEM GND in the unit carrying the circuit 200. Furthermore, the potential control apparatus 199 can additionally be fed (preferably, via an upstream apparatus element 198 (SENSE/EMI PROTECTION)) an external reference-earth potential REMote GND from the application environment of the relevant unit via another particular terminal 13.2. The line 196, in any event, symbolizes a connection which (in the abovementioned example of a vehicle) can be routed from the relevant unit to an earth point on the vehicle body. This earth point is essentially free from current loading.

The potential control apparatus 199 is operatively connected to the transceiver 100, 100' in a manner of greater or lesser complexity, which is intended to be symbolized by the multiple path 195. Attention is already drawn at this point to the fact that this complexity may result from the fact that the potential control apparatus 199 (for instance, in a semiconductor circuit) may be connected to a greater or lesser extent to control structures of the transceiver 100, 100' (comprising receiver and/or transmitter) and/or the SPI interface 166, which establishes a connection to a microcontroller 21, for example, or may even be properly embedded in such structures. In order to characterize and elucidate the functionality which is made possible by the potential control apparatus 199, an explanation is given below of specific transmitter and receiver designs which interact with the potential control apparatus 199 in order, for example, together with the interface 166 and a microcontroller 21 (not shown here) of the electronic unit, to enable the above-described "intelligence" for the purpose of automatic locating and determining potential errors and for the purpose of error margin monitoring in conjunction with suitable network management software.

For the purpose of supplying power to digital circuit functions in the potential control apparatus 199, the latter may be supplied with power from the potential VCCA from the output 20.2.2 of the block 20A. In this case, this is a voltage regulator, for example. Attention is expressly drawn to the fact that the invention is in no way bound to the presence of power supply parts together with the bus transceiver 100, 100' in one and the same circuit or electronic module 100; the combination made here has only a non-restrictive exemplary character.

Figure 13:
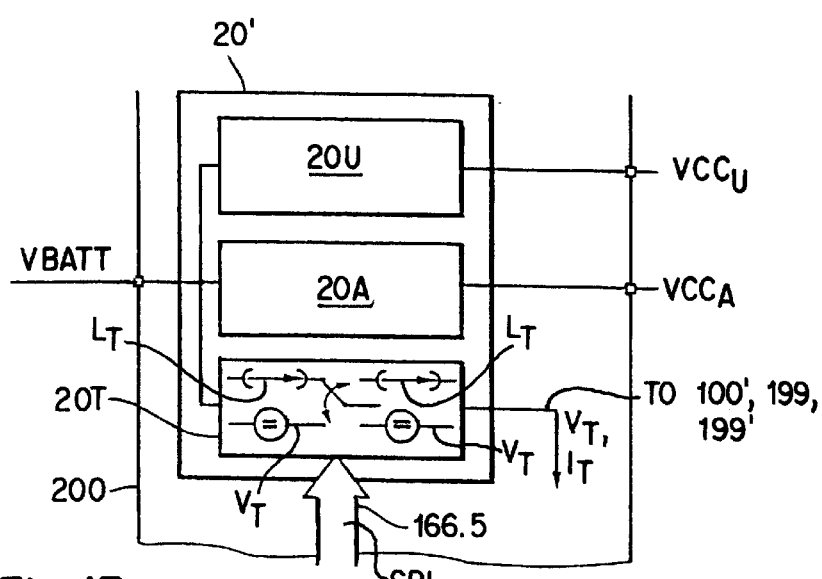
FIG. 13 shows a function block diagram of a power supply which comprises a supply path for providing an auxiliary voltage $V_T$ or an auxiliary current $I_T$ for the purpose of supporting the inventive apparatus and elements which cooperate therewith in a bus transceiver.

In the present case, the voltage regulation 20 may optionally comprise, in addition, at least one third regulator 20T for a further supply potential $V_T$ or else a fixed supply current $I_T$, as illustrated in FIG. 13, from which the potential control apparatus 199 (and also the bus transceiver 100, 100', if required) can be supplied via a feeding path 197. That is to say supplied with a high degree of decoupling with respect to the output 20.2.2 of the regulator 20A having the potential $VCC_A$.

As a rule, the voltage $V_T$ will be higher than the voltage $VCC_A$, depending on the realization of the potential control apparatus 199 and on the degree to which different features are formed (for example single-wire or two-wire testing capability, small- or large-swing level testing capability, etc.) and the production technology of the elements 100, 100' and 199. The terminal 20.2.3 shown in FIG. 12 can, in this respect, be provided (only) for the connection of a filter capacitor 161.3, that is to say not for supplying other circuits or unit components, or for external monitoring purposes, particularly if a current source output is involved, for example. As is evident from FIG. 13, the block 20T may also be designed in such a way that its output quantity can be changed over between a voltage $V_T$ and an impressed current $I_T$, in this case, for example, under control access via the SPI path 166.5. Such a design, in interaction with circuit structures in the potential control apparatus 199 and in the bus transceiver 100, 100', can effect, inter alia, the automatic changeover or switching on and off of the functions of such structures.

In by far and away the simplest case, the potential control apparatus 199 only comprises means which allow the so-called dominant level window at least of the output stage 133 of the transceiver 100, 100' to be influenced, in particular to be increased, with regard to a reference potential.

Figure 14:
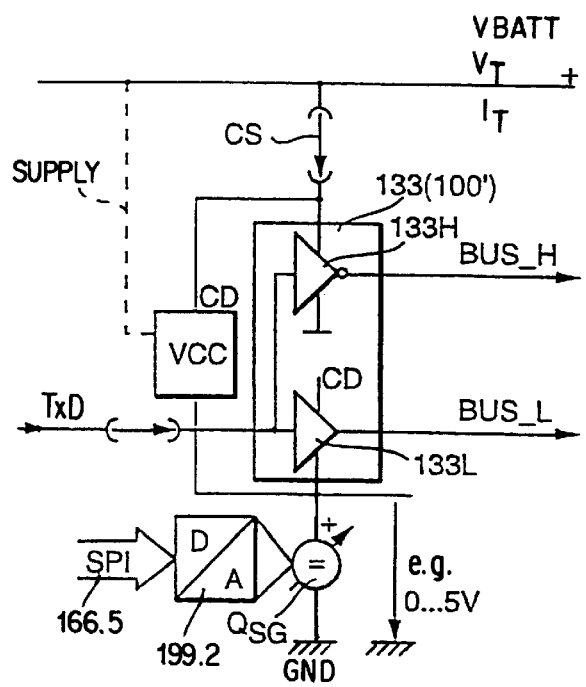
FIG. 14 shows a simplified block circuit diagram of apparatus elements according to FIG. 12, for example, relating to the transmitting end of the transceiver function.

This is illustrated in FIG. 14. In this case, a D/A converter which is also incorporated in 199 and is driven via the digital path 166.5 is provided for the specification of a voltage value which acts on a controllable offset voltage source $Q_{SG}$. This effectively appears looped into the current path of the "normal" earth connection of the output stage 133 to the potential GND, which is also possible in the case of integration by suitable monolithic insulation of diverse components of the output stage 133.

In order to keep the supply voltage VCC of the output stage 133 constant, a voltage clamp or a voltage regulator CD is connected in parallel with the said output stage. In the first case, the output stage can preferably be supplied with power via a current source CS from a supply busbar at a correspondingly high potential VBATT or $V_T$, and from the regulator CD in the second case, in which case the regulator CD can then be fed by the said supply busbar via the supply path SUPPLY indicated by a dashed line. The current source CS can also be entirely omitted if it is possible to supply the output stage 133 by means of an impressed current $I_T$ from the regulator 20T in accordance with FIG. 13.

In the simplest case, the controlled voltage source $Q_{SG}$ can be realized by an impedance converter which converts the output voltage swing of the D/A converter 199.2 in a ratio of essentially 1:1 to a source impedance which is appropriate to the feeding current of the output stage 133.

With this apparatus, it is thus possible, in accordance with a digital specification at the D/A converter 199.2, to shift the dominant feeding level window (difference between the source levels of the two core output stages 133L and 133H), which is kept constant by the voltage clamp or the voltage regulator CD, in the direction of higher voltage values. It is thus possible for this variable voltage swing to amount to 0 to 5 volts, for example, which results in a feeding H source level of up to 10 volts with regard to the bus network. In order to bridge the consequently variable driving voltage swing of the output stage inputs, logic driving of the output stages with the transmission signal TxD by means of an impressed current path is provided here, by way of example.

A potential control apparatus 199 configured in this way, in conjunction with a correspondingly equipped transmission output stage 133, thus permits an error voltage to be simulated at the transmitting end by means of digital setting data which are obtained via the path 166.5. Here, the error voltage, in the case of a bus transceiver, no longer allows normal communication, in particular normal reception, in a bus subscriber with an earth error.

Given an appropriate magnitude of the terminal voltage of the source $Q_{SG}$, the error voltage in the case of the receiver subjected to reception interference can thus be compensated for, at least partly or completely, across the entire bus termination (i.e., terminating load of all the remaining subscribers and, if appropriate, an additional error load).

The terminal voltage of the source $Q_{SG}$ is expediently adjustable in a defined manner, in particular can be altered at least in steps, that is to say, given a corresponding stepped nature (for example, in staircase or ramped fashion to a greater or lesser extent) over time in accordance with respective specifications via the digital path 166.5.

Figure 15:
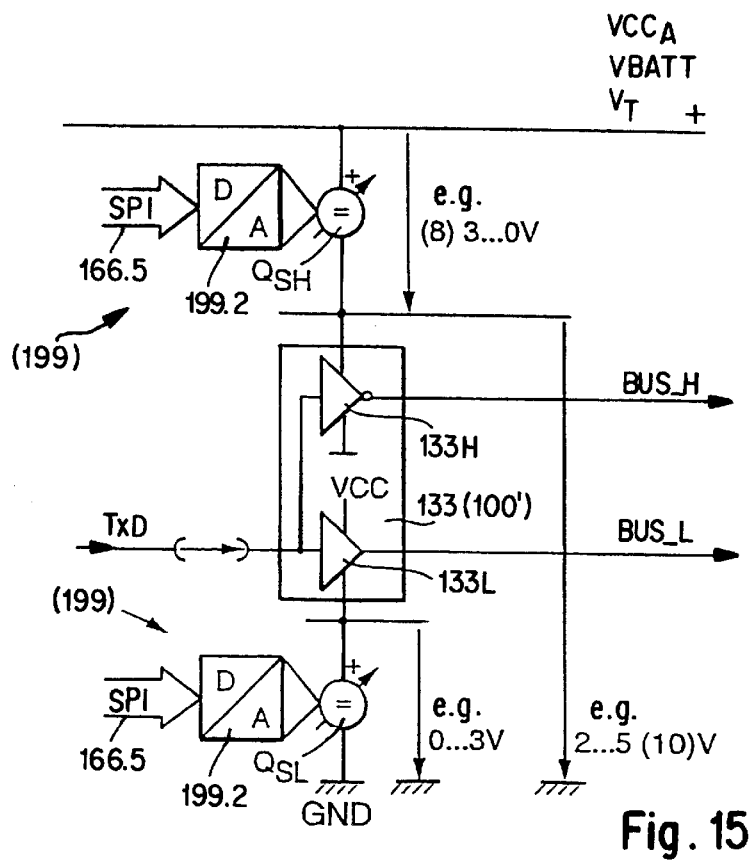
FIG. 15 shows a further corresponding block circuit diagram of apparatus elements, relating to the transmitting end of the transceiver function.

In accordance with FIG. 15, with regard to the transmitting end, the apparatus may equally well comprise two separate controllable offset voltage sources $Q_{SL}$ and $Q_{SH}$, the source $Q_{SL}$ corresponding to that described above. In order to raise the negative supply potential of the core output stage 133L, the source $Q_{SH}$ is connected in such a way that it permits a correspondingly digitally controllable alteration of the positive supply potential VCC or VBATT or $V_T$ of the core output stage 133H. In this case, therefore, the L source level feeding onto the bus can be altered independently of the H source level feeding onto the bus, and vice versa.

For example, the controllable offset source $Q_{SL}$ may sweep across a voltage swing of $_0$ to 3 volts and the controllable offset source $Q_{SH}$ one of 8 or 3 to 0 volts. Depending on the magnitude of the supply potential of the offset source $Q_{SH}$, in this apparatus it is thus possible to adjust the dominant L source level from 0 to 3 volts and the dominant H source level from 3 or 8 to 0 volts.

Figure 18:
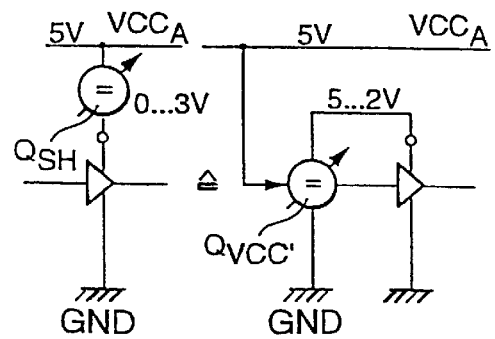
FIG. 18 shows a schematic illustration of supply sources which correspond to one another or can be converted into one another, and are equivalent in this respect.

Reference is made to the elucidating illustration in FIG. 18, according to which, within the scope of the present invention, it is unimportant to which of two supply potentials an offset voltage source is referenced. For example, an offset voltage source $Q_{SH}$ adjustable between 0 and 3 volts underneath a supply busbar VCC, with 5 volts being equivalent to an adjustable offset voltage source $Q_{VCC}$, across GND with an adjusting range from 5 to 2 volts.

Figure 21:
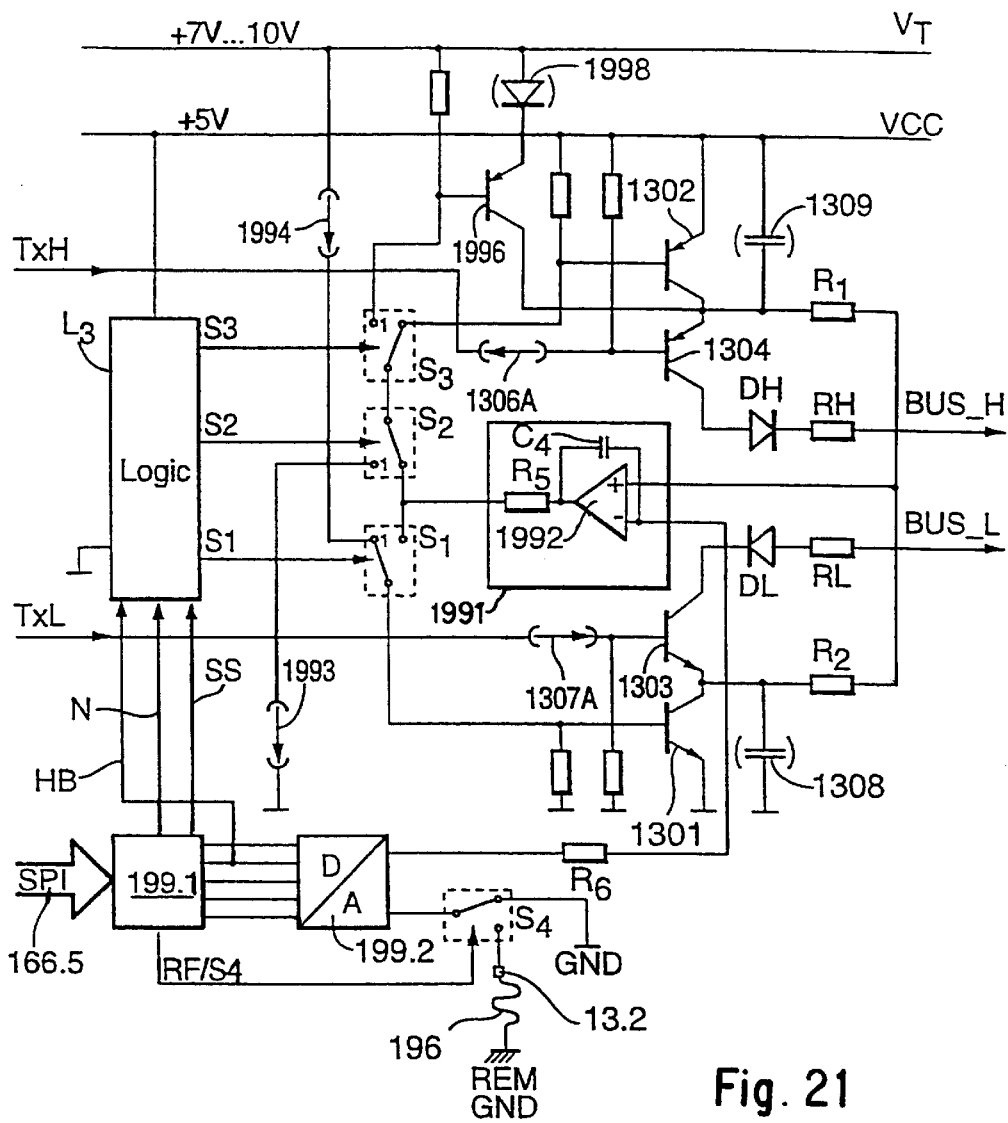
FIG. 21 shows a simplified function circuit diagram for illustrating various functionalities of an exemplary apparatus in connection with elements of the transmitting means of a bus transceiver as illustrated in FIG. 12.
Figure 22:
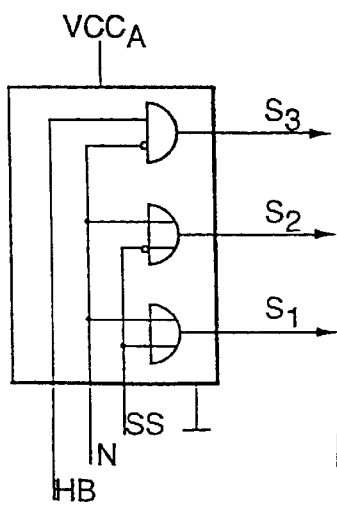
FIG. 22 shows an exemplary logic diagram of the driving functionality $L_3$ in FIG. 21.
Figure 24:
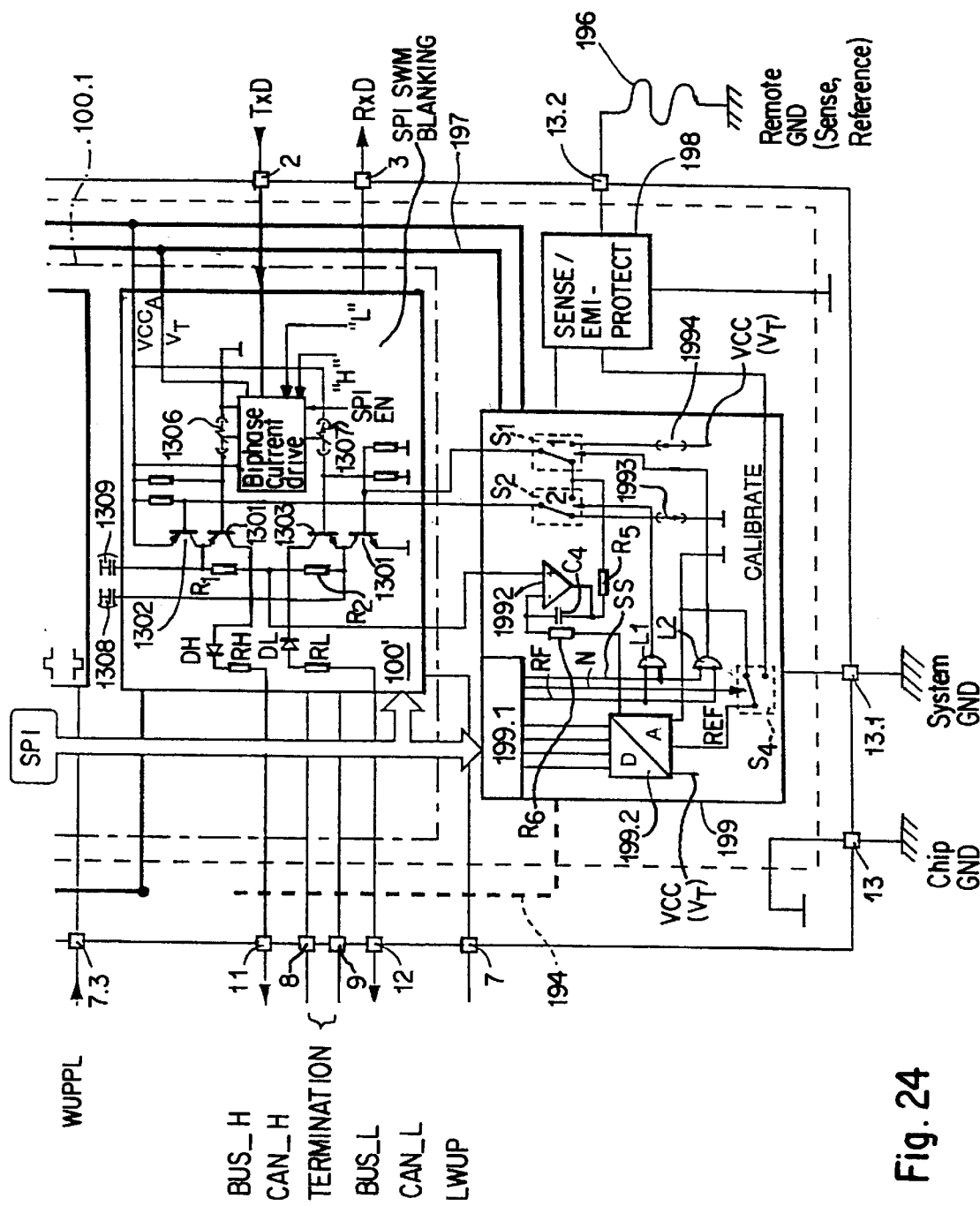
FIG. 24 shows a distribution diagram of apparatus elements in the sense of FIG. 12, these being limited in this case, for example, to supporting the transmitting end of the bus transceiver 100'.

The invention covers the apparatus according to FIG. 15 to the effect, on the one hand, that the two offset sources $Q_{SL}$ and $Q_{SH}$ can be utilized alternatively, as is illustrated in somewhat more detail in FIG. 21, FIG. 22 and FIG. 24, for example, without restricting the generality. In that case, in principle, in each case only one voltage specification is ever necessary. Furthermore, in this respect, only one D/A converter which can be correspondingly charged/recharged during the selection from both alternatives of the specification that is currently required in each case is necessary.

Figure 23:
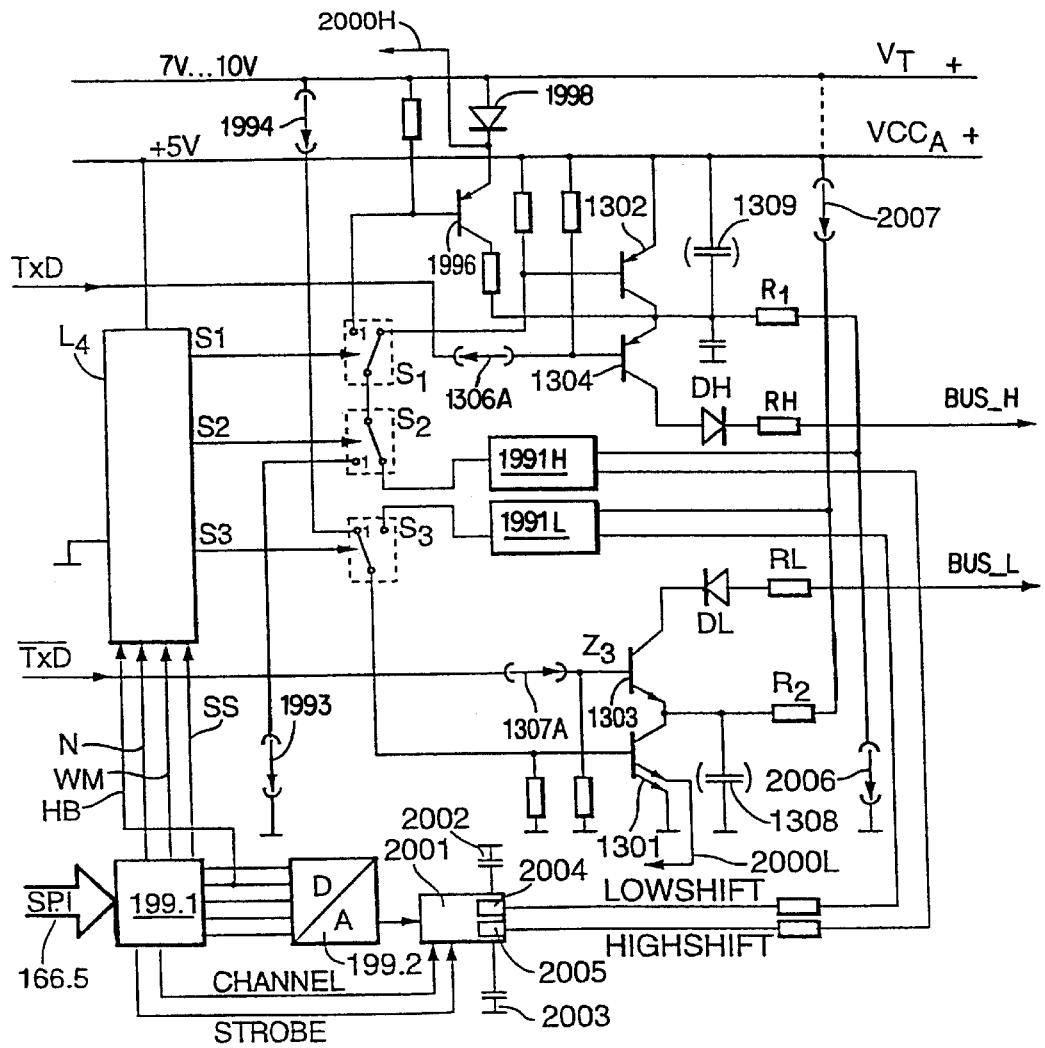
FIG. 23 shows a simplified function circuit diagram for illustrating further functionalities beyond those of the apparatus according to FIG. 21.

In addition, the invention equally covers the apparatus according to FIG. 15 to the effect that the two offset sources $Q_{SL}$ and $Q_{SH}$ can be utilized simultaneously and independently of one another, as is illustrated in somewhat more detail, for example in FIG. 23, without restricting the generality. The three figures mentioned will also be referred to further below.

Figure 16:
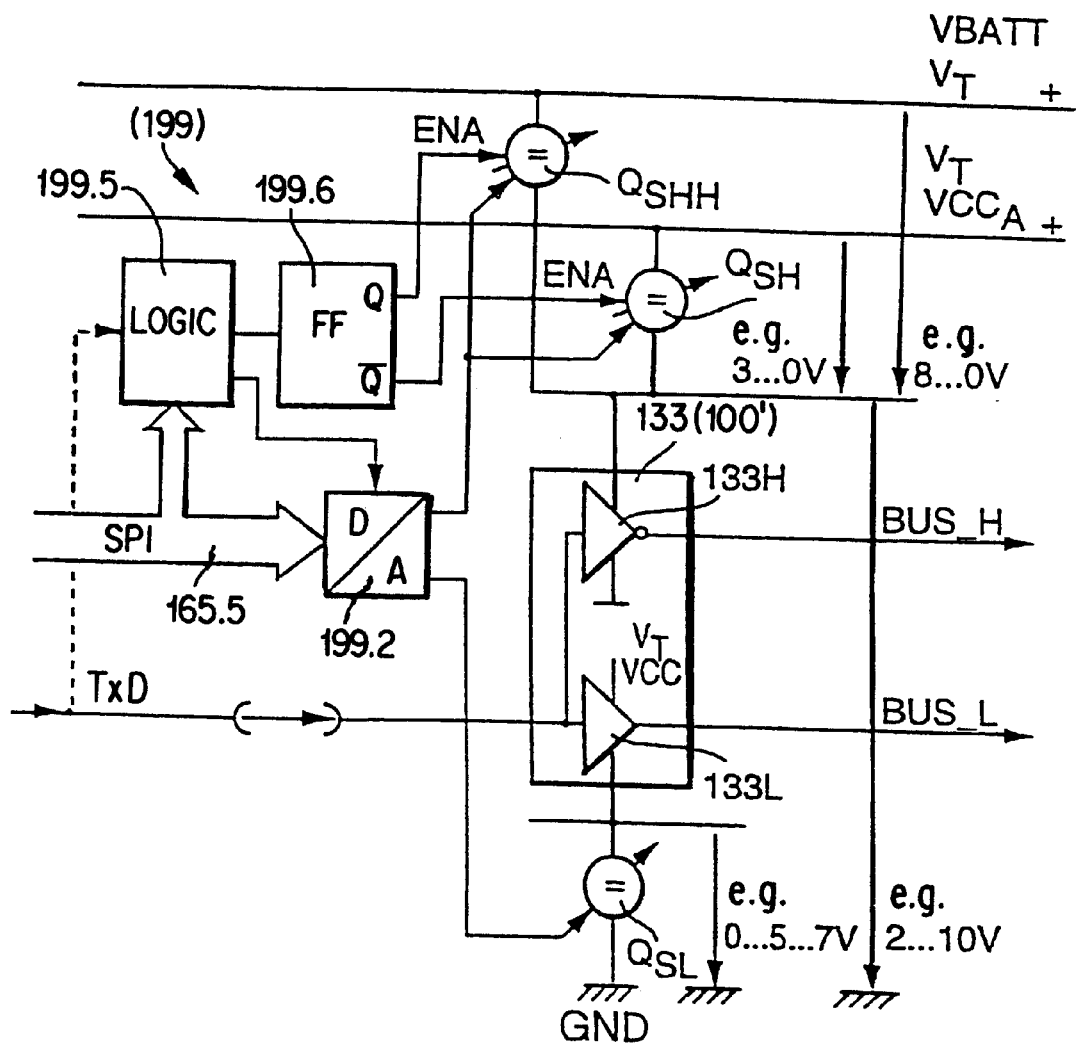
FIG. 16 shows a further simplified block circuit diagram of apparatus elements, relating to the transmitting end of the transceiver function.

The apparatus according to FIG. 16 also allows the installation of at least two offset sources $Q_{SL}$ and $Q_{SH}$ which can be utilized simultaneously, a D/A converter 199.2 having two corresponding outputs for the specification of two offset values being provided in that figure. In this case, for example, one output is fixedly assigned to the source $Q_{SL}$ and the other output is provided exclusively for the optional control of a first source $Q_{SH}$ (on the supply busbar $V_T$ or VCC) and of a second source $Q_{SHH}$ (on the higher-potential supply busbar VBATT or $V_T$). As in the case of the previous examples, logic driving of both output stages by means of at least one impressed current path is provided in this case as well.

The digital path 166.5 driving the D/A converter 199.2 furthermore drives a logic arrangement 199.5, which, for its part, is both connected to the D/A converter 199.2 and triggers a flip-flop 199.6. The two mutually inverted outputs of the flip-flop 199.6 drive the offset sources $Q_{SH}$ and $Q_{SHH}$ in the sense of a selection. According to the state of the flip-flop 199.6, an active ENAble signal is applied to one or the other offset source, that is to say either the offset source $Q_{SH}$ on the supply busbar $V_T$ or VCC or the offset source $Q_{SHH}$ on the (still more positive) supply busbar VBATT or $V_T$ is active (that is never both simultaneously). In the inactive state, each of the offset sources $Q_{SH}$ and $Q_{SHH}$ may be thought of as a short circuit (or, in practice, as a source having an insignificant residual voltage drop).

The logic arrangement 199.5 may thus be configured in such a way that in the event of the flip-flop 199.6 being triggered, for the purpose of a state change, the logic arrangement can also drive the D/A converter 199.2 for the purpose of recharging at least of one desired value specification (in particular, in the sense of a selection for the source $Q_{SH}$ or $Q_{SHH}$). From the above explanations, the voltage ranges entered in FIG. 16 are self-explanatory. This apparatus thus permits a dominant H source potential which can optionally lie below or above the bus-specifically normal H source potential or equally well be keyed, as required, between both. It furthermore lies within the scope of the invention to design the logic arrangement 199.5 appropriately so that such a changeover is also enabled in a manner interlinked with the data signal TxD, this being symbolized by the dashed signal path to the logic arrangement 199.5.

The apparatuses that have been described up to this point thus make it possible to shift one or both feeding dominant source level/s, on the one hand, in a direction in which the reception level window of a bus subscriber is also necessarily shifted when it has a defective connection to a reference-earth potential. This resultant connection carries current and, in this respect, causes its own offset voltage drop, such as, for example, in the case of a defective earth connection of a control unit as bus subscriber to the body of a motor vehicle.

On the other hand, however, it is thus also conversely possible, in accordance with the temporal driving of one or more D/A converters, to shift one or both feeding dominant source level/s. This shift starts from one or two higher values, in opposite directions to the shift direction or offset of the reception level window of a correspondingly defective bus subscriber. This capability of the circuit 200 opens up specific testing possibilities both before and after the occurrence of a potential error situation in a bus network.

Figure 17:
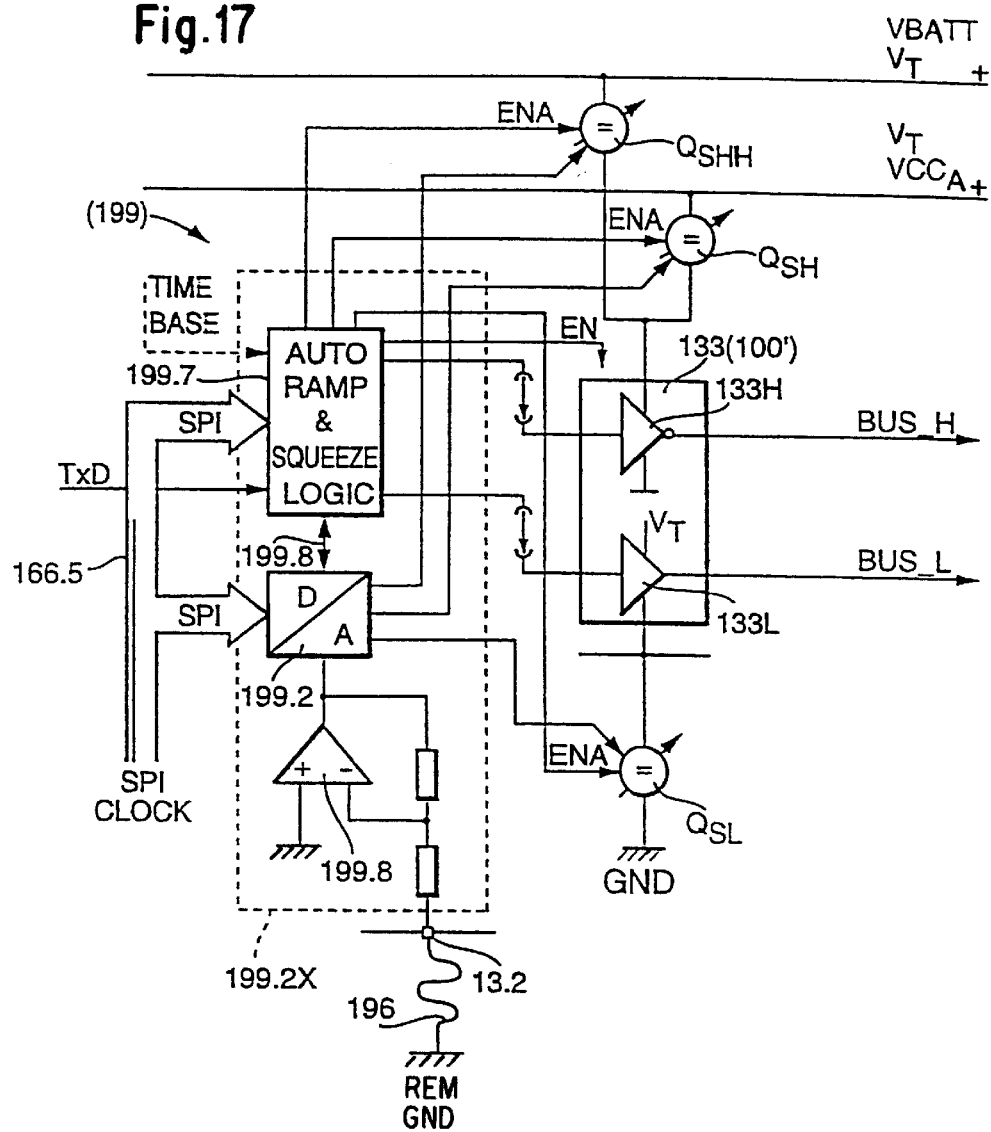
FIG. 17 shows a further corresponding block circuit diagram of apparatus elements, relating to the transmitting end of the transceiver function.

Such tests extending across an entire bus network having a large number of subscribers are simplified and accelerated in the development of the apparatus in accordance with FIG. 17, for example.

What has already been explained with regard to FIG. 18 also applies without any restriction to this apparatus. In this case, on the one hand, a D/A converter 199.2 is provided which permits the outputting of in this case, for example, three analog control or desired values to corresponding offset sources $Q_{SL}$, $Q_{SH}$ and $Q_{SHH}$. Without restricting the generality, all or only two of these values can be available simultaneously. Also in this case, the D/A converter 199.2 can be driven via a digital path 166.5 of the SPI type, for example. Furthermore, a logic arrangement 199.7 can likewise be driven by the digital path 166.5 and interacts with the D/A converter 199.2 via a bidirectional connection 199.8.

The logic arrangement 199.7 can be driven by the SPI clock signal; the supply of an external time base signal may also equally well be provided. Without restricting the generality of the invention, a corresponding time base signal could be derived by a timer within the circuit 200—in this case, for example, by a so-called wake-up expander 165'. If the wake-up expander 165' is (for its part) supplied, according to FIG. 12, the signal can be derived with a time or frequency signal (for instance via 164a from a watchdog function 164), could either be temporally interlinked with a period of an internal reference signal of the watchdog function 164 or obtained from a branch of the connection 164a in FIG. 12.

Moreover, the transmission signal TxD may also be fed to the logic arrangement 199.7. In this case, for example, the output stages 133L and 133H are driven by the logic arrangement 199.7 via respectively individual logic paths with current impressing. Also indicated, is a measurement amplifier 199.8, which is wired to generate a quantity corresponding to the difference between the earth potential internally in the chip or unit and an external reference earth REM GND. This quantity can be fed in this case to the D/A converter 199.2, for example.

The configuration and function of the logic arrangement 199.7 in connection with the D/A converter 199.2 are as follows.

Driven by a clock signal, which may either be the clock signal of the path 166.5 or else one which is obtained in accordance with the description above, the logic arrangement 199.7 generates, inter alia, in accordance with data received via the path 166.5, control signals for the D/A converter 199.2. These signals enable the D/A converter to generate and provide desired value specifications of the A/D converter which alter in a defined manner in ramped fashion, and/or to freely alter the dominant window width in a defined manner (squeezing of the bus bit eye width) and also to effect the selection or changeover (ENAbling) of the corresponding target offset source(s) $Q_{SL}$, $Q_{SH}$ and/or $Q_{SHH}$ Without restricting the generality of the invention, in this case the first function (so-called "ramping") can be carried out both for single-wire and for two-wire tests and the second function (so-called "squeezing") can preferably be provided for two-wire tests. This depends on the configuration of diagnostic software that utilizes the abovementioned properties. In this case, it may be possible to provide analog voltage levels which approximate a voltage ramp or represent a squeeze increment or decrement, if necessary is optionally time-slot-interlinked with the (not necessarily) synchronous data signal TxD.

For example, it is thus possible, in accordance with a number M which can be loaded via the path 166.5, 201.1 from the microcontroller 21, for a ramp increment or decrement to be effected at the earliest or exactly after a number of transmission bit periods. This number is determined by the number M. If this number M can be received by all the bus subscribers with reception capability, test software which is correspondingly designed can convey, using this predeterminable number M, virtually elementary verification foreknowledge regarding an imminent test cycle throughout the bus.

In conjunction with receiver features described in more detail below, plausibility checks within the bus subscribers are thus possible with low loading of the bus network. This is the key to a high acceleration of corresponding tests. In this context, attention is expressly drawn to the fact that the apparatus can also comprise (in addition) means which are not illustrated in the figures and enable a current reference changeover of the output stage 133H between the offset sources $Q_{SH}$ and $Q_{SHH}$ to be effected within a period of time which is shorter than the bus bit period.

Some of the apparatus elements explained above are bordered by dashes in FIG. 16 and designated by 199.2X since the extent of the functionality which is encompassed within this dashed border can, as explained above, be realized within the scope of the invention by a single integral functionality 199.2X within the potential control apparatus 199. Reference will additionally be made to this in connection with FIG. 39.

Figure 19:
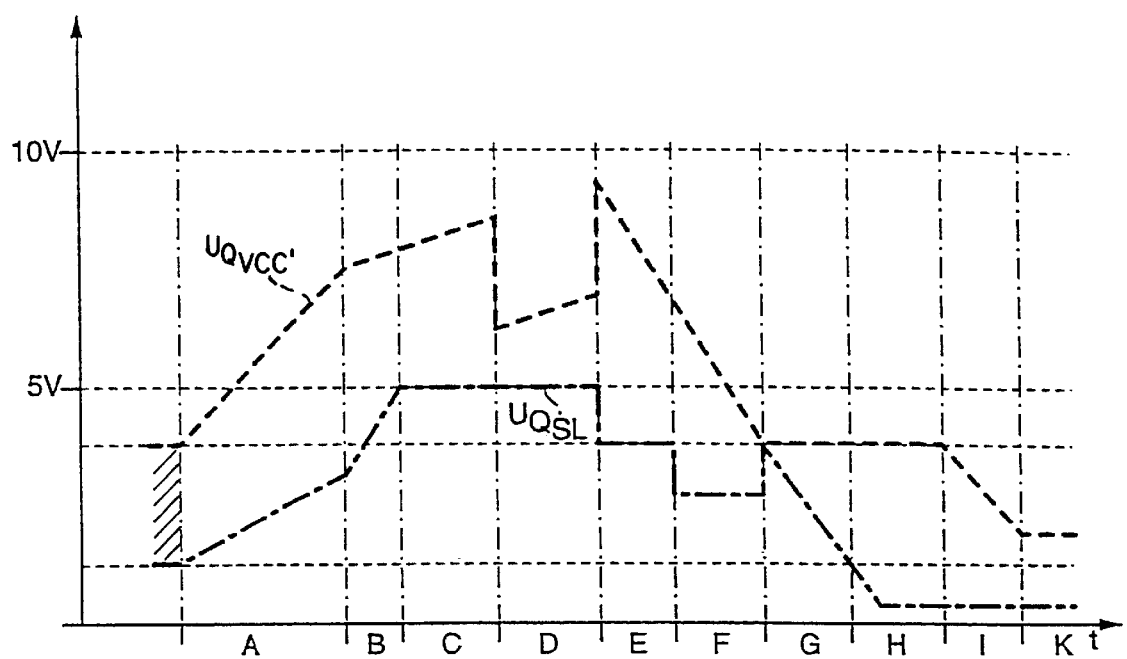
FIG. 19 shows a schematic timing diagram of the source potentials by which signal currents can be dominantly fed from the apparatus onto the bus cores.
Figure 20:
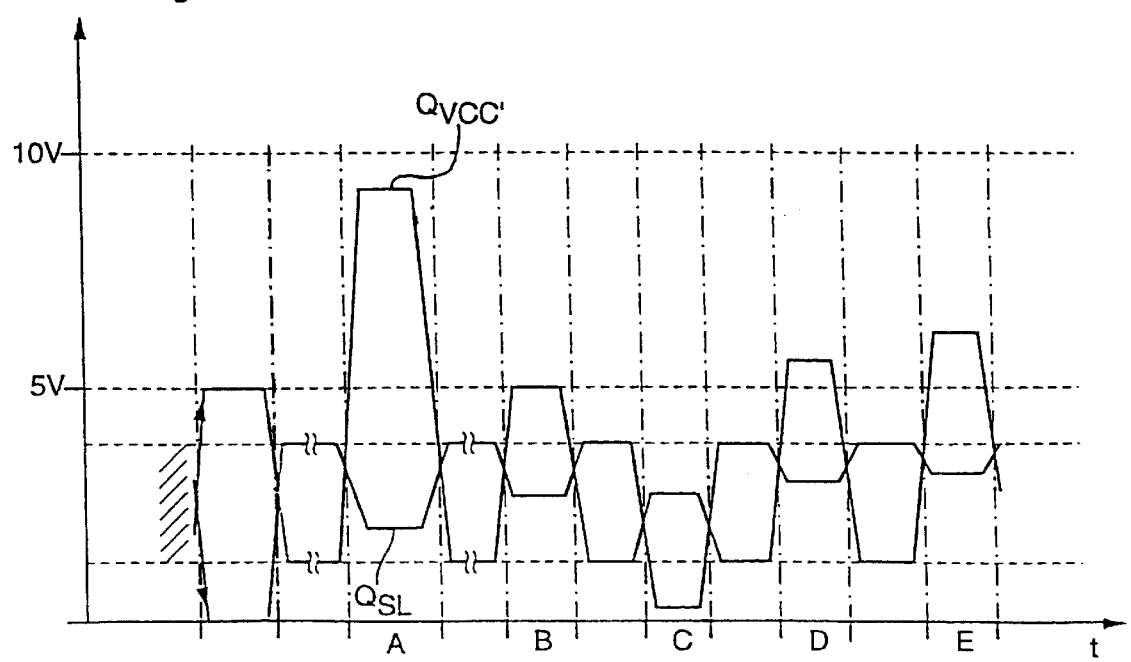
FIG. 20 shows two timing diagrams, superposed on one another, of exemplary signal profiles of the kind that can be generated by means of the apparatus according to FIG. 16 or 17 at core coupling points at the transmitting end.

The way in which the dominant source levels feeding onto the bus can be altered, for example, with the apparatus according to FIG. 17 plotted in a simplified manner in FIG. 19 in the form of an envelope diagram, for example. FIG. 20 illustrates an enlargement at the bit plane when the abovementioned feature of enabling a changeover of the current reference of the output stage 133H between the offset sources $Q_{SH}$ and $Q_{SHH}$ is possible within a time shorter than the bus bit period. It is evident from this that current feeding into a bus core is not possible under certain preconditions, something which can be utilized for discrimination purposes.

Depending on the application spectrum of the circuit 200, the degree to which the abovementioned apparatus features are constructed can vary to a great extent. In every case, features of one example can be combined, without any restriction, with features of another example, without thereby leaving the scope of the invention. FIGS. 21–23 convey a number of practical examples in this sense, using simplified circuit diagrams, in order to make the different functionalities plausible. In this regard, they do not constitute any restriction at all to the invention. Rather, for example, depending on the realization technology in a circuit or module, it is also possible to realize circuit diagrams which are very different from these. This is in order to achieve in practice the functionality which is illustrated.

In this context, FIG. 21 shows a circuit diagram in which are assembled elements that can be assigned both to the potential control apparatus 199 and to the bus transceiver 100, 100' (in particular to the output stage 133 thereof). With the exception of optionally provided interlinking of the offset source influencing with the data signal TxD, this exemplary embodiment of a potential control apparatus and cooperating apparatus elements in the bus transceiver approximately conveys the functionality of what is illustrated in the block diagram in FIG. 16.

1303 is the L switch of the L output stage 133L, which L switch (normally) switches with respect to GND, and 1304 is the H switch of the H output stage 133H. Here, H switch (normally) switches with respect to $VCC_A$. The transistors, which in this case are bipolar, complementary transistors, for example, have the respective data signal Tx_L and Tx_H applied to their bases by means of impressed current paths 1307A and 1306A, respectively. In a manner known per se, the collectors of the transistors 1303 and 1304 feed the bus cores BUS_L and BUS_H, respectively, via protective diodes DL and DH, respectively. Furthermore, if appropriate, the collectors feed the bus cores via small protective resistors RL and RH, respectively.

The transistors 1301 and 1302 fulfil, in alternation with one another, an overall triple function, for which purpose they can be driven, on the input side, via analog changeover switches $S_1$ and $S_2$ which can be controlled by digital signals $S_1$ and $S_2$.

In the exemplary switch position 1 of the analog changeover switch $S_1$, the transistor 1301 is firstly held at saturation by the current source 1994 feeding from the potential $V_T$, as a result of which the emitter of the transistor 1303 is almost at earth potential GND. The transistor 1301 as it were "deactivates" the corresponding offset source $Q_{SL}$.

By virtue of this measure, the resistor $R_2$ of the voltage divider formed by $R_1$ and $R_2$ is, secondly, also connected to GND, with the result that the said voltage divider has the division ratio $R_2/(R_1+R_2)$.

Thirdly, via the analog changeover, switch $S_2$ in position to the base of the transistor 1302 is connected to the output of the regulator 1991. As a result, the transistor 1302, in conjunction with the regulator 1991, functions as output stage of an offset source $Q_{SH}$.

The regulator 1991 can be constructed in a known manner. Under certain conditions, it may also be based on a comparator 1992, as assumed in the example. The capacitor $C_4$, indicated by way of example, in conjunction with $R_5$ and $R_6$ are then to be matched, if appropriate, in accordance with technical regulation requirements to a non-ideal phase-shifting behaviour of the transistors 1301 and 1302. Other compensation means may also be expedient, depending on the properties of the comparator. The capacitors 1308 and 1309 which can be used for EMC protection purposes may in turn be advantageous in a differently configured regulator.

An analog desired value specification of the D/A converter 199.2 is fed to the regulator 1991. Since the regulating circuit is closed via the transistor 1302 and the abovementioned voltage divider formed by $R_1$ and $R_2$, the DC voltage present at the emitter of the transistor 1304 can be regulated as offset voltage which decreases the potential $VCC_A$ (source $Q_{SH}$).

Obviously, when the driving of the two analog changeover switches $S_1$ and $S_2$ is reversed, the opposite conditions prevail. The transistor 1302 is then held at saturation by the current source 1993, while the transistor 1301, functioning as regulating output stage, closes the regulating circuit. The abovementioned voltage divider formed by $R_1$ and $R_2$ is then virtually connected to VCCA and then has the translation ratio $R_1/(R_1+R_2)$. When $R_1=R_2$, the voltage divider acts identically both in the case of an L shift and in the case of an H shift and effects a curved regulating characteristic curve which may be advantageous, under certain preconditions, with regard to recharging the D/A converter 199.2 for the purpose of tests which alternate in a single-wire manner.

The selection logic arrangement $L_3$ drives a further analog changeover switch $S_3$ with a signal S3. By means of this changeover switch, it is possible to change over the output of the regulator 1991, given truth of the high bit HB, from the transistor 1302 to the transistor 1996 which is fed from the more positive supply busbar $V_T$. In this case, the transistor 1302 is then inactive. The diode 1998 is expedient depending on the technology. A zener breakdown of the transistor 1302 when the transistor 1996 is near saturation can be ruled out in the case of realization using high-voltage technology in the event of relevant differences between $V_T$ and $VCC_A$.

For its part, the D/A converter 199.2 is driven by a logic arrangement 199.1, which is in turn driven via the digital path 166.5. In this case, the logic arrangement 199.1 has the function of an interface to the digital path 166.5 and, in this respect, may comprise at least one register in which at least part of a data telegram that is received serially can be held temporarily. The flip-flop illustrated in FIG. 16 is contained therein as storage cell. For example, a bit line HB (for High Bit) leading to the D/A converter and also two further bit lines N (for Normal or Override) and SS (for Shift Select) are routed to the selection logic arrangement $L_3$ (the override function is explained in the next paragraph). An exemplary realization of this aim is reproduced in FIG. 22; it is configured in dependence on the truth evaluation of its input signals.

The abovementioned override function is as follows: given a truth state of the signal N, the operating state of the output stage is activated for normal bus communication, irrespective of whether HB driving is simultaneously effected or which of the two dominant source potentials GND and $VCC_A$ is selected for "manipulation" by offset shifting in accordance with the D/A converter.

Another driving path leads from the logic arrangement 199.1 to a further analog changeover switch $S_4$, via which the earth terminal of the D/A converter 199.2 and of the regulator 1991 can be connected optionally to, for example, the potential Chip GND or the terminal 13.2 for the external reference-earth potential REM GND, in dependence on a control signal $S_4$ (ReFerence) from the logic arrangement 199.1.

Without restricting the invention, a functionality in accordance with this exemplary embodiment already covers a large number of potential tests which can be executed in a single-wire manner and require, at an instant, in each case offset influencing only of one feeding dominant source level.

The apparatus according to FIG. 23 constitutes an expansion for applications in which simultaneous offset influencing of both feeding dominant source levels is necessary. This exemplary apparatus also constitutes no restriction at all to the invention and serves only for illustrating the functionality. In this case, for example, two separate regulators 1991H and 1991L are provided and an undivided acquisition (enabled by auxiliary current sources 1312 and 1313) of the actual offsets at the collectors of the transistors 1301 and 1302. The corresponding logic arrangement 199.1 is provided with an additional output WM (Wire Mode).

The corresponding logic arrangement L4 may be designed similarly to the logic arrangement L3. Connected downstream of the D/A converter 199.2 in this case, for example, is a two-channel hold device 2001 with signal supports 2002 and 2003 which is driven by the interface logic arrangement 199.1 via two additional connections (Channel and Strobe). The two-channel hold device 2001 with its two outputs 2004 and 2005, feeds the desired value inputs of the regulators 1991L and 1991H. As a special feature, a separate emitter pitch 2000L of the transistor 1301 and a sampling line 2000H at the diode 1998 are provided. As an additional protective measure for the circuit 200 under test conditions in the event of bus errors, quantities which can be picked off therefrom can be incorporated into overload disconnection for instance of the voltage regulators 20U and 20A in accordance with FIG. 13.

The capability of assigning specific apparatus elements unambiguously to the transceiver 100, 100' and/or to the potential control apparatus 199 is not always given in practice and, in the case of an integrated semiconductor circuit 200, for example, is given only when the degree to which the feature "offset influencing" is constructed is relatively low. Moreover, it may be expedient, for example, to integrate certain elements which, strictly speaking, ought to be attributed to the potential control apparatus 199 such that they are embedded in the bus transceiver, as, for example, in the case illustrated in FIG. 24 (only for transmission matters).

This example illustrates, in a schematic simplification, the distribution of exemplary elements of a solution in accordance with FIG. 15 for the case of two offset sources $Q_{SL}$ and $Q_{SH}$ which cannot be utilized simultaneously and for the special case where the feeding dominant H potential need not be greater than $VCC_A$.

It can be discerned that in the case of such a solution, the elements which effect potential shifting (namely, the transistors 1301 and 1302) can expediently be integrated without difficulty as components of a thermally equilibrated transmission output stage. In terms of identification, therefore, they are also assigned to the transmission output stage in this case. This apparatus example also serves exclusively to illustrate the resolution or distribution in which apparatus components can be constructed, and does not represent any restriction at all to the invention.

The abovementioned apparatuses have the common property that they actually realize the offset sources symbolized in FIGS. 14–18.

This means that the potential actually effected on the bus core BUS_L and BUS_H always deviates by a certain amount from the regulated terminal voltage of the offset source $Q_{SL}$ and, respectively, $Q_{SH}$ or $Q_{SHH}$ on account of the unavoidable streaming voltage drop across the protective diode DL and DH, respectively, and the protective resistor RL and RH, respectively.

This can be compensated for by a suitable test program in that this offset can be taken into account in the microcontroller 21 by substraction or addition of a corresponding fixed, correcting digital value, or in that a list of values, already generally shifted by an average offset voltage drop, for the D/A converter specifications is stored in the microcontroller and utilized for desired value formation for offset sources.

On the other hand (depending on the test software), for practicability the resolution of D/A converters used and the absolute accuracy of the core voltages with an increasing number of subscribers in the network becomes less important if, for the purpose of testing rapidity, the functionalities which are installed in the circuit or electronic module 200 allow a high utilization of the same in favour of the lowest possible signal throughput via the bus network and in favour of minimum loss times in the SPI path 201.1 between microcontrollers 21 and circuit or module 200 in bus subscribers.

The following apparatuses are aimed at applications in which, by contrast, a maximally direct and, in this respect, more accurate definition of a core voltage (that is voltage impressing) is desirable for the sake of testing.

Figure 25:
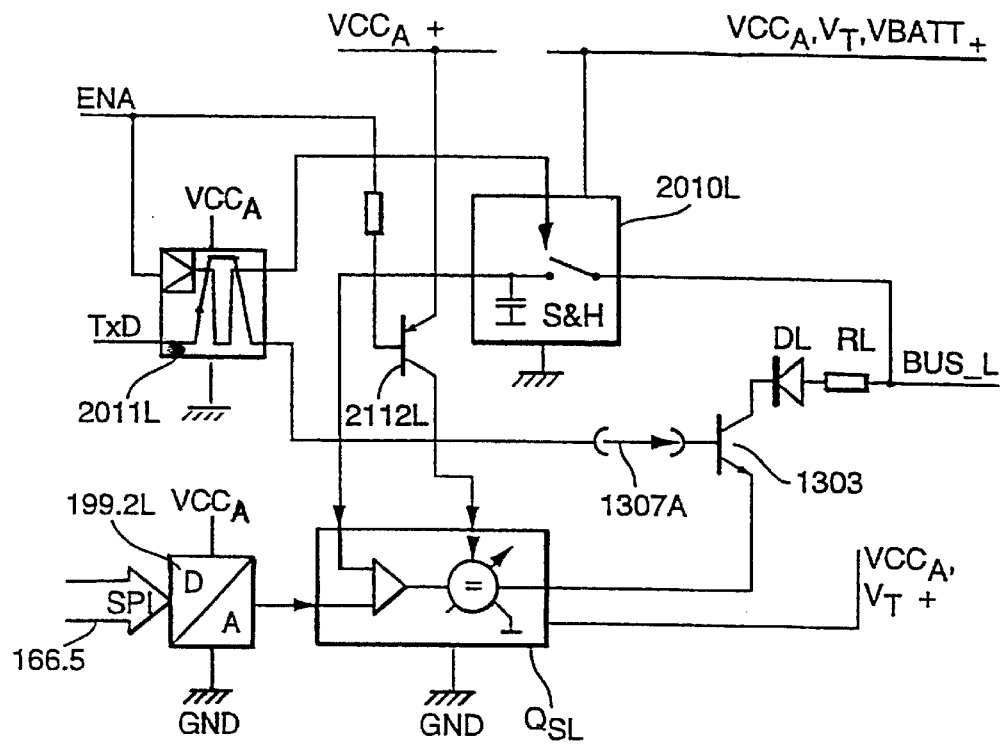
FIG. 25 shows a function circuit diagram of a developed apparatus which permits, in a simple manner, the direct regulation on the bus core BUS_L of a keying potential to be impressed dominantly thereon.
Figure 26:
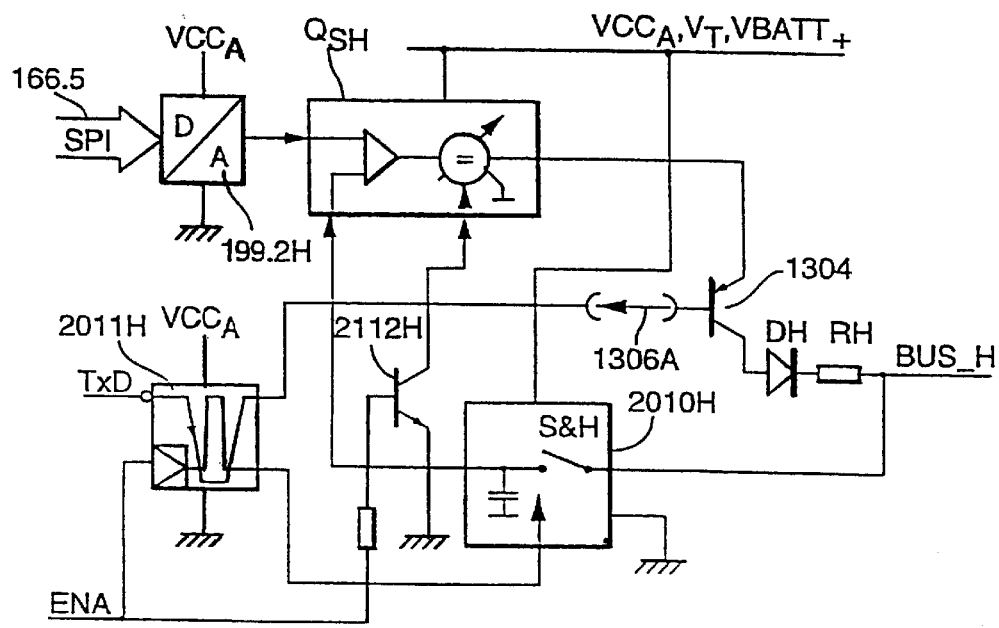
FIG. 26 shows a corresponding function circuit diagram for the bus core BUS_H.

In this case, the example according to FIG. 25 relates to a corresponding potential specification onto the core BUS_L and the example according to FIG. 26 onto the core BUS_H. In each case only essential elements are illustrated in an implementation which is possible, for example. In particular, elements are omitted which prevent regulation when, for example, potential conditions are present which do not allow energization of a bus core under an offset. Insofar as mutually corresponding parts of the functionality could be attributed to the potential control apparatus 199, they are distinguished from one another in a core-specific manner by the letters L or H also.

An essential element common to both apparatuses is a Sample & Hold circuit 2010L and 2010H connected between supply terminals GND and, for example, $V_T$ or VBATT.

The Sample & Hold circuit has an input which, for example, is directly connected to the bus core BUS_L and BUS_H, respectively. Furthermore, a pulse-triggering circuit 2011L and 2011H, respectively, is provided. This circuit is edge-triggered, preferably by the data signal TxD, and generates a very short sampling pulse SP. Here, the sampling pulse SP follows the arrowed clock edge within the data bit period and, for example, proceeds towards GND in the first case and towards $V_T$ or VBATT in the second case. The expedient polarity depends on the technology of the sampler used.

Besides the sampler on the input side, the Sample & Hold circuit 2010L and 2010H additionally comprises a holding element and, if necessary, also impedance conversion means according to the prior art from the output side.

The transistor 1303 and 1304, respectively, is already switched on by the respectively effective active edge of the data signal TxD when the sampling pulse is triggered (positive masking). By virtue of this measure, the regulating circuit from the output of the controllable offset source QSL and QSH, respectively, via the output stage transistor 1301 and 1302, respectively, and also the diode DL and DH, respectively, and the protective resistor DL and DH, respectively, as far as the input of the Sample & Hold circuit is closed a short time later. This occurs at the instant of sampling via the switched-on transistor 1303 and 1304, respectively.

The sampled variable output by the Sample & Hold circuit 2010L and 2010H, respectively, and the desired value specification from the D/A converter 199.2L and 199.2H, respectively, are fed via connections to the offset source $Q_{SL}$ and $Q_{SH}$, respectively, for the purpose of setting the latter. By means of an ENA and an NENA signal at the activation input of the pulse-triggering circuit 2011L and 2011H, respectively, and a deactivation input of the offset source $Q_{SL}$ and $Q_{SH}$, respectively, the latter can be driven to obtain a short circuit with respect to earth GND, respectively, and with respect to the busbar $V_T$ or VBATT and the sampling pulse generation in 2011L and 2011H, respectively, can be inhibited. In this state, the affected offset source $Q_{SL}$ or $Q_{SH}$ is then inactive.

It goes without saying that within the scope of the invention, the apparatus according to FIG. 26 can, as already shown above, also be extended to two corresponding sources $Q_{SH\ and\ QSHH}$, or else it is possible to provide a backup supply source $Q_{VCC}$, that replaces these. It is also possible to design both examples for optionally alternate or simultaneous operability.

Figure 27:
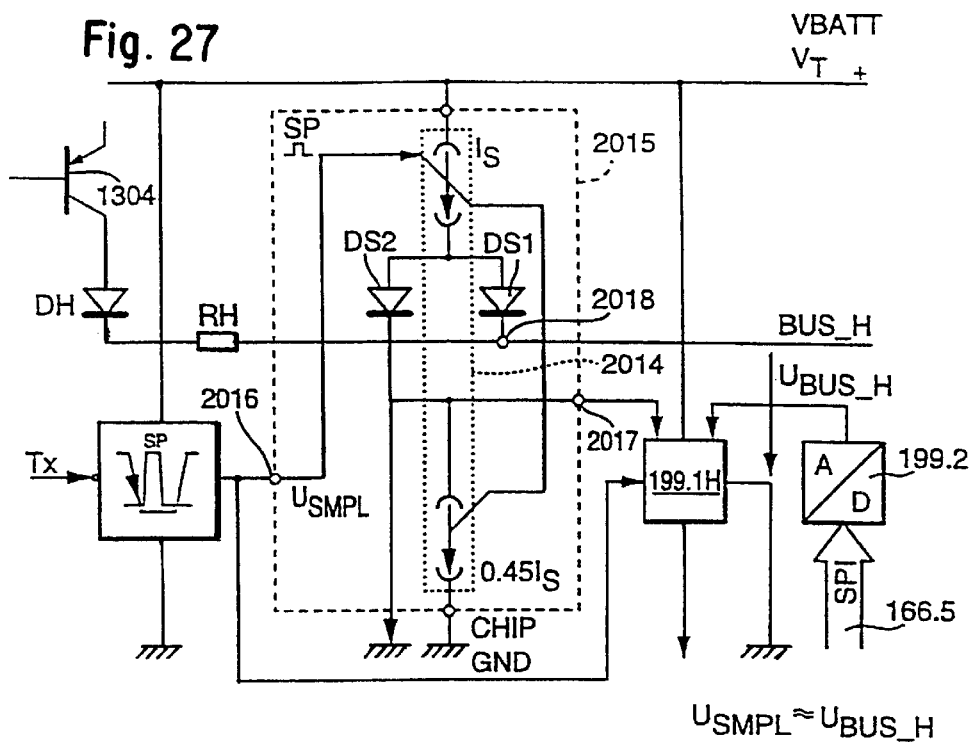
FIG. 27 shows a function circuit diagram of a sampler which can be used in the apparatuses according to FIG. 25 and FIG. 26, requires no error compensation and can be integrated very easily, with a hold regulator connected.

FIG. 27 illustrates a sampler 2015 which is suitable for this purpose which can be realized in a particularly simple and accurate manner monolithically, for example. In this case, for example, the sampler 2015 is wired for the bus core BUS_H.

The sampler preferably uses a complementary-balanced current source structure 2014, sample-pulsed at the input 2016, in the 20/9 pitch design as well as a sampling diode DS1, connected 2018 to the bus core BUS_H, and a compensation diode DS2 connected to the input of a holding regulator 199H. This compensation diode D52 has an impressed, mandatory forward current ratio of 0.55 to 0.45. Since the required current $I_S$ is very small, and is actually sampled only in the test mode and corresponding controlled current source structures 2015 can be designed monolithically with a low intrinsic current consumption, special driving arrangements and/or current enabling means for power-saving purposes are superfluous.

The sampling diode DS1 fulfils an important protection function for the downstream-connected regulator in the event of a short circuit with respect to the potential UBATT or the application of an even higher interference voltage to the bus core BUS_H. With a suitable monolithic realization of the diodes DS1 and DS2 in accordance with the bus core protective diode DH, the sampling voltage at the output 2017 is near to the actual core voltage $U_{BUS\_H}$ when the output stage transistor 1304 is in the on state. As a result, the residual error smaller than the practical resolution gradation of D/A converters 199.2 of relevance (in this case) is obviated.

The current source structure 2014, including the two diode paths DS1 and DS2, can be integrated to be small, of low capacitance and balanced with respect to a sampling nucleus 2015 which has only two further terminals 2016 and 2017 in addition to terminals VBATT or $V_T$ and GND for its power supply and the bus core node 2018. In the case of only small sampling currents of the kind that are of interest in the present case, and with appropriate account being taken in the monolithic design, it is possible to realize reciprocal compensation of rectified voltages in the cell 2015. Thus, in spite of a rapid reaction of this sampler (and hence of possible regulation as well) to DC voltage changes at the bus coupling node 2018, it is possible to achieve a relatively high signal-to-noise ratio with respect to radio-frequency interference on the bus core (EMC).

This apparatus element is advantageous, therefore, insofar as although an unavoidable error voltage is also produced in this case, it is, on the other hand, compensated for at the same location and in the same monolithic structure in which it is necessarily caused. This occurs while it utilizes exactly the same physical principle of action underlying its genesis.

Thermal invariance of the error compensation also follows from this, which thermal invariance can be realized within wide limits. For these reasons, it is possible to dispense with any compensation assistance, for instance, from the circuit 200 or even loading an external microcontroller 21 for the purpose of computational compensation.

Of course, the sampler described also constitutes no restriction at all to the invention. Rather, the invention also incorporates within its scope other solutions for realizing both reverse insulation against over voltages on a bus core and corresponding offset voltage compensation.

Figure 28:
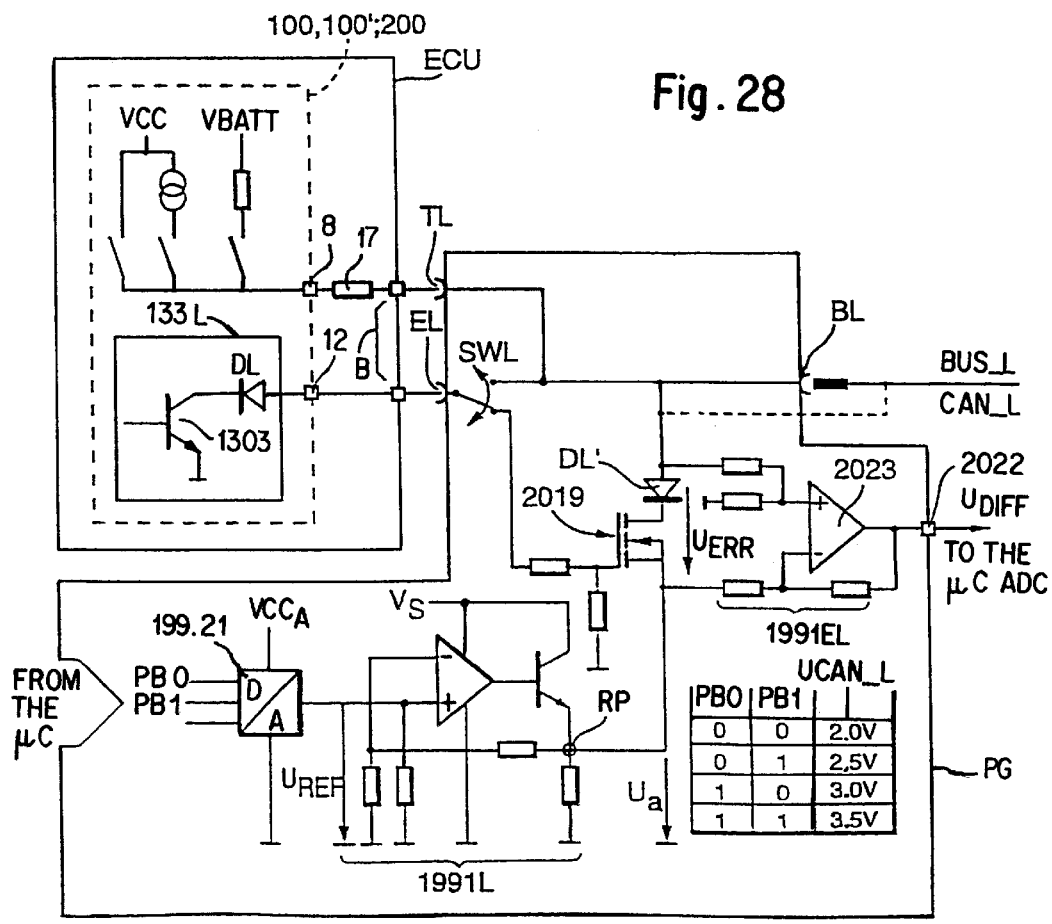
FIG. 28 shows a function circuit diagram of an alternative apparatus which permits direct regulation on the bus core BUS_L of a keying potential to be dominantly impressed thereon and, at the same time, uses an external microcontroller for error compensation, shown in an application in the context of a mobile test unit, for example.

The apparatus according to FIG. 28 fulfils an entirely different application, in which a powerful microcontroller cooperates with the circuit 200, the utilization of its computing power and corresponding utilization of the digital path 166.5, 201.1 do not have a disturbing consequence or it is not possible to realize a sampler which affords protection in the sense above and has physical error voltage compensation, as shown in FIG. 27 or the like.

In this apparatus for the bus core BUS_L, the actual core output stage 133L is utilized not for the purpose of feeding in the desired core potential but rather only as a driver stage for driving a backup switch 2019 which affords backup feeding and, for its part, is connected to the bus core BUS_L by a separate protective diode DL'. The current flowing away into the bus from the dominant feeding potential therefore takes an entirely different route in this case, namely from the regulating point RP at the output of the core potential regulator l991L via the switching path of the transistor 2019 and the protective diode DL'. In order to make this possible, a low-resistance changeover switch SWL is provided which can be activated into the switching state shown for the duration of corresponding potential tests.

A D/A converter 199.2L supplies the regulator 1991L with a desired value for the voltage to be set at the regulating point RP. The error voltage $U_{ERR}$ dropped across the elements 2019 and DL' due to the flow of current is detected by a further amplifier 2023, which is wired up to form a measurement amplifier 1991EL, and the corresponding analog output voltage $U_{Diff}$ is fed to an A/D input of a microcontroller 21 (not illustrated here in the figures).

The microcontroller 21 can thus calculate the value of the bus core voltage from the digitally converted error voltage $U_{Diff}$ and the present digital desired value specification for the D/A converter 199.2, at a resolution which is predetermined by the stepped nature of the D/A converter 199.2L. The regulator 1991L preferably realizes, in conjunction with the compensation of the error voltage $U_{ERR}$ with regard to the bus core BUS_L, a current-limited voltage source having a maximum current of 200 mA, the feeding source voltage breaking down when the said maximum current is reached.

Apart from the terminal 2022 for the analog output of the amplifier 2023, further terminals 2020 and 2021 are required on the circuit 200 when the changeover switch SWL is realized outside the circuit or module 200. On the other hand, the apparatus may also be accommodated in the periphery 500 remote from the bus transceiver 100, 100' in a, for example, mobile test unit which is connected to the bus only for test purposes. The changeover switch SWL can then be located in the said test unit, for example.

Such an application is also taken as a departure point in the figure, for example. Accordingly, the parts within the border PG are located in a mobile test unit which can be connected between an electronic module 200 with bus capability, in this case, for example, situated in a control unit ECU, and a bus wire BUS_L or CAN_L. For this purpose, for example, a bridge B may be removed in the connection region of the unit ECU, with the result that the terminating resistor 17, which is normally connected to the bus line BUS_L via this bridge, can be connected via a contact TL to the said bus core in the test unit. Here, the output of the output stage 133L can be connected via a further contact EL to the control input of the backup switch 2019 in the test unit PG. The bus wire is connected via a further contact BL to the test unit. In the case of this apparatus, the compensation path then preferably runs via the microcontroller of the test unit. An apparatus for corresponding connection to the bus core BUS_H would largely correspond to that described above.

Figure 29:
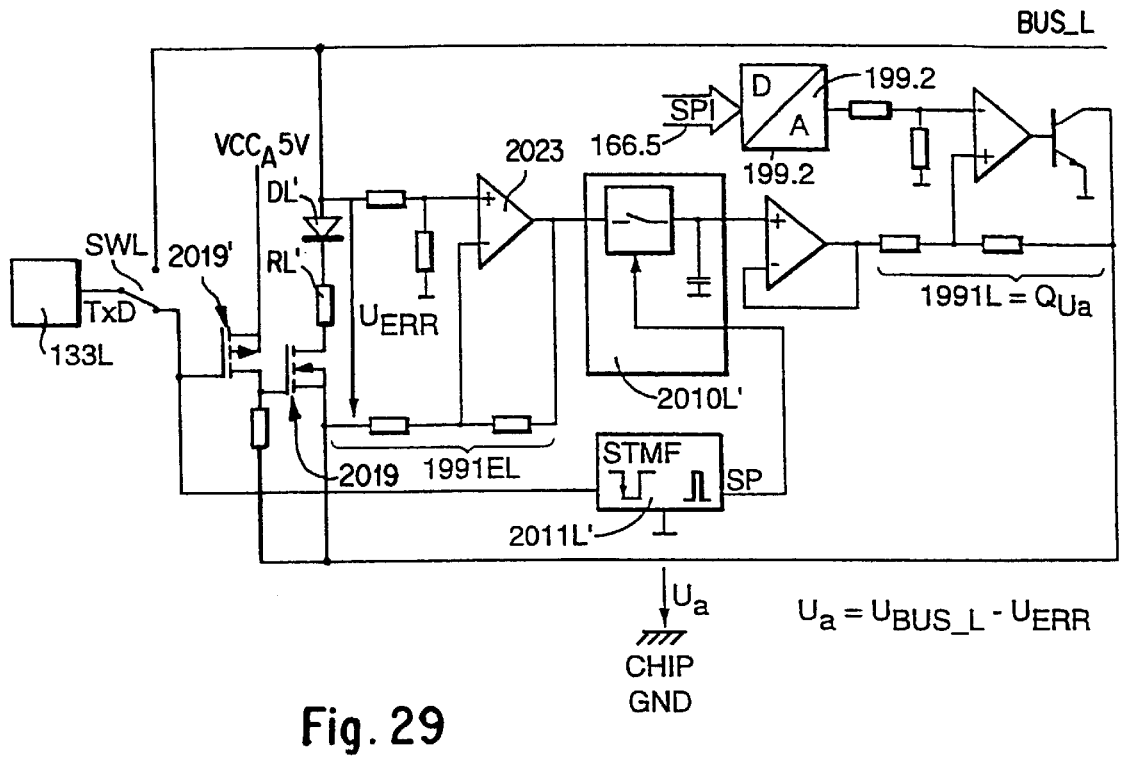
FIG. 29 shows a modification of the apparatus according to FIG. 28 which, by means of a Sample-&-Hold device, makes it possible to dispense with a microcontroller for the purpose of compensation, applicable to the bus core BUS_L.

The apparatus according to FIG. 29 avoids the terminal 2022 and the compensation path via the microcontroller in that, by means of a Sample & Hold circuit 2010L', it samples and holds the abovementioned output voltage of the measurement amplifier 1991EL rather than the core voltage $U_{BUS}$_L. A sampling pulse SP which (interlinked with the data signal TxD) is generated after the active edge of the latter is applied to the said Sample & Hold circuit by a pulse-triggering circuit 2011L'. Without restricting the generality of the invention, this may be an edge-triggered monostable multivibrator STMF.

The error quantity which corresponds to the error voltage $U_{ERR}$ and is held by 2010L' is fed forward to the core potential regulator 1991L as interference quantity and accounted in analog form. In this way, within the scope of the resolution of the D/A converter 1992L, a core voltage $U_{BUS\_L}$, corresponding to the quantity which is predetermined on the digital path 166.5 is obtained as a sum of the regulator output voltage $U_a$ and the respective error voltage $U_{ERR}$.

Figure 30:
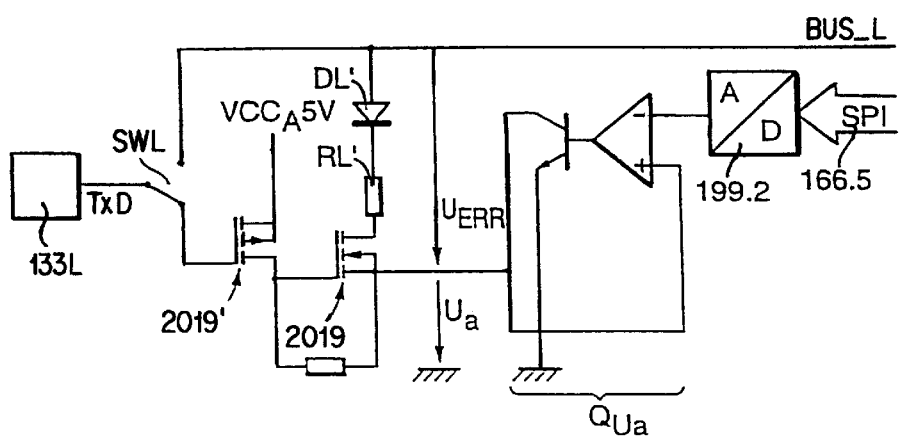
FIG. 30 shows a function circuit diagram of an alternative apparatus for the purpose of feeding onto the bus core BUS_L a source potential having a variable offset with respect to the normal dominant potential.

The same also applies correspondingly to the apparatus according to FIG. 30, which entirely dispenses with detection of the error voltage $U_{ERR}$ and accounts for the latter by taking a fixed additional offset value into consideration in the desired value specification via the digital path 166.5 from the microcontroller 21. In this respect, this exemplary embodiment is based on the principle which is already known from the examples in accordance with FIGS. 14–18 and 21–24.

FIG. 31 illustrates, for example, a reception block 120' as part of the transceiver 100/100' not only for reception purposes but also for verification of communications errors. Another example is as a consequence of reference-earth potential errors of the electronic unit containing this reception block, in conjunction with previously described functionalities of the potential control apparatus 199 and cooperative level-shifting features of the output stage 133 in the transceiver 100/100'.

The reception block 120' comprises a front end 121 of analog action, a digital evaluation logic arrangement 128 and a read-out and control logic arrangement 129.

The front end (LEVEL DISCRIMINATING SECTION) comprises three level discriminators 121.1 to 121.3 of analog action. These discriminators are preferably designed as comparators and generate, by analog comparison of the bus line levels with regard to one another and also to a reference potential VREF, signal levels and edges which can be further digitally processed.

The evaluation logic arrangement (PROCESSING & ANALYSING SECTION) contains a circuit function 122'. Here, on the one hand, the serial bus information RxD as digitally normalized bit stream is recovered from the defined signal levels and edges. On the other hand, bus errors in a line core-dependant manner are identified. For this purpose, the circuit function 122' is also designed for single-wire reception (across GND).

In this context, the evaluation logic arrangement 128 may comprise digital circuit functions 123H and 123L as apparatus components. These circuit functions permit an error signal which is respectively indicative of the assigned bus core BUS_H/CAN_H or BUS_L/CAN_L to be output when a presettable number of directly or actually successive bit errors is reached or exceeded (bit error depth discriminator or bit error accumulation discriminator). For this purpose, the circuit functions 123H and 123L are multiply connected to the circuit function 122'.

The read-out and control logic arrangement (READOUT & ONCHIP CONTROL) comprises a functionality which is combined to form a control interface 124 and, at least partially, may also be part of the digital SPI interface 166 or be combined therewith. Additionally, they may also be part of preferably at least two storage cells 127H and 127L with set inputs 127H1 and 127L1, respectively, reset inputs 127H2 and 127L2, respectively, and state outputs 127H3 and 127L3, respectively. These elements, which are not used for normal reception, are also to be attributed in the broader sense to the apparatus according to the invention and, within the circuit or module 200, may also be part of a larger error memory or register, for instance in connection with an EEPROM.

As an example, the reset inputs 127H2 and 127L2 and also the state outputs 127H3 and 127L3 of the discrete storage cells 127H and 127L are connected to the control interface 124/166. An error signal can be applied to the set input 127H1 from the circuit function 123H. An error signal can be applied to the set input 127L1 from the circuit function 123L. Connections 126H and 126L enable setting information with regard to the bit error depth to be discriminated and with regard to the bit error number to be accumulated as well as to the selection of these two methods of discrimination to be transferred from the control interface 124/166 to the circuit functions 123H to 123L, respectively. Connections 125 enable setting information to be transferred from the control interface 124/166 to the circuit function 122', which may also contain, inter alia, at least one storage or shift and/or counting register.

Optionally, the control interface may furthermore be operatively connected to means 170.2 for slew rate influencing in the front end 121 and in the evaluation logic arrangement 128 and is then preferably also capable of communication via the SPI bus 166.5 with the surroundings of the reception block 120'. In addition, these further means 170.2 may likewise be attributed in the broader sense to the apparatus according to the invention.

This is because the slew rate influencing can assist analyses of core-specific bit errors both in interaction with the previously described functionalities of the potential control apparatus 199 and the cooperative level-shifting features of the output stage 133 in the transceiver 100, 100' and in the event of capacitive disturbances in the bus network and also in the event of communications interference on account of electromagnetic interference effects on the bus network or a bus subscriber.

A reception block 120' of a bus transceiver 100' that is augmented by the abovementioned apparatus elements can support, in addition to its normal bus reception function under suitable network management software, in a bus line-specific manner, error analyses under SPI control.

In conjunction with previously described functionalities of the offset and bus test manager 199 and cooperative level-shifting features of the output stage 133, this reception block 120' can expand the overall functionality of the circuit 200, namely in respect of monitoring and diagnosis functions with regard to the determination of bus subscribers with reference-earth-potential-error-based communications interference, also under two-wire test conditions, in conjunction with associated transmitting means as "passive responder".

In this context, the reception block, in conjunction with a potential control apparatus 199, can be understood and operated as part of a test system resolved throughout the bus, which last relies, in terms of hardware, at least on a plurality of correspondingly equipped bus subscribers.

These exemplary apparatus details must not, under any circumstances, be understood as a restriction of the invention. Rather, the reception block 120', with regard to augmentations which cooperate with the potential control apparatus 199, can also be structured differently in its sections 128 and 129 or at those locations comprise function blocks which differ from the present exemplary embodiment, in order overall to realize the discrimination features described.

Figure 32:
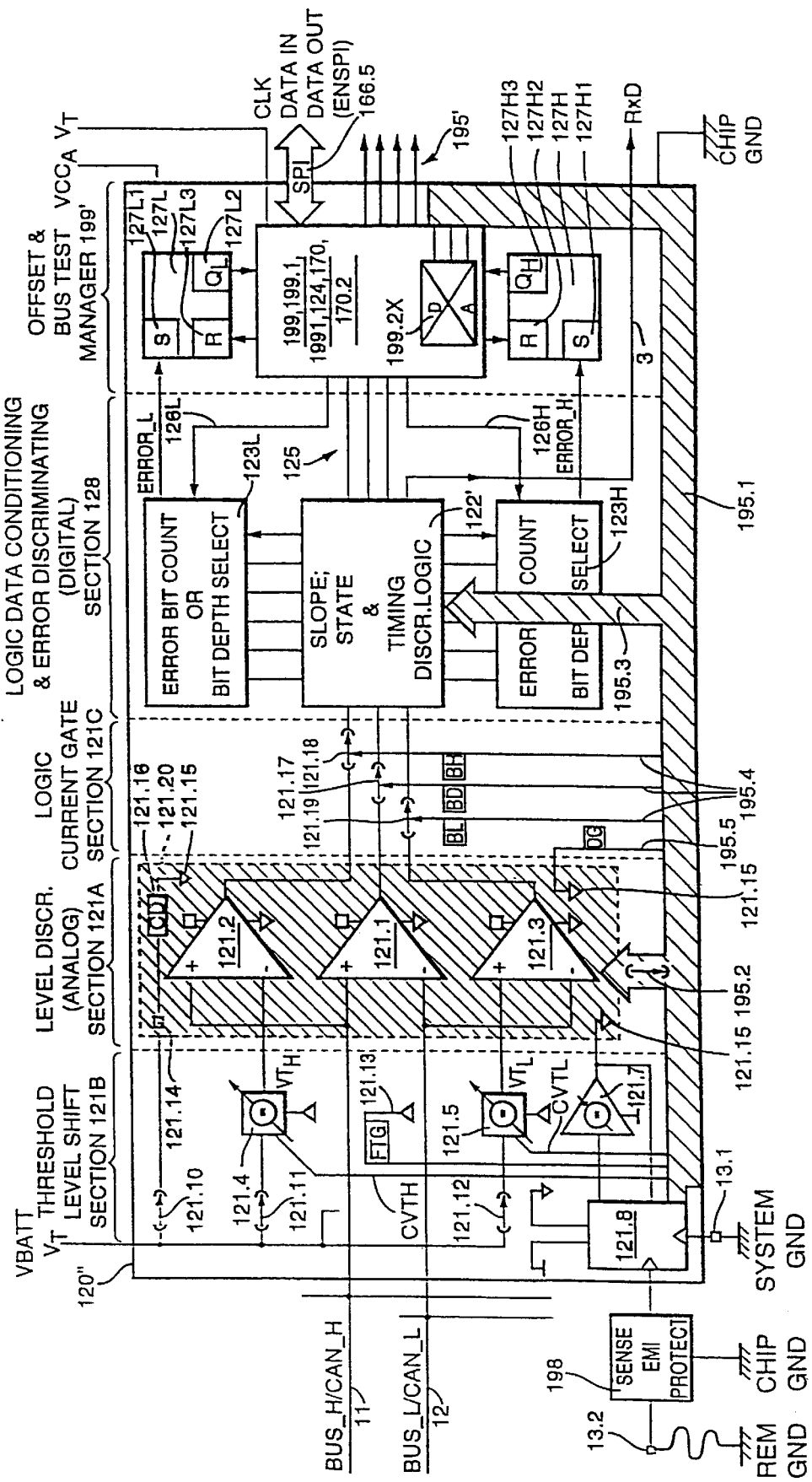
FIG. 32 shows a function block diagram of a developed reception block within a bus transceiver in a semiconductor circuit which is equipped with further developed apparatus elements.

Even further reaching support of error analyses in the presence of inexact bus levels is possible with a reception block 120" which is augmented by further apparatus elements in accordance with FIG. 32. Like the block described previously, it affords a normal two-wire and single-wire reception function. Under the control of suitable diagnostic software, it supports, in conjunction with functionalities of a more complex potential control apparatus 199', which is in this case assigned to this block 120", for example, and the above-described level-shifting features of the output stage 133, analyses of reference-earth potential errors, bus levels and bus windows, in conjunction with associated transmitting means as "active responder". Receivers augmented in terms of apparatus in such a way can advantageously be utilized, under a network diagnostic program, as potential and signal-agile observers with measuring probe function actively for the purpose of (latent) network quality monitoring. It is preferably designed using integrated technology.

In this case, the reception block 120" likewise comprises a level detection section 121A of analog action, a threshold value specification and shift section 121B, a logic current coupling section 121C, a digital evaluation logic arrangement 128A and the said potential control apparatus 199', which in this case has a functionality which is pitched further than in the case of offset influencing only at the transmitting end.

The level detection section (LEVEL DISCRIMINATING SECTION) comprises three level discriminators 121.1 to 121.3 of analog action. These are preferably designed as comparators.

The comparator 121.1 generates a first digital output signal by comparing the two bus-line levels with reference to one another. The comparator 121.2 generates a second digital output signal by comparing the level of the bus core BUS_H/CAN_H with a first threshold value voltage $VT_H$ of a first threshold value source 121.4. The comparator 121.3 generates a third digital output signal by comparing the level of the bus core BUS_L/CAN_L with a second threshold value voltage $VT_L$ of a second threshold value source 121.5. All three comparators generate signal levels and edges which can be further processed digitally.

In contrast to FIG. 31, the discriminators 121.1 to 121.3 are constructed in such a way that they are electrically "raised" together with their respective supply terminals of lower and higher potential relative to the chip substrate, that is to say they can "float". This is ensured by a particular monolithic construction and insulation in the structure of the semiconductor chip and also by the fact that their respective supply terminals of lower potential (indicated by triangles with the vertex facing downwards in the figure) and of higher potential (indicated by squares in the figure), are directly electrically interconnected. This unit has a hatched underlay in the figure and is designated by 121.20. The terminals marked by squares are thus connected to a supply terminal 121.14 (assumed to be more positive in this case) and the terminals marked by a triangle with the vertex pointing downwards are connected to, for example, three supply terminals 121.15 (which are in this case assumed to be more negative and are interconnected). In order to ensure that the comparators have a constant supply voltage, the structure 121.20 in this case also comprises, for example, a voltage clamp or a regulator 121.16, which is connected between the supply terminals 121.14 and 121.15 and can be supplied from one of the potentials VBATT or $V_T$ via a current source 121.10, for example.

The threshold value specification and shift section (THRESHOLD LEVEL SHIFT SECTION) comprises, for example, a first adjustable threshold voltage source 121.4 for a threshold potential $VT_H$ and a second adjustable threshold voltage source 121.5 for a threshold potential $VT_L$. This can be adjusted via corresponding control paths CVTH and CVTL and, in the most general case, similarly to the abovementioned comparators, can be referenced to a dedicated negative reference-earth potential busbar 121.13. This is symbolized by triangles with the vertex facing upwards which can also be raised, if necessary. By example, the threshold voltage sources 121.4 and 121.5 are supplied from current sources 121.11 and 121.12. For the purpose of feeding of the latter, feeding of the section 121B from one of the potentials VBATT or $V_T$ can be provided.

Furthermore, this section is assigned an offset source 121.7 which can be correspondingly adjusted by driving and, with its output, feeds preferably the negative supply terminal 121.15 in the section 121A and hence—given that the supply voltage of the comparators 121.1 to 121.3 is kept constant by the element 121.16—permits the negative supply potential of the said comparators to be raised by a defined offset. For this purpose, this source can be designed as a regulating amplifier whose input is driven by a special block 121.8, to which the output of the regulating amplifier is also fed back. From the circuit terminal 13.1 and/or 13.2, the function block 121.8 can be fed earth potential from the unit in which the circuit is used and/or from a reference-earth potential in the application environment.

The function block 121.8 is connected to the potential control apparatus 199' via the control path 195.1. From the block 121.8, the offset source 121.7 can be switched on and off, if required can also be short-circuited via the path 195.5 and can be driven with a desired value specification which is obtained from the function block 199' via the control path 195.1.

A further function of the block 121.8 consists in the selection of earth and reference-earth potentials. Without restricting the generality of the invention, an exemplary functionality of the block is illustrated in FIG. 33. Depending on the degree of construction of the features in a practical circuit, not all the selection possibilities need be constructed at the same time. In addition, only a few of them can be available selected by one-time programming, for example, within a more complex circuit. In this respect, therefore, the block 121.8 comprises means which, in accordance with their driving via the path 195.1, in effect can enable the potential references illustrated in the figure for the reception block 120". In this context, the block 121.8 may comprise controllable analog switching and selector paths $S_5$ to $S_8$. Furthermore, there may be means enabling these paths to be switched off and on or changed over, as required, from the block 199' by means of software by a microcontroller for calibration purposes.

The outputs of the comparators 121.1 to 121.3 are preferably connected via logic current paths 121.17, 121.18 and 121.19 to an evaluation logic arrangement 128. In this case, the current paths may be able to be connected via status lines 121.17 (BD), 121.18 (BH) and 121.19 (BL) in the sense of a signal interruption, in order to enable selective signal interruptions.

The evaluation logic arrangement (LOGIC DATA CONDITIONING & ERROR DISCRIMINATING SECTION) contains a circuit function 122' which may essentially correspond to the circuit function 122 in FIG. 31 and fulfil the functions already described in that case and is designed for two-wire and single-wire reception (across GND). Here, too, the elements 123L and 123H may also be especially designed in particular for error analyses in the two-wire mode.

Integrated in the expanded potential control apparatus 199' which is connected thereto, for example, are functions of the corresponding block 199 which have already been described in accordance with FIG. 12, for example, together with circuit functions 124 and 170.2 from FIG. 31. The storage cells 127H and 127L may in this case be constructed as part of a larger register contained in the block 199' for buffer-storage of SPI data. It may also equally well be a component at least of part of an error memory in connection with an EEPROM, which may likewise be assigned to the potential control apparatus 199'.

The control path 195.1 is a multiple control path and, as such, in a practical circuit, may also comprise analog and digital functional elements distributed to a greater or lesser extent, which match the block 199' to different driving requirements. By example, it may be necessary to drive the fixed voltage logic arrangement (supplied from the potential $VCC_A$) of the section 128 via the control path 195.3 differently from the logic current paths 121.17 to 121.19 via current paths 195.4, the threshold value offset sources 121.4 and 121.5 or—for the purpose of slew rate influencing via the path 195.2—the "floating" level discrimination section 121.20.

Furthermore, switching and control paths 195' lead from the block 199' to the transmission output stage 133 or to offset sources $Q_{SL}$, $Q_{SH}$ and/or $Q_{SHH}$ which are effective in the case of transmission. As central element, the block 199' having communications capability via the digital path 166.5 comprises conversion means 199.2X for converting digital signals into analog signals. In that case, the invention also includes the opposite conversion direction as apparatus elements. In the latter case, depending on the design of the control path 195.1, parts of such a conversion path may also be displaced upstream into the block 121.8, cf. FIG. 38.

All of the elements which do not serve for, or support, normal single-wire and two-wire reception operation without the presence of a potential error or bus level error are to be attributed in the broadest sense to the apparatus according to the invention.

Without restricting the invention, the expanded potential control apparatus 199' can unite in itself functionalities which are concerned both with the acquisition of error signals (as a result of error checks under offset conditions which are caused by errors or generated for the sake of testing) and with the influencing of the receiving and/or transmitting means. This is in order to thereby either search, find and set correspondingly "abnormal" transmission and reception conditions in an observational subscriber. Here, a circuit configured in this way or a module 200 configured in this way is situated as required for the purpose of reestablishing communications capability with another bus subscriber that has been lost beforehand due to a potential error, or to operate the receiving and/or transmitting means under diagnostic software after the manner of a "test receiver" and/or "test transmitter".

A reception block 120", augmented by such apparatus elements, as part of a bus transceiver 100' can, in conjunction with previously described functionalities of a potential control apparatus ("offset and bus test manager") 199' and cooperative level-shifting features of the output stage 133, support far reaching error analyses under SPI control by means of a microcontroller. In this case, depending on the test objective, it may suffice to construct only entirely specific apparatus features, or (if constructed) to be able to activate such features. A number of possibilities are set forth by way of example in FIGS. 34–37.

Figure 34:
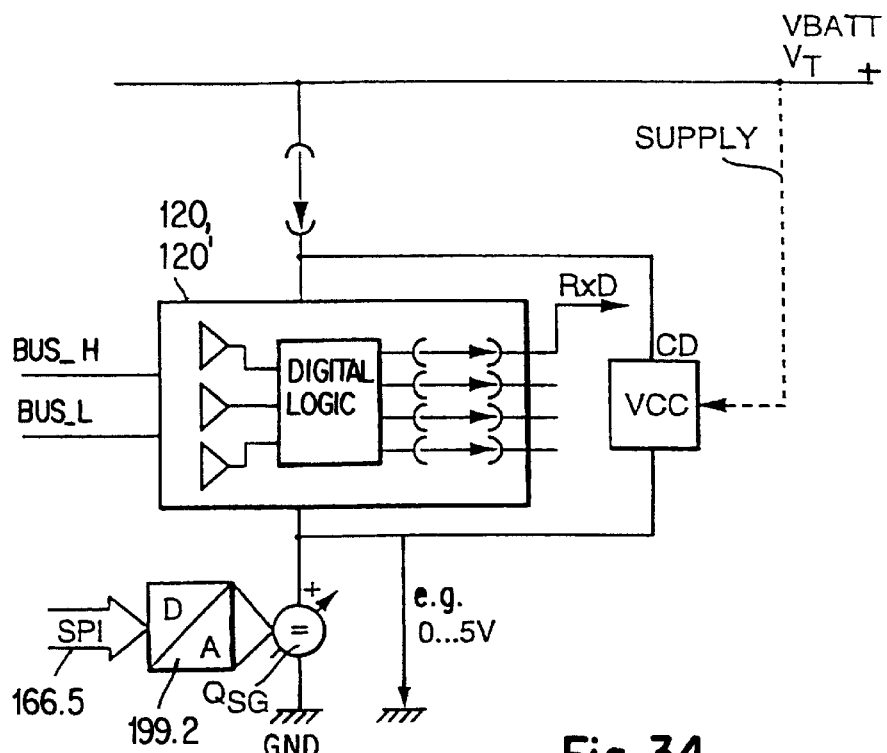
FIG. 34 shows a block circuit diagram of apparatus elements in accordance with FIG. 12 and FIG. 32 which are restricted to specific applications, relating to the receiving end of the transceiver function.

In accordance with FIG. 34, the entire reception block 120', 120", which is constantly supplied with a voltage VCC by dint of a voltage clamp or regulator CD, can be raised by 0 . . . 5 volts, for example, by an offset source $Q_{SG}$. In this case, the threshold voltages $VT_H$ and $VT_L$ within the reception block may be fixed, able to be changed over to network-specifically defined, fixed "deviation values", or variable, which corresponds, for example, to case (4) in FIG. 33 with switch $S_6$ closed. The corresponding setting signals CVTH and CVTL can then also be realized by current signals, for example. This example constitutes a modification of the example according to FIG. 32 insofar as in this case a digital evaluation arrangement which concomitantly floats together with the input comparators is taken as a basis and, for its part, is then connected, in terms of signal flow, on the output side via logic current paths to the circuit surroundings.

Figure 35:
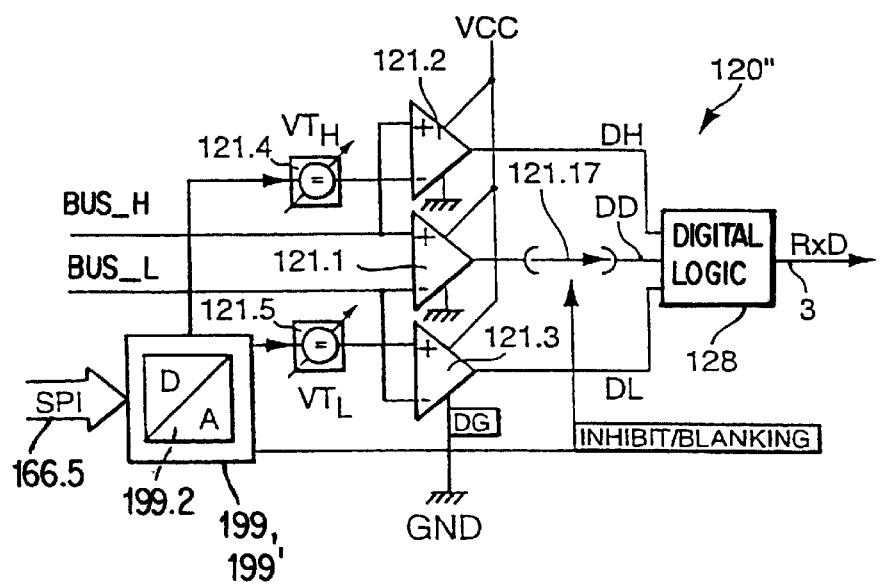
FIG. 35 shows a further block circuit diagram of apparatus elements in accordance with FIG. 12 and FIG. 32 which are restricted to specific applications, relating to the receiving end of the transceiver function.

In the exemplary apparatus according to FIG. 35, the negative supply terminal DG is connected to earth GND. In other words, the negative supply terminal DG has, for example, the potential of the chip GND. Only the threshold voltage sources for the comparators 121.2 and 121.3 are set in accordance with test requirements or given an underlying offset. For this purpose, the digital path 121.17 between the comparator 121.1 and the evaluation logic arrangement 128 can be interrupted, as required, corresponding to 121.17 and BD 195.4 in FIG. 32.

Figure 36:
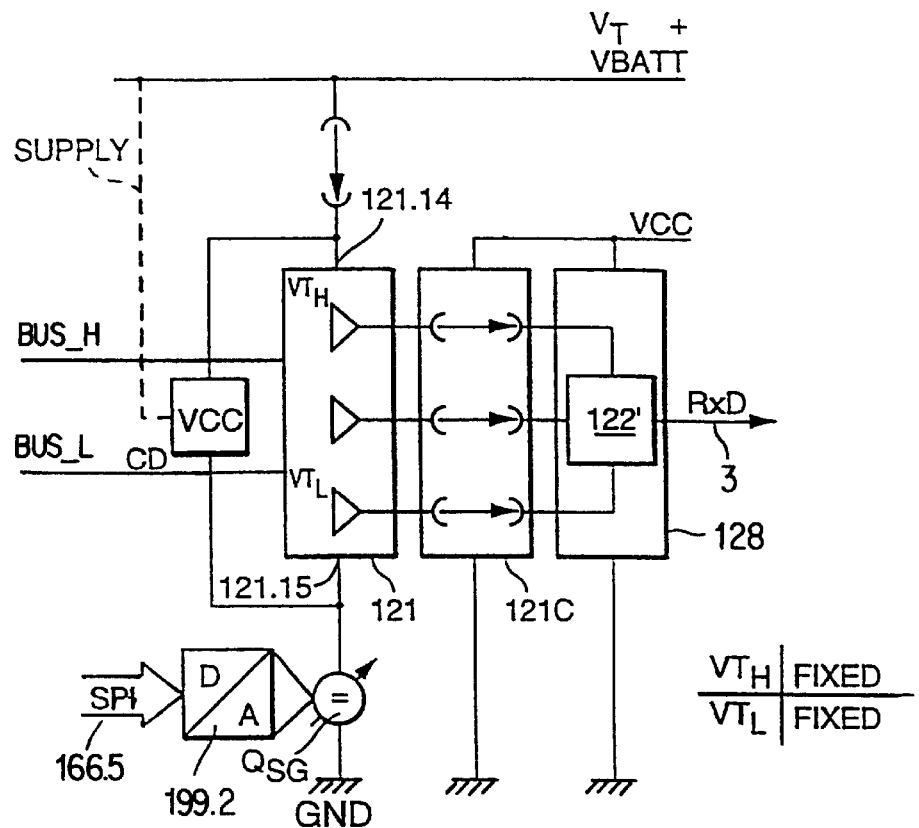
FIG. 36 shows a further block circuit diagram of apparatus elements in accordance with FIG. 12 and FIG. 32 which are restricted to specific applications, relating to the receiving end of the transceiver function.

The exemplary apparatus according to FIG. 36 corresponds to the general example according to FIG. 32 for the specific case according to FIG. 33 (1) and (5) (a), where the threshold voltages $VT_H$ and $VT_L$ are invariably predetermined quantities and can thus be shifted jointly with respect to earth potential by overall raising of the discrimination section 121.20, of analog action, by means of a reference point offset source $Q_{SG}$.

FIG. 37 reveals a construction of apparatus elements in the bus transceiver which suffices for earth potential error analyses, for example, in the case of which construction the supply terminals both of the discrimination section 121.20 of analog action and of the transmission output stage 133 are supplied from one and the same voltage clamp or voltage regulator and, in this respect, can be raised together by means of a reference point offset source $Q_{SG}$ above a potential GND. Current paths affording, both at the transmitting and at the receiving end, a correspondingly flexible potential connection of the digital signals TxD and DH, DD and DL are likewise indicated, as is the already mentioned store 142' for making possible inhibiting of the output stage 133 (no bus access), (compare FIG. 10, FIG. 11).

The apparatus detail according to FIG. 38 illustrates the circuit diagram of optimal furnishing of the function block 199' as already mentioned in connection with FIGS. 17 and 32. What is involved in this case is a measurement amplifier 199.8, which is wired up for a defined gain with resistors 2030 and 2031 and whose output feeds additionally provided means 199.3 for analog/digital conversion. These means are connected to the logic arrangement 199.1, which acts as interface to the SPI path 166.5, and thus allow for the difference for example between System GND and REM GND. This difference is acquired in analog form in order to be communicated digitally to a microcontroller. As already mentioned, these elements can equally well be assigned to the apparatus block 121.8 in FIG. 32.

All of the exemplary embodiments which have been explained up to this point rely on at least one D/A converter which provides an analog desired value in accordance with data received via the digital path 166.5.

Figure 39:
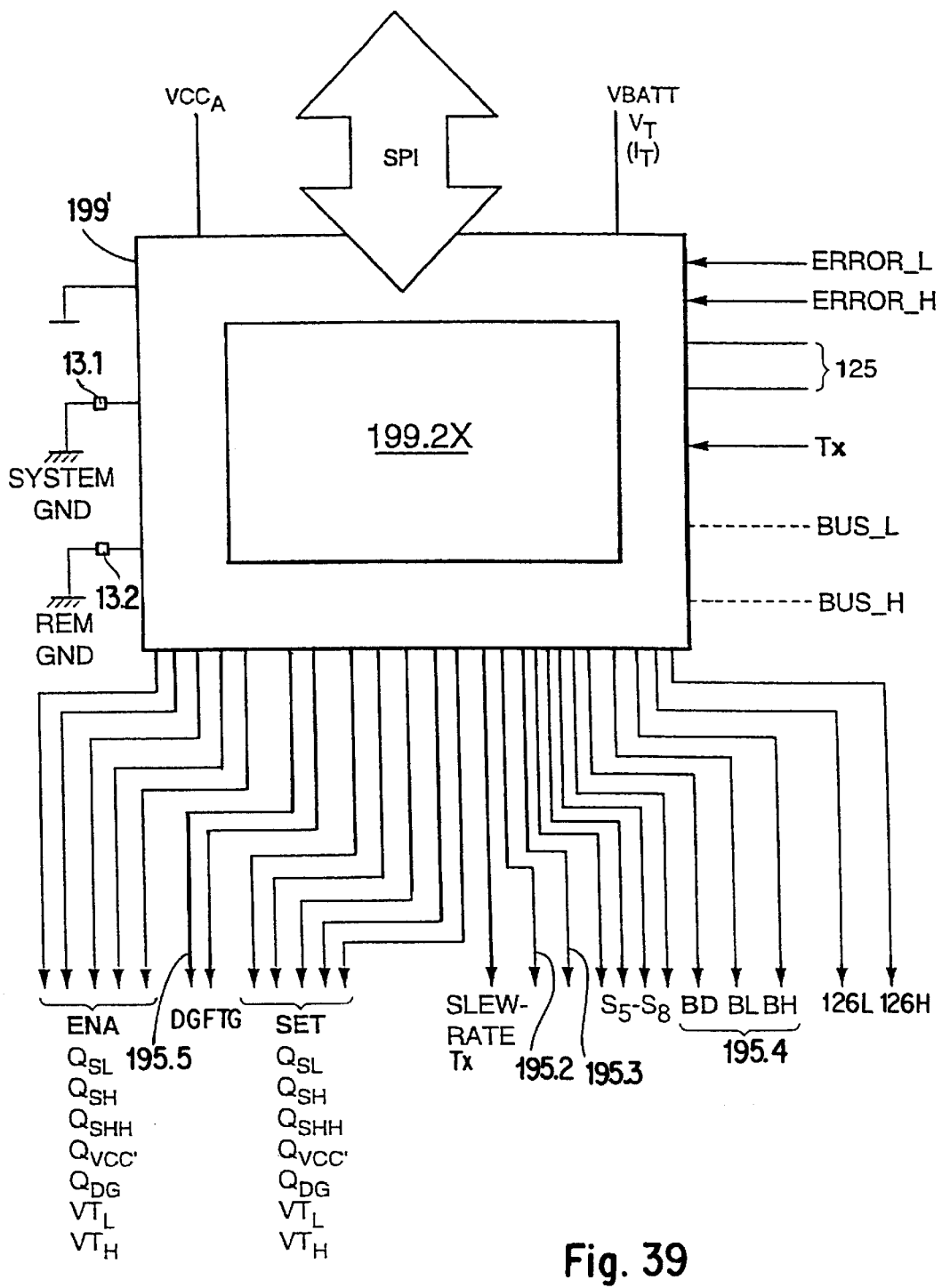
FIG. 39 shows a schematic illustration of a central apparatus element which generates all the control signals and value specifications for influencing the transmitting and receiving means of a bus transceiver for the purpose of potential error determination.

According to FIG. 39, the scope of the invention furthermore encompasses the following: all the desired value specifications and activation commands for offset sources that are required for practical bus test routines are generated in the semiconductor circuit 200 itself, by a central circuit function 199.2X which is an essential part of a correspondingly expanded potential control apparatus 199, as already indicated in FIG. 32. Within the scope of this functionality, it is optionally possible also to take account of a voltage difference between the terminals Chip or System GND 13 or 13.1 and REM GND 13.2.

Furthermore, the capability of measuring the bus core voltages may be intrinsic to this functionality. Within the scope of the invention, therefore, it is provided that a corresponding function block 199.2X substitutes, in particular, all the D/A converters in the exemplary embodiments which have been described up to this point. This is in order to satisfy, under specific software for auto-diagnosis of a bus network having many subscribers, all the requirements of ramping and squeezing of communications level windows in terms of transmission and reception.

This function block may therefore be configured in such a way that, as illustrated in FIG. 39, it can provide, inter alia,
(1) at least one of the ENAble signals for activating and inhibiting offset sources (effective in terms of transmission and reception) $Q_{SG}$ in accordance with FIG. 14; $Q_{SL}$, $Q_{SH}$, $Q_{SHH}$, $Q_{VCC}$, in accordance with FIGS. 15 & 16 & 17 & 18; 121.7/$Q_{DG}$, 121.4/$VT_H$ and 121.5/$VT_L$ in accordance with FIG. 32,
(2) at least one of the desired value specifications or setting values, deviating from bus-specific standard values, for $Q_{SG}$ in accordance with FIG. 14; $Q_{SL}$, $Q_{SH}$, $Q_{SHH}$, $Q_{VCC}$ in accordance with FIGS. 15 & 16 & 17 & 18; 121.7/$Q_{DG}$, 121.4/$VT_H$ and 121.5/$VT_L$ in accordance with FIG. 32,
(3) at least one setting or switching signal for influencing the slew rate at the transmitting end and/or for influencing the receiver-end evaluation of bus core-specific reference signals for controllable logic paths (121.17, 121.18, 121.19 in accordance with FIG. 32) and/or reception error discrimination (126L, 126H) and/or slew rate adaptation (195.2 in conjunction with 170.2, 195.3 in accordance with FIG. 32),
(4) at least one setting or switching signal for realizing the switching and/or selector functions $S_5$ to $S_8$ in accordance with FIG. 33.

An apparatus which is developed in such a way makes it possible to influence, without any restrictions, the bus levels which can be discriminated by the bus receiver, to be precise either one of both alternatively or else both at the same time. Furthermore, this functionality covers all influencing at the transmitting end, at the receiving end or at the transmitting and receiving ends in combination, as described.

In any case, a practically realized functionality of the potential control apparatus 199, 199' can comprise both linear amplifier means and conversion means of digital/analog action or analog/digital action, and also a dedicated reference voltage source, which can be supplied either by the output 20.2.2 or from the potential $V_T$ or the potential VBATT (197 or 194). In this case, it is possible to realize the conversion means of digital/analog and/or analog/digital action such that they are connected via the interface logic arrangement 199.1 (having the function of an interface) more or less closely to, for example, the interface 166 establishing a connection to a microcontroller.

Network management or diagnostic software can utilize these apparatus details in order, on the one hand, to bring about deliberate faulty communication (that is to say within an actually defective level window) of an observational subscriber equipped with the apparatus with another bus subscriber (namely one with an earth error) and to identify it in this way. On the other hand, the software can be used for the purpose of verification to successively preclude bus subscribers not having an earth error from normal communication. In this context, the capability, mentioned above in connection with FIGS. 10 & 11 & 37, of interrupting the transmission access in the RECEIVE ONLY mode can, in all the bus subscribers not afflicted by an error, be advantageously utilized to blank bus level influencing due to the flowing in of potential onto the bus from other bus subscribers (in the case of a CAN, for example, due to the broadcasting of acknowledge bits or error frames).

Optionally, the apparatus may also be assigned a storage area in which are stored the configurations of the reception block 120" for instance in accordance with FIG. 33 or entirely specific selections of active apparatus elements for instance in accordance with FIGS. 14–18 and FIGS. 34–37 in the form of corresponding data. For the definition for the operation of an entirely specific selection of operable apparatus elements for instance in accordance with FIGS. 14–18 and FIGS. 34–37, the apparatus may also include circuit means which permit such a definition only once.

As already mentioned, the functionality of the potential control apparatus 199, 199' may equally well be connected to a greater or lesser extent to a control interface 124, which is to be assigned to the bus transceiver, or be entirely resolved in said interface, and vice versa. On the other hand, the scope of the functionality of the potential control apparatus 199, 199', on account of the analog/digital and/or digital/analog conversion means in 199, 199', may also be to a greater or lesser extent part of, or even identical to, a control interface 166 establishing the connection to an external microcontroller.

Figure 40:
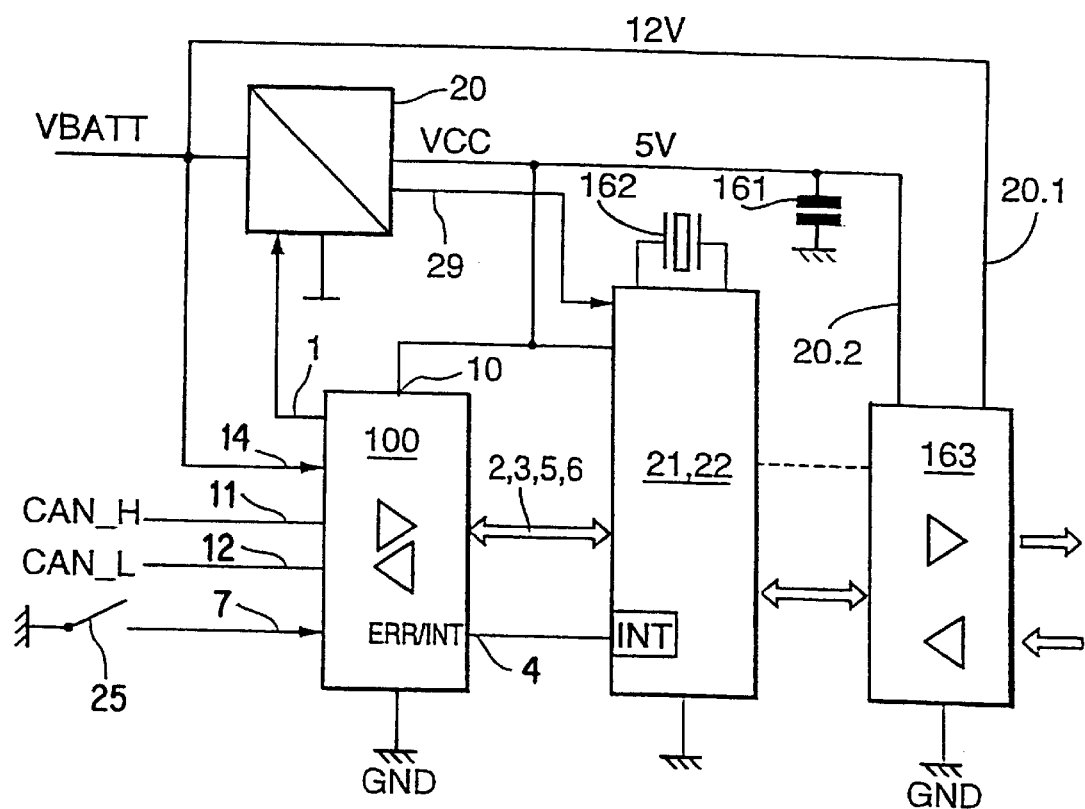
FIG. 40 shows a block diagram for roughly illustrating a unit or module in which a bus transceiver 100 interacts with a microcontroller 21.
Figure 41:
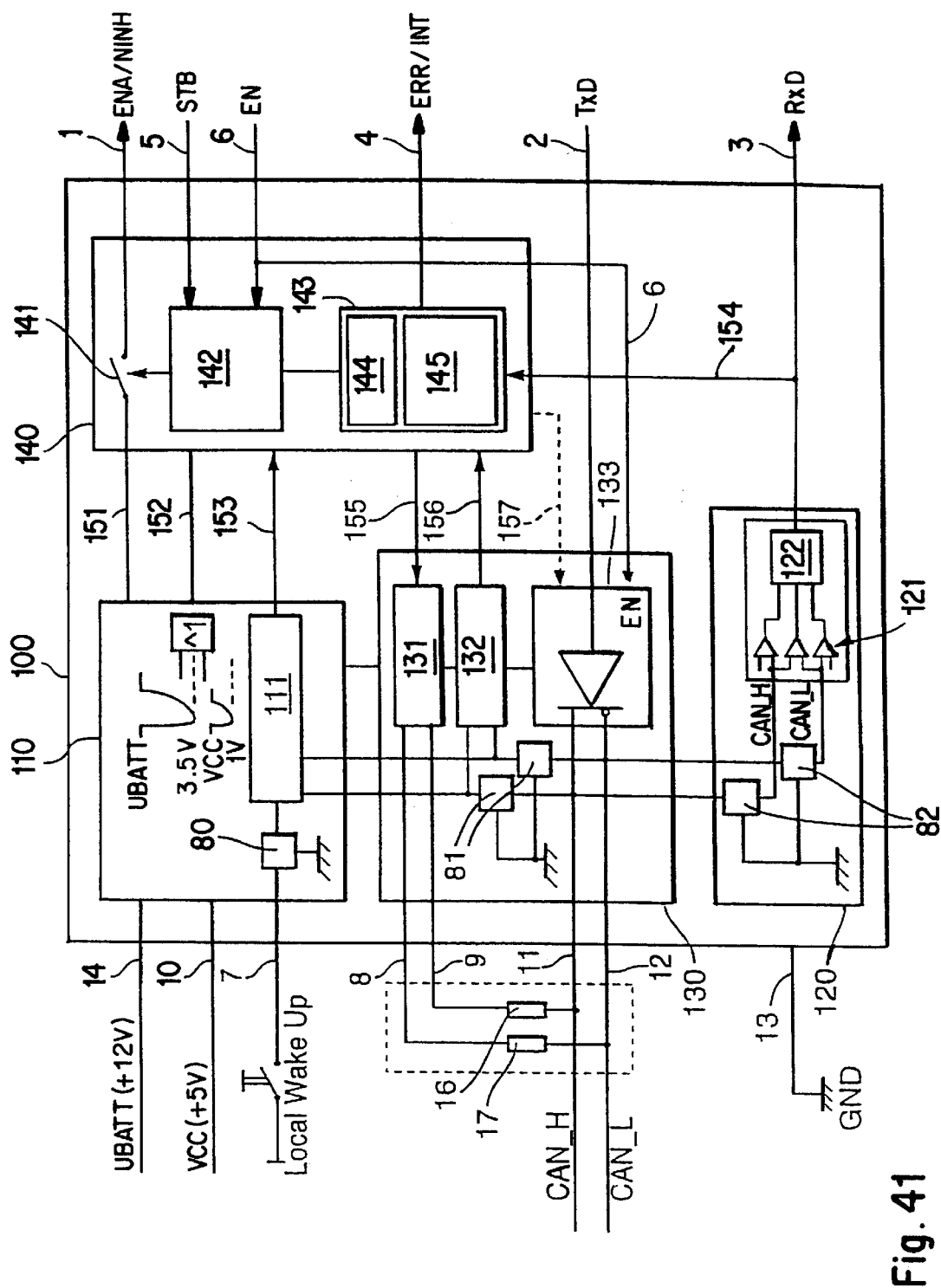
FIG. 41 shows a diagram, resolved into function blocks, of a bus transceiver 100 as described in the priority application.

FIGS. 40 & 41, which are described in detail in the priority application which was mentioned in the introduction and forms a basis, may contribute to a comprehensive understanding.

Figure 42:
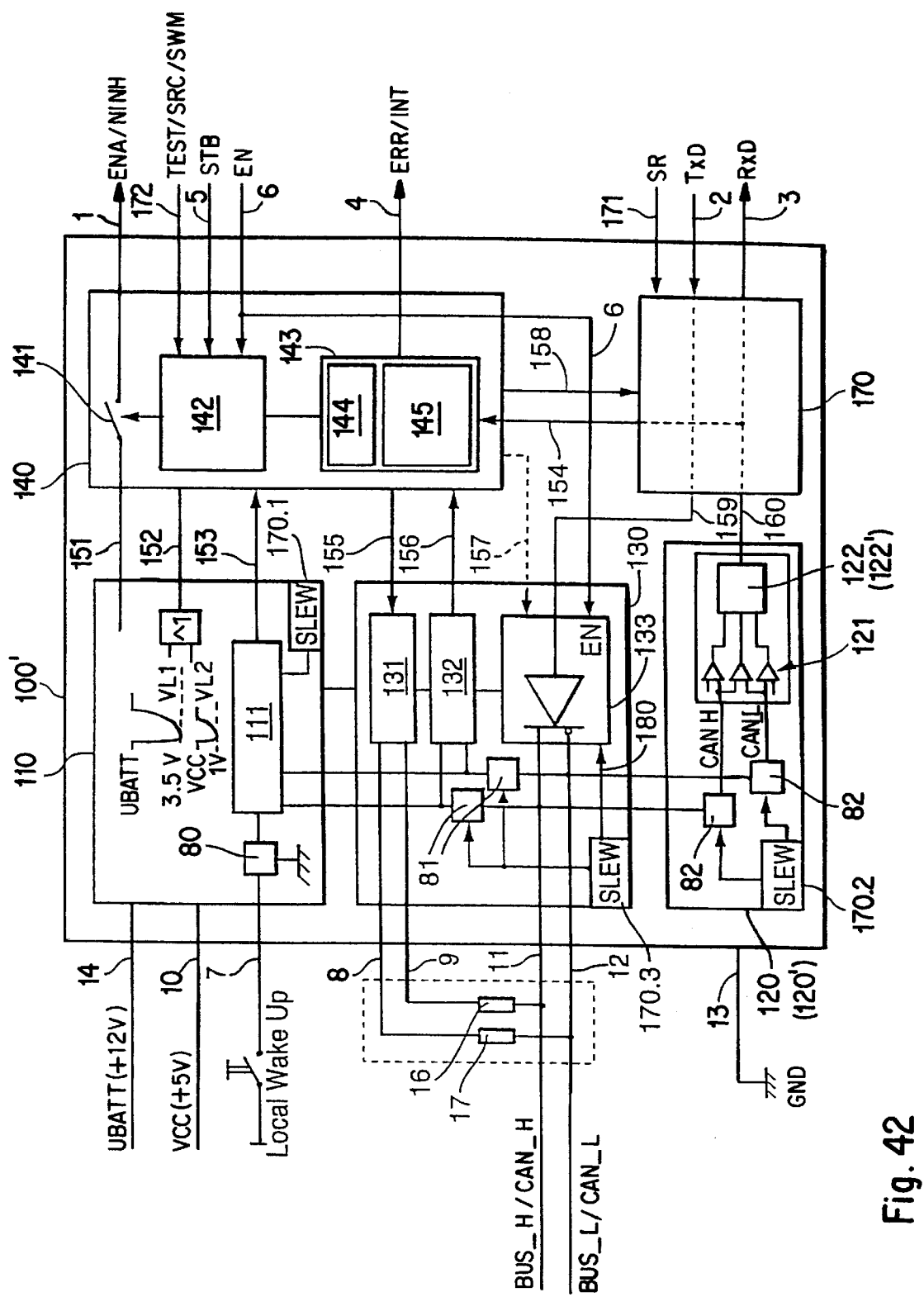
FIG. 42 shows a diagram, resolved into function blocks, of a bus transceiver 100' as described in the parallel application which was filed at the same time and is cited in the text in connection with FIG. 12 (FIG. 4 in the said parallel application).

FIG. 42, which is taken from the abovementioned, contemporaneous parallel application, shows a bus transceiver 100' which is equipped with further additional features and is designed as an integrated semiconductor circuit, for example.

Its function blocks 110, 120 and 130 have, over and above that shown in FIG. 41, additional means 170.1 and 170.2 and 170.3, respectively, for the influencing and controlling and setting at least of the receiving means 120 and of the transmitting means 130, under certain circumstances also of wake-up identification means 111 in the block 110. Furthermore, the connection paths 159 and 160 for the signals TxD and RxD and also the path 154 can be routed through a block 170 having the function of a slew-rate controller (under certain conditions). Moreover, with regard to the local terminal 7, a protective filter 80 is connected upstream of the wake-up identification means 111.

Corresponding filter elements 81 and 82 are connected upstream of the two CAN_H/CAN_L inputs of the wake-up identification block 111 and the bus error identification block 132 and, respectively, the two inputs of the receiver front end 121 in the reception block 120, which last has error handling and logic means 122 connected downstream of it. The abovementioned filter elements differ from the protective filter 80 in that they can be controlled by block-assigned slew-rate setting means 170.2 and 170.3. The slew-rate setting means 170.3 can also act, via an optional path 180, directly on the output stage 133. Active influencing of the slew rate of the transmitter in 130 is then possible on this route. A slew-rate controller 170 can be driven, via the optional path 158, by the control block 140. In addition, it can optionally be driven via at least one further terminal 171. Furthermore, the function block 142, which sets the operating modes of the semiconductor circuit 100' in accordance with the specification from the microcontroller, can be expanded by a further input 172 for a Test signal (TEST) and/or Slew Rate Control Signal (SRC).

The detailed function of this augmentation is as follows.

The slew-rate control block 170 acts, for example in dependence on an SR signal present at its input 171 or (as explained further below) in dependence on or in interdependency with the signal TEST/SRC—optionally also interlinked with signals EN and STB—via connections (not illustrated in the figures) on the block-assigned slew-rate setting means (170.1, 170.2 and 170.3) and the latter in this case, for example, on the transmission output stage 133. As a result, on the one hand, the slew rate of the output stage is correspondingly altered and set and changed over, respectively, and, on the other hand, the slew follow behaviour of the blocks 110, 120 and 130 is altered and set and changed over, respectively. In the simplest case, corresponding frequency band clipping of the input signals from the bus CAN_H/CAN_L is activated at the bus inputs of the blocks 110, 120 and 130.

This controllable slew-rate influencing makes such a bus transceiver 100' suitable for different transmission rates and bus bit periods. As a result, such a transceiver 100' can be used in different systems having bus cut-off frequencies that differ greatly from one another. For example, such a circuit can serve FAST CANs in connection with the engine management of internal combustion engines in means of transport in exactly the same way as it can serve SLOW CANs in interior spaces of such means of transport.

Furthermore, by virtue of the control of the slew rate, the radio-frequency interference signal suppression can be directly influenced, to be precise both in terms of transmission and in terms of reception. The lower the bit slew rate on the bus CAN_H/CAN_L, the greater the electromagnetic interference radiated from the bus network and its branches, which radiation is caused by transmission operation. The shorter the identifiable or discriminatable slew rate of the receiver front end 121 or of the wake-up identification block 111, the greater the risk of an undesirable reading or wake-up error caused by radio-frequency interference spectra acting electromagnetically.

From this, it follows for the characterization of the filters 81 and 82 that what may be involved here are not only controllable low-pass filters but also, equally, real, preferably DC-coupled, slew-rate filters of analog or digital action which allow the signal slew rate or bit periods on the bus to be utilized extending as far as the respective limit slew rate or limit bit periods. The filters involved may also equally well be bit period filters which—in order to optimize the interference suppression—can be set to the communications baud rate of the bus. As may be understood further below in connection with FIG. 29, such bit period filters can be set digitally by a control interface 124 of the transceiver function.

In this way, it is also possible to obtain a high signal-to-noise ratio in this bus environment in motor vehicles or electrical rail-bound vehicles, for example, in which motors/engines and loads are being fed to an increasing extent by means of heavy, clocked currents. As a result of excessive resonant increases in the cabling, exhibiting inductance and capacitance, of the supply lines of such loads, radio-frequency electromagnetic interference fields can act to a greater or lesser extent, depending on the spatial configuration of the respective field and course of a bus line, with regard to the latter. The abovementioned features afford a possible way of reducing the effect of this kind of interference on communication (active interference protection).

In the case of preferred programming or setting of the circuit, the slew rate for wake-up signals and the slew rate for communications signals can be dimensioned such that they are unequal.

Furthermore, in an operating mode SLEEP, for example, the slew rate may also be set to a value which is lower than in all of the other operating modes. In this context, the connection 158 is intended to denote that, optionally, the control block 140 may also influence the slew-rate control. This measure achieves a corresponding insensitivity of a corresponding bus network, whose subscribers are each equipped with such a "SLEEP-SLEW" semiconductor circuit 100', relative to undesirable wake-up disturbances in the operating mode SLEEP. Since the circuit 100' is designed such that it consumes the least possible supply current in the operating mode SLEEP, the filter elements 81 and 82 can be constructed in such a way that they automatically effect the lowest slew rate in the event of disconnection of the internal power supply of the transmitting and/or receiving means 130 and/or 120, which lowest slew rate is then always effective in this sense in the operating mode SLEEP (run-up of the slew rate and automatic reversion to the SLEEP slew rate with a particularly high signal-to-noise ratio).

Furthermore, the controllable slew-rate influencing makes the transceiver nucleus of the circuit 100' suitable as test transmitter and test receiver for software-based tests of a bus network, including those with test baud rates and test bit periods. In this context, too, the connection 158 is intended to denote that, optionally, the control block 140 can also influence the slew rate influencing.

The interaction for bus diagnosis purposes of this slew-rate influencing with further functions within an above-described SPI structure of an electronic module 200 has already been discussed in connection with FIG. 12.

With regard to the transmitting and receiving means 130, 133 and 120, respectively, the transceiver 100' may preferably be constructed in such a way that these means are tolerant to all possible error states in and on the bus line network, provided that all the bus subscribers behave compatibly with regard to the bus line network, a provision which may be fulfilled, for example, if all the bus subscribers use the same transceiver 100'.

In the prior-art German application P 196 11 945.6, not only the operating modes of SLEEP, STANDBY, RECEIVE ONLY and NORMAL of a relatively simple transceiver but also even further ones are conceived of. The situation of augmentation is realized in the present case. The block 142 can be fed, via the input 172, a further signal—in this case designated by SRC/SWM—which redefines the meaning of the signals EN and STB, if required. In this case, SRC stands for slew rate control and SWM stands for single wire mode.

For example, test flags in 142 that can address test slew rates within 100' can be set or erased by the third SRC signal, by means of the bits EN and STB. In connection with development for test capability, the slew-rate controller 170 may also comprise buffer-storing and/or digital delay means for at least one of transmission and reception path at 2 and/or 3. Within the scope of the invention, such additional digital means can also interact with a repetitive signal SR at the input 171 in order, in this way, under bus management which is geared towards uniform distribution of the bus intelligence, to enable automatic testing of the bus, with the participation of all the subscribers, for the presence or maintenance of defined transmission and signal-to-noise ratio qualities, as explained above in connection with FIGS. 12 & 46.

An essential aspect of the invention is that of also designing those test means which are near to the bus using a semiconductor technology which affords a high resistance to damage caused by coarse interfering influences in order, precisely when a bus error or bus quality error has actually occurred owing to whatever interfering influences, to retain the defective bus such that it is still fully automatically testable.

The drawing comprising the figures does not signify any restriction at all to the invention. All the individual features disclosed with regard to an exemplary embodiment can, of course, be transferred to all of the other exemplary embodiments, in particular can be combined with individual features thereof, without thereby leaving the scope of the invention.

In the description above, as one possibility an implementation of the invention for a CAN bus was described and, therefore, designations introduced for this field were also used. The invention also equally encompasses two-wire buses which are standardized in a different way. Therefore, it can be used just as advantageously in correspondingly equipped bus subscribers—for example according to the J1850 or similar standards.

This has been taken into account in the drawing by the fact that bus wires have been provided not only with a neutral designation by BUS_H and BUS_L but also a designation by CAN_H and CAN_L which can be read for an exemplary CAN implementation. This is taken into account in the claims, too, by the use of the more general designations BUS_H and BUS_L and BUS_H/BUS_L, depending on whether an individual bus wire, or the bus as a system, or both bus wires in the sense of the bus line network are meant.

What is claimed is:

1. A method for determining potential shifts between electronic modules representing bus subscribers, or assigned to said bus subscribers in a wire bus network, or a correspondence quality of communications operating levels of the electronic modules interconnected in the wire bus network, the wire bus network comprising at least one wire bus directly and electrically connected to the electronic modules, the electronic modules being interconnected via a potential busbar serving as a reference-earth potential busbar for bus communications at least during a single-wire operating mode of the wire bus network, the method comprising the acts of:

(a) determining a bus subscriber to be a test subscriber which is capable, both physically and with regard to potential errors which are possible in a system-specific manner, of communicating with each remaining bus subscriber which may be a potential defective subscriber;

(b) broadcasting via the test subscriber at least one bus message to put all the bus subscribers to be tested into a "Transmit no application messages" operating mode;

(c) broadcasting via the test subscriber at least one bus message to put all the bus subscribers to be tested into a RECEIVE ONLY operating mode "receive only, transmission not possible", as a result of which all the bus subscribers become observational subscribers;

(d) broadcasting via the test subscriber at least one bus message to put, from amongst a number of observational subscribers, a specific observational subscriber which is a potential defective subscriber into a NORMAL operating mode "transmit and receive", (e) cyclically broadcasting at least one test message by the test subscriber;

(f) acknowledging the at least one test message via the potential defective subscriber in the NORMAL operating mode by:

(f) (1) sending a positive acknowledgment back to the test subscriber via the bus using the potential defective subscriber, if the at least one test message is received without any errors by the defective subscriber;

(f) (2) sending a negative acknowledgment back to the test subscriber via the bus using the potential defective subscriber, if at least one message is received with errors by the defective subscriber; and (f) (3) sending no acknowledgment onto the bus via the potential defective subscriber, if at least one message is not received by the defective subscriber;

(g) assessing a positive acknowledgment via the test subscriber as a truth status for data transmission free from errors, and at least one of a negative acknowledgment and the absence of an acknowledgment as a truth status for an erroneous data transmission;

(h) shifting at least one first source level to which the at least one bus wire used for testing is dominantly keyed using the test subscriber;

(i) performing acts (f) (1) and (g) to record a range of potential shifting of the at least one source level in which the test message is received without any errors; and performing acts (f) (2) and (f) (3) to record a range of potential shifting of the at least one source level in which the test message is one of not received and received with errors;

(j) setting a potential shift of the source level dominantly assigned to the at least one wire bus to a range in which the test data transmission was previously possible without any errors;

(k) broadcasting at least one bus message to put the potential defective subscriber into the RECEIVE ONLY operating mode "Receive only—transmission not possible" once the testing of the potential defective subscriber has ended, where the potential defective subscriber becomes the observational subscriber;

(l) repeating the acts (d) thru (k) for either observational subscribers of specific interest or all observational subscribers;

(m) evaluating test results; and (n) returning the wire bus network to a nominal operation using the test subscriber.

2. The method according to claim 1, further comprising the act of interchanging acts (b) and (c).

3. The method according to claim 2, further comprising the act of:

(p) shifting at least one source level to which the at least one bus wire used for communication is dominantly keyed, during each act (b) thru (d), in order to broadcast at least one bus message.

4. The method according to claim 1, further comprising the act of interchanging acts (m) and (n).

5. The method according to claim 4, further comprising the act of:

(p) shifting at least one source level to which the at least one bus wire used for communication is dominantly keyed, during each act (b) thru (d), in order to broadcast at least one bus message.

6. The method according to claim 1, further comprising the act of performing acts (e) thru (i) simultaneously.

7. The method according to claim 6, further comprising the act of:

(p) shifting at least one source level to which the at least one bus wire used for communication is dominantly keyed, during each act (b) thru (d), in order to broadcast at least one bus message.

8. The method according to claim 1, wherein the act of shifting the at least one first source level in accordance with act (h) is performed over time in a ramped manner.

9. The method according to claim 1, wherein the act of shifting the at least one first source level in accordance with act (h) is performed monotonically step by step.

10. The method according to claim 1, wherein the shifting of the at least one first source level in accordance with act (h) is performed alternately with a shifting of a second source level in accordance with a predetermined shifting step pattern.

11. The method according to claim 1, further comprising the act of:

(o) (a) broadcasting, after act (a) and before act (d) using the test subscriber, at least one bus message to put a bus subscriber which is to be a potential defective subscriber into a "subscriber load currents switched on" operating mode.

12. The method according to claim 1, further comprising the act of:

(o) (b) broadcasting, after step (a) and before step (d) using the test subscriber, at least one bus message to put all the bus subscribers into a "subscriber load currents switched on" operating mode.

13. The method according to claim 1, further comprising the act of:

(p) shifting at least one source level to which the at least one bus wire used for communication is dominantly keyed, during each act (b) thru (d), in order to broadcast at least one bus message.

14. The method according to claim 1, wherein the test subscriber is a bus subscriber permanently connected to the wire bus network, and acts (a) thru (n) are implemented by the bus subscriber at least after each new start-up of the wire bus network as subordinate to a normal bus operation with regard to all the bus subscribers.

15. The method according to claim 14, further comprising the act of:

storing evaluation results, which are obtained via a check of all the bus subscribers at least after each start-up of the wire bus network, in either the test subscriber or a bus subscriber which can be selected by the test subscriber.

16. The method according to claim 1, wherein the wire bus network is a two-wire bus network.

17. The method according to claim 16, wherein the test subscriber drives both bus wires during testing.

18. The method according to claim 17, further comprising the acts of:

implementing acts (e) and (h) together at least at times in a message-interlinked manner step by step; wherein each test message contains an expectation number from the potential defective subscriber to be tested.

19. The method according to claim 18, wherein the message interlinking is bit-block-based.

* * * * *